United States Patent
Lee et al.

(10) Patent No.: US 12,207,025 B2
(45) Date of Patent: Jan. 21, 2025

(54) APPARATUS AND METHOD OF ACQUIRING IMAGE BY EMPLOYING COLOR SEPARATION LENS ARRAY

(71) Applicants: SAMSUNG ELECTRONICS CO., LTD., Suwon-si (KR); INDUSTRY-ACADEMIC COOPERATION FOUNDATION, YONSEI UNIVERSITY, Seoul (KR)

(72) Inventors: Sangyun Lee, Yongin-si (KR); Moongi Kang, Seoul (KR); Seokho Yun, Seoul (KR); Jonghyun Kim, Goyang-si (KR); Kyeonghoon Jeong, Seoul (KR)

(73) Assignees: SAMSUNG ELECTRONICS CO., LTD., Suwon-si (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 18/394,687

(22) Filed: Dec. 22, 2023

(65) Prior Publication Data
US 2024/0137474 A1 Apr. 25, 2024

Related U.S. Application Data

(63) Continuation of application No. 17/518,181, filed on Nov. 3, 2021, now Pat. No. 11,902,712.

(30) Foreign Application Priority Data

Nov. 10, 2020 (KR) .................. 10-2020-0149592

(51) Int. Cl.
*G02B 27/10* (2006.01)
*H04N 9/01* (2023.01)
(Continued)

(52) U.S. Cl.
CPC ........... *H04N 9/01* (2023.01); *G02B 27/1013* (2013.01); *H04N 9/646* (2013.01); *H04N 23/843* (2023.01); *H04N 23/88* (2023.01); *H04N 25/13* (2023.01)

(58) Field of Classification Search
CPC ................................... G06T 5/00–50
(Continued)

(56) References Cited

U.S. PATENT DOCUMENTS 3,971,065 A 7/1976 Bayer
8,878,967 B2 11/2014 Susanu et al.
(Continued)

FOREIGN PATENT DOCUMENTS

JP 2010-62785 A 3/2010
KR 10-2005-0123341 A 12/2005
(Continued)

OTHER PUBLICATIONS

Condat, Laurent, "A generic variational approach for emosaicking from an arbitrary Color filter array", Actes de IEEE ICIP, Nov. 2009, Le Caire, Egypt, pp. 1625-1628. (5 pages total).
(Continued)

*Primary Examiner* — Anthony J Daniels
(74) *Attorney, Agent, or Firm* — Sughrue Mion, PLLC

(57) ABSTRACT

An apparatus for acquiring images includes an image sensor and a signal processor. The image sensor may include a sensor substrate and a color separation lens array, wherein the sensor substrate includes a plurality of photo-sensing cells, and the color separation lens array may separate an incident light into a plurality of lights having different wavelengths and forms a phase distribution for condensing the plurality of lights having the different wavelengths on adjacent photo-sensing cells of the plurality of photo-sensing cells. The signal processor may perform deconvolution
(Continued)

on sensing signals of the plurality of photo-sensing cells to obtain a sub-sampled image, perform demosaicing to restore a full resolution image having a full resolution from the sub-sampled image, and correct a color of the full resolution image using a point spread function (PSF) of the color separation lens array.

18 Claims, 59 Drawing Sheets

(51) Int. Cl.
    *H04N 9/64*     (2023.01)
    *H04N 23/84*     (2023.01)
    *H04N 23/88*     (2023.01)
    *H04N 25/13*     (2023.01)

(58) Field of Classification Search
    USPC .......................................................... 348/335
    See application file for complete search history.

(56) References Cited

U.S. PATENT DOCUMENTS

| | | |
|---|---|---|
| 9,325,918 B2 | 4/2016 | Mitsunaga |
| 2005/0275736 A1 | 12/2005 | Chiu et al. |
| 2009/0167893 A1 | 7/2009 | Susanu et al. |
| 2010/0074520 A1* | 3/2010 | Kinoshita ................ G06T 5/73 382/167 |
| 2014/0327783 A1 | 11/2014 | Nishiwaki et al. |
| 2015/0310589 A1 | 10/2015 | Yamanaka |
| 2016/0277658 A1 | 9/2016 | Kim et al. |
| 2016/0301911 A1 | 10/2016 | Dias et al. |
| 2018/0204311 A1 | 7/2018 | Kishine |
| 2019/0094408 A1 | 3/2019 | Boyarsky et al. |
| 2021/0010858 A1 | 1/2021 | Primot et al. |
| 2021/0125301 A1 | 4/2021 | Park et al. |

FOREIGN PATENT DOCUMENTS

| | | |
|---|---|---|
| KR | 10-2013-0064684 A | 6/2013 |
| KR | 10-2016-0111121 A | 9/2016 |
| KR | 10-1797426 B1 | 11/2017 |
| KR | 10-2021-0049670 A | 5/2021 |

OTHER PUBLICATIONS

Leung, Brian et al., "Least-Squares Luma-Chroma Demultiplexing Algorithm for Bayer Demosaicking", Published Jul. 1, 2011, Computer Science, Medicine IEEE Transactions on Image Processing. (10 pages total).

Bo Han Chen et al., "GaN Metalens for Pixel-Level Full-Color Routing at Visible Light", Nano Lett., 2017, pp. 6345-6352 (8 pages total).

Communication issued on Sep. 30, 2024 by the Korean Intellectual Property Office for Korean Patent Application No. 10-2020-0149592.

* cited by examiner

| R11 | G12 | R13 | G14 | R15 | G16 |
|-----|-----|-----|-----|-----|-----|
| G21 | B22 | G23 | B24 | G25 | B26 |
| R31 | G32 | R33 | G34 | R35 | G36 |
| G41 | B42 | G43 | B44 | G45 | B46 |
| R51 | G52 | R53 | G54 | R55 | G56 |
| G61 | B62 | G63 | B64 | G65 | B66 |

Original (Ground-truth)

POR (Bilinear demosaicing + Color correction)

MP(Bilinear demosaicing + Color correction)

MP(Deconvolution + Bilinear demosaicing w/ level balance + Color correction)

APPARATUS AND METHOD OF ACQUIRING IMAGE BY EMPLOYING COLOR SEPARATION LENS ARRAY

CROSS-REFERENCE TO RELATED APPLICATIONS

This application is a continuation application of U.S. patent application Ser. No. 17/518,181, filed on Nov. 3, 2021, which claims priority from Korean Patent Application No. 10-2020-0149592, filed on Nov. 10, 2020, in the Korean Intellectual Property Office, the disclosures of which are incorporated by reference herein in their entireties.

BACKGROUND

1. Field

Apparatuses and methods consistent with example embodiments relate to acquiring images using a color separation lens array.

2. Description of Related Art

In image sensors, in order to capture color images, color filters of red, green, and blue color are arranged with a certain pattern, on light sensing pixels and considering human visual characteristics sensitive to green color, an array of color filters may have a Bayer pattern structure in which 50% of green color filter elements, 25% of red color filter elements, and 25% of blue color filter elements are arranged to cross each other.

In order to compose a color image by using captured green, red, and blue raw images, a method of interpolating color values of empty pixels of each color by using color values of surrounding pixels is used. Interpolating a color for each pixel from a raw image is called demosaicing.

The existing methods of demosaicing Bayer raw images are optimized for a case where only a light component corresponding to the color of a corresponding pixel, in incident light of the unit pixel, is incident on a light sensing surface by using a microlens and an absorption-type color filter.

The number of pixels of the image sensor has gradually increased, and accordingly, the miniaturization of pixels is required while maintaining the amount of light quantity and the performance of noise removal. Recently, in order to improve light utilization efficiency of the image sensor, in addition to an incident light component having a certain color, light components having the same color as the certain color from surrounding pixels are also incident on a pixel to improve light efficiency, and thus, a new image processing method is required to compose a color image by using captured green, red, and blue raw images.

SUMMARY

One or more example embodiments provide apparatuses and methods of acquiring images, in which light utilization efficiency is improved and image resolution may also be secured by using a color separation lens array capable of separating and condensing incident light according to wavelengths.

According to an aspect of an embodiment, an apparatus for acquiring image data includes: an image sensor including a sensor substrate and a color separation lens array, wherein the sensor substrate includes a plurality of photo-sensing cells, and the color separation lens array separates an incident light into a plurality of lights having different wavelengths and forms a phase distribution for condensing the plurality of lights having the different wavelengths on adjacent photo-sensing cells of the plurality of photo-sensing cells; and a signal processor configured to perform deconvolution on sensing signals of the plurality of photo-sensing cells to obtain a sub-sampled image, perform demosaicing to restore a full resolution image having a full resolution from the sub-sampled image, and correct a color of the full resolution image using a point spread function (PSF) of the color separation lens array.

The signal processor may be further configured to apply a level balance during the demosaicing.

The signal processor may be further configured to apply a blur kernel that is estimated using the PSF of the color separation lens array, to the deconvolution.

The signal processor may be further configured to correct the full resolution image by using a color correction matrix constructed using the PSF of the color separation lens array.

The signal processor may be further configured to perform a white balance process after the demosaicing and before correcting the color.

The deconvolution may be performed by the signal processor to erase convoluted information from at least one surrounding pixel.

The signal processor may be provided in a logic circuit of the image sensor or is provided as a companion chip.

The image sensor may include a Bayer pattern array, wherein the signal processor may be further configured to obtain an individual image for each color of the Bayer pattern array and form a color image by using the individual image for each color.

The signal processor may be further configured to form the color image by interpolating a color value of an empty pixel of each color by using a color value of at least one surrounding pixel.

The color separation lens array may be configured to condense a first light component corresponding to a certain pixel of the sensor substrate and a second light component corresponding to at least one surrounding pixel of the sensor substrate, onto the certain pixel of the sensor substrate.

The sensor substrate may include a plurality of first photo-sensing cells and a plurality of second photo-sensing cells. The color separation lens array may include: a plurality of first regions respectively corresponding to the plurality of first photo-sensing cells and having a first structure; and a plurality of second regions respectively corresponding to the plurality of second photo-sensing cells and having a second structure. The first structure and the second structure may be configured to form, in a position after the incident light has passed through one of the plurality of first regions and one of the plurality of second regions, the phase distribution in which light of a first wavelength and light of a second wavelength among the plurality of lights having the different wavelengths are diverged in different directions and are respectively condensed in the plurality of first photo-sensing cells and the plurality of second photo-sensing cells.

The first structure and the second structure may be configured such that: the light of the first wavelength at a position immediately after passing through the color separation lens array forms a first phase distribution of $2N\pi$ at central portions of the first photo-sensing cells and forms a second phase distribution of $(2N-1)\pi$ at central portions of the second photo-sensing cells, wherein N is an integer greater than 0, and the light of the second wavelength at the position immediately after passing through the color separation lens array forms a third phase distribution of $(2M-1)\pi$ at the central portions of the first photo-sensing cells and forms a fourth phase distribution of $2M\pi$ at the central portions of the second photo-sensing cells, wherein M is an integer greater than 0.

The sensor substrate may further a plurality of third photo-sensing cells and a plurality of fourth photo-sensing cells, wherein the color separation lens array may include a plurality of third regions respectively corresponding to the plurality of third photo-sensing cells and having a third structure, and a plurality of fourth regions respectively corresponding to the plurality of fourth photo-sensing cells and having a fourth structure, and the sensor substrate may include an array of unit pixels including the first to the fourth photo-sensing cells.

The first structure to the fourth structure may be configured to form, in a position after the incident light has passed through respectively ones of the plurality of first regions to the plurality of fourth regions, the phase distribution in which the light of the first wavelength, the light of the second wavelength, and light of a third wavelength that are different from one another from the plurality of lights having the different wavelengths, are diverged in different directions and then the light of the first wavelength is condensed in the plurality of first photo-sensing cells and the plurality of fourth photo-sensing cells, the light of the second wavelength is condensed in the plurality of second photo-sensing cells, and the light of the third wavelength is condensed in the plurality of third photo-sensing cells.

The first structure to the fourth structure may be configured such that, at a position immediately after passing through the color separation lens array, the light of the first wavelength forms a first phase distribution of $2N\pi$ at central portions of the plurality of first photo-sensing cells and central portions of the plurality of fourth photo-sensing cells and forms a second phase distribution of $(2N-1)\pi$ at central portions of the plurality of second photo-sensing cells and central portions of the plurality of third photo-sensing cells, the light of the second wavelength forms a third phase distribution of $(2M-1)\pi$ at the central portions of the plurality of first photo-sensing cells and the central portions of the plurality of fourth photo-sensing cells, forms a fourth phase distribution of $2M\pi$ at the central portions of the plurality of second photo-sensing cells, and forms a fifth phase distribution that is greater than $(2M-2)\pi$ and less than $(2M-1)\pi$ at the central portions of the plurality of third photo-sensing cells, and the light of the third wavelength forms a sixth phase distribution of $(2L-1)\pi$ at the central portions of the plurality of first photo-sensing cells and the central portions of the plurality of fourth photo-sensing cells, forms a seventh phase distribution of $2L\pi$ at the central portions of the plurality of third photo-sensing cells, and forms an eighth phase distribution that is greater than $(2L-2)\pi$ and less than $(2L-1)\pi$ at the central portions of the plurality of second photo-sensing cells, wherein N, M, and L are integers greater than 0.

The first to the fourth structures may include a plurality of nanoposts, and at least one of a shape, size, and arrangement of the plurality of nanoposts may be different between the first to the fourth regions.

The image sensor may have a pixel array structure in which unit pixels including at least one red pixel, at least one green pixel, and at least one blue pixel are repeatedly arranged, wherein a plurality of first nanoposts provided in a region of the color separation lens array corresponding to the at least one green pixel from among the first to the fourth regions may be arranged according to different distribution rules in a first direction and a second direction perpendicular to the first direction, and a plurality of second nanoposts provided in regions of the color separation lens array corresponding to the at least one blue pixel and the at least one red pixel from among the plurality of first to fourth regions may be arranged according to symmetrical distribution rules in the first direction and the second direction.

The apparatus may further include: a plurality of first nanoposts provided in a first region of the color separation lens array corresponding to a green pixel are arranged according to different distribution rules in a first direction and a second direction perpendicular to the first direction, and a plurality of second nanoposts provided in second regions of the color separation lens array corresponding to a blue pixel and a red pixel are arranged according to symmetrical distribution rules in the first direction and the second direction.

The image sensor may have a Bayer pattern structure in which unit pixels, each having four quadrant regions including a blue pixel, a first green pixel, a red pixel, and a second green pixel, respectively, are repeatedly arranged two-dimensionally in a first direction and a second direction.

The color separation lens array may further include a plurality of nanoposts. Among the plurality of nanoposts, a plurality of first nanoposts provided in a region of the color separation lens array corresponding to a green pixel includes a first nanopost arranged in a central portion, which has a larger cross-sectional area than a second nanopost provided in a region of the color separation lens array corresponding to a pixel of a color other than green, and a third nanopost arranged in a peripheral portion, which has a smaller cross-sectional area than the first nanopost arranged in the central portion.

According to an aspect of another embodiment, a method of acquiring image data may include: obtaining a raw image for each color by the image sensor of the apparatus for acquiring the image data; performing the deconvolution on the sensing signals to obtain the sub-sampled image in which a blur phenomenon is removed; performing the demosaicing to obtain the full resolution image from the sub-sampled image; and correcting the color of the full resolution image using the PSF, wherein a color image may be formed by processing the sensing signals for each color acquired by the image sensor.

The raw image for each color may have a Bayer pattern arrangement.

According to an aspect of another embodiment, an electronic apparatus may include: the apparatus for acquiring the image data, which acquires image information about an object; and a processor that performs image processing on the image information provided from the apparatus for acquiring the image data.

The electronic apparatus may be a smartphone, a mobile phone, a personal digital assistant (PDA), a laptop, a tablet, or a personal computer (PC).

The signal processor may additionally applies a level balance during the demosaicing.

The signal processor may apply a blur kernel estimated using the PSF of the color separation lens array to the deconvolution to improve spatial resolution.

The signal processor may perform color correction by using a color correction matrix constructed using the PSF of the color separation lens array.

The signal processor may additionally perform a white balance process after the demosaicing and before the color correction.

The deconvolution may be performed by the signal processor to erase convoluted information from at least one surrounding pixel.

The signal processor may be provided in a logic circuit of the image sensor or is provided as a companion chip.

The image sensor may include a Bayer pattern array, wherein the signal processor may obtain an image for each color of the Bayer pattern array and form a color image by using the obtained image for each color.

In order to form a color image by using the obtained image for each color, the signal processor may form the color image by interpolating a color value of an empty pixel of each color by using a color value of at least one surrounding pixel.

The color separation lens array may condense a light component corresponding to a certain pixel onto the certain pixel, and may further condense a light component from at least one surrounding pixel onto the certain pixel.

The sensor substrate may include a plurality of first photo-sensing cells and a plurality of second photo-sensing cells, wherein the color separation lens array may include: a plurality of first regions respectively corresponding to the plurality of first photo-sensing cells and having a first fine structure; and a plurality of second regions respectively corresponding to the plurality of second photo-sensing cells and having a second fine structure, wherein the first fine structure and the second fine structure may be configured to form, in a position after the incident light has passed through the first region and the second region, a phase distribution in which light of a first wavelength and light of a second wavelength that are different from each other from among incident lights incident on the color separation lens array are branched in different directions and are respectively condensed in the first photo-sensing cells and the second photo-sensing cells.

The first fine structure and the second fine structure may be configured such that the light of the first wavelength at a position immediately after passing through the color separation lens array forms a phase distribution of $2N\pi$ at central portions of the first photo-sensing cells and forms a phase distribution of $(2N-1)\pi$ at central portions of the second photo-sensing cells, wherein N is an integer greater than 0, and the light of the second wavelength at the position immediately after passing through the color separation lens array forms a phase distribution of $(2M-1)\pi$ at the central portions of the first photo-sensing cells and forms a phase distribution of $2M\pi$ at the central portions of the second photo-sensing cells, wherein M is an integer greater than 0.

The sensor substrate may further include a plurality of third photo-sensing cells and a plurality of fourth photo-sensing cells, wherein the color separation lens array may include a plurality of third regions respectively corresponding to the plurality of third photo-sensing cells and having a third fine structure, and a plurality of fourth regions respectively corresponding to the plurality of fourth photo-sensing cells and having a fourth fine structure, and the sensor substrate may include an array of unit pixels including the first to fourth photo-sensing cells.

The first fine structure to the fourth fine structure may be configured to form, in a position after the incident light has passed through the first region to the fourth region, a phase distribution in which light of a first wavelength, light of a second wavelength, and light of a third wavelength that are different from one another from among incident lights incident on the color separation lens array are branched in different directions and then the light of the first wavelength is condensed in the first photo-sensing cells and the fourth photo-sensing cells, the light of the second wavelength is condensed in the second photo-sensing cells, and the light of the third wavelength is condensed in the third photo-sensing cells.

The first fine structure to the fourth fine structure may be configured such that, at a position immediately after passing through the color separation lens array, the light of the first wavelength forms a phase distribution of $2N\pi$ at central portions of the first photo-sensing cells and central portions of the fourth photo-sensing cells and forms a phase distribution of $(2N-1)\pi$ at central portions of the second photo-sensing cells and central portions of the third photo-sensing cells, the light of the second wavelength forms a phase distribution of $(2M-1)\pi$ at the central portions of the first photo-sensing cells and the central portions of the fourth photo-sensing cells, forms a phase distribution of $2M\pi$ at the central portions of the second photo-sensing cells, and forms a phase distribution that is greater than $(2M-2)\pi$ and less than $(2M-1)\pi$ at the central portions of the third photo-sensing cells, and the light of the third wavelength forms a phase distribution of $(2L-1)\pi$ at the central portions of the first photo-sensing cells and the central portions of the fourth photo-sensing cells, forms a phase distribution of $2L\pi$ at the central portions of the third photo-sensing cells, and forms a phase distribution that is greater than $(2L-2)\pi$ and less than $(2L-1)\pi$ at the central portions of the second photo-sensing cells, wherein N, M, and L are integers greater than 0.

The first to fourth fine structures of the first to fourth regions may include a plurality of nanoposts, and at least one of a shape, size, and arrangement of the nanoposts may be different between the first to fourth regions.

The image sensor may have a pixel array structure in which unit pixels including at least one red pixel, at least one green pixel, and at least one blue pixel are repeatedly arranged, wherein nanoposts provided in a region corresponding to a green pixel from among the first to fourth regions may have different distribution rules in a first direction and a second direction perpendicular to the first direction, and nanoposts provided in regions corresponding to a blue pixel and a red pixel from among the first to fourth regions may have symmetrical distribution rules in the first direction and the second direction.

The fine structure of the plurality of regions may include a plurality of nanoposts, nanoposts provided in a region corresponding to a green pixel from among the plurality of regions may have different distribution rules in the first direction and the second direction, and nanoposts provided in regions corresponding to a blue pixel and a red pixel from among the plurality of regions may have symmetrical distribution rules in the first direction and the second direction.

The image sensor may have a Bayer pattern structure in which unit pixels, each having four quadrant regions including a blue pixel, a green pixel, a red pixel, and a green pixel, respectively, are repeatedly arranged two-dimensionally in a first direction and a second direction.

The fine structure of the plurality of regions may include a plurality of nanoposts, wherein, among the plurality of nanoposts, nanoposts provided in a region corresponding to a green pixel from among the plurality of regions may include a nanopost arranged in a central portion, which has a larger cross-sectional area than a nanopost provided in a region corresponding to a pixel of a color other than green, and a nanopost arranged in a peripheral portion, which has a smaller cross-sectional area than the nanopost arranged in the central portion.

According to an aspect of another embodiment, a method of acquiring images includes: obtaining a raw image for each color by the image sensor of the image acquisition apparatus described above; performing, in a sub-image domain, deconvolution on sensing signals of a plurality of photo-sensing cells of the image sensor to overcome a blur phenomenon; performing demosaicing for restoring an image having full resolution from a sub-sampled image; and correcting a color using a point spread function (PSF) of the color separation lens array, wherein a color image is formed by processing an image signal for each color acquired by the image sensor.

The raw image for each color may have a Bayer pattern arrangement.

According to an aspect of another embodiment, an electronic apparatus includes: the image acquisition apparatus described above; and a processor that performs image processing on the image information provided from the image acquisition apparatus.

The electronic apparatus may be a smart phone, a mobile phone, a personal digital assistant (PDA), a laptop, a tablet, or a personal computer (PC).

BRIEF DESCRIPTION OF THE DRAWINGS

The above and/or other aspects will be more apparent by describing certain example embodiments, with reference to the accompanying drawings, in which:

FIGS. 3A to 3C illustrate various pixel arrangements of a pixel array of an image sensor;

FIG. 10O is a diagram illustrating a direction of red light incident on and around a third region of the color separation lens array corresponding to a red pixel.

FIGS. 24A to 24C illustrate an increase in the amount of light incident on a unit pixel of a Bayer pattern array of an image sensor to which a color separation lens array is applied;

DETAILED DESCRIPTION

Figure 1:
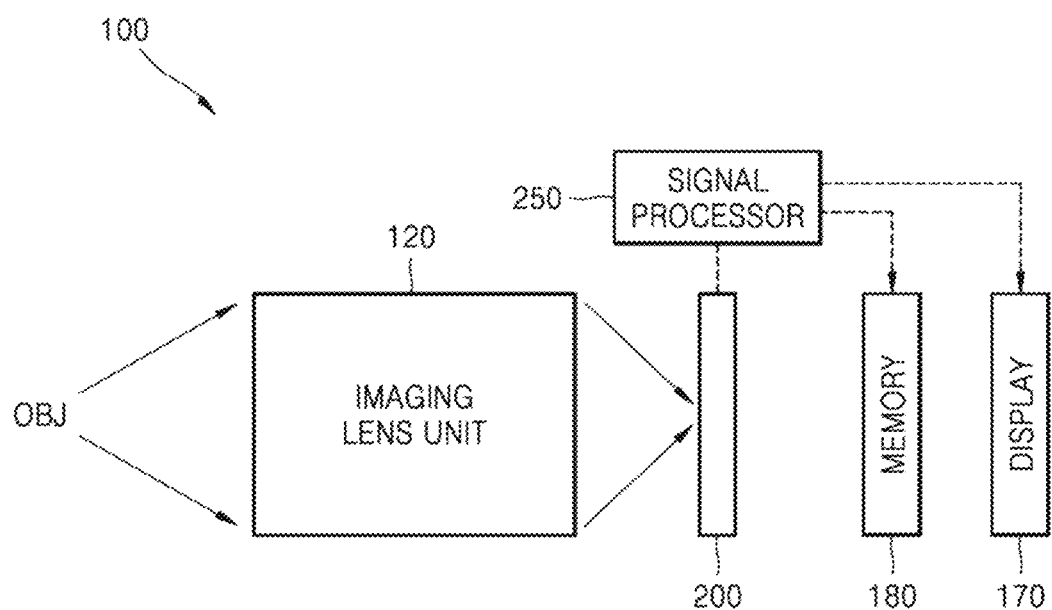
FIG. 1 illustrates a configuration of an image acquisition apparatus according to an embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

Hereinafter, embodiments of the present disclosure will be described in detail with reference to the accompanying drawings. In the following drawings, like reference numerals refer to like elements, and the size of each element in the drawings may be exaggerated for clarity and convenience of explanation. Meanwhile, the embodiments described below are merely illustrative, and various other modifications can be made from these embodiments.

Hereinafter, when a first element is described as being "above" or "on" a second element, embodiments using these expressions may include the case in which the first element may be directly on the second element and the case in which the first element is located above the second element while the first and second elements do not contact each other. As used herein, the singular forms "a", "an", and "the" are intended to include the plural forms as well, unless the context clearly indicates otherwise. When a portion "includes" an element, unless otherwise described, another element may be further included, rather than the presence of other elements being excluded. The use of the terms "a" and "an" and "the" and similar referents in the context of describing the disclosure (especially in the context of the following claims) are to be construed to cover both the singular and the plural.

FIG. 1 illustrates a configuration of an image acquisition apparatus 100 according to an embodiment.

Referring to FIG. 1, the image acquisition apparatus 100 includes an image sensor 200 that acquires an image signal (hereinafter, referred to as a color image signal) for each color by converting an optical image formed by an imaging lens unit 120, which focuses light reflected from an object OBJ to form the optical image, into an electrical signal, and a signal processor 250 that processes the color image signal acquired by the image sensor 200 and forms a color image. The image acquisition apparatus 100 may further include a display 170 displaying an image formed by the signal processor 250, a memory 180 storing the image formed by the signal processor 250, and the like. An additional optical element, for example, an infrared cutoff filter may be further arranged between the image sensor 200 and the imaging lens unit 120.

Figure 2:
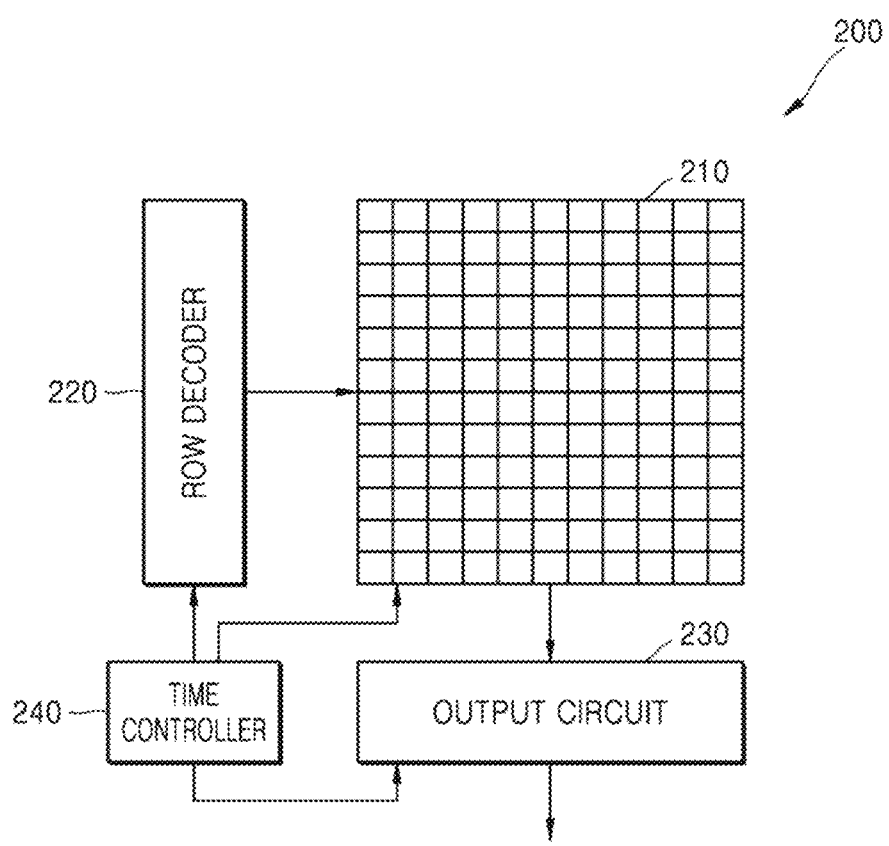
FIG. 2 is a block diagram of an image sensor according to an embodiment.

FIG. 2 is a block diagram of an image sensor 200 according to an embodiment.

Referring to FIG. 2, the image sensor 200 may include a pixel array 210, a timing controller 240, a row decoder 220, and an output circuit 230. The image sensor 200 may include a charge-coupled device (CCD) image sensor or a complementary metal oxide semiconductor (CMOS) image sensor.

The pixel array 210 includes pixels arranged two-dimensionally along a plurality of rows and columns. The row decoder 220 selects one of the rows of the pixel array 210 in response to a row address signal output from the timing controller 240. The output circuit 230 outputs a light sensing signal in column units from a plurality of pixels arranged along the selected row. To this end, the output circuit 230 may include a column decoder and an analog to digital converter (ADC). For example, the output circuit 230 may include a plurality of ADCs arranged for each column between the column decoder and the pixel array 210, or one ADC arranged at an output terminal of the column decoder. The timing controller 240, the row decoder 220, and the output circuit 230 may be implemented as a single chip or separate chips. The signal processor 250 for processing an image signal output through the output circuit 230 may be implemented as a single chip together with the timing controller 240, the row decoder 220, and the output circuit 230.

The pixel array 210 may include a plurality of pixels sensing light of different wavelengths. The pixels may be arranged in various types. For example, FIGS. 3A, 3B, and 3C illustrate various arrangements of the pixel array 210.

Figure 3A:
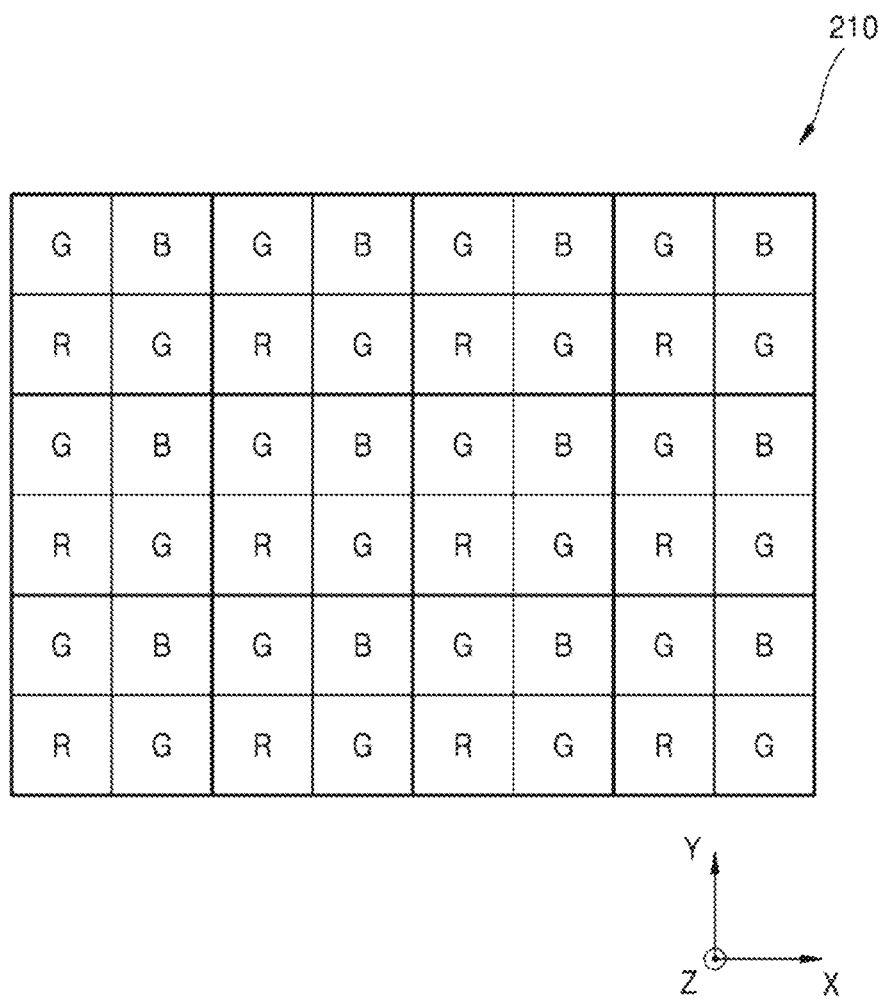
Figure 3B:
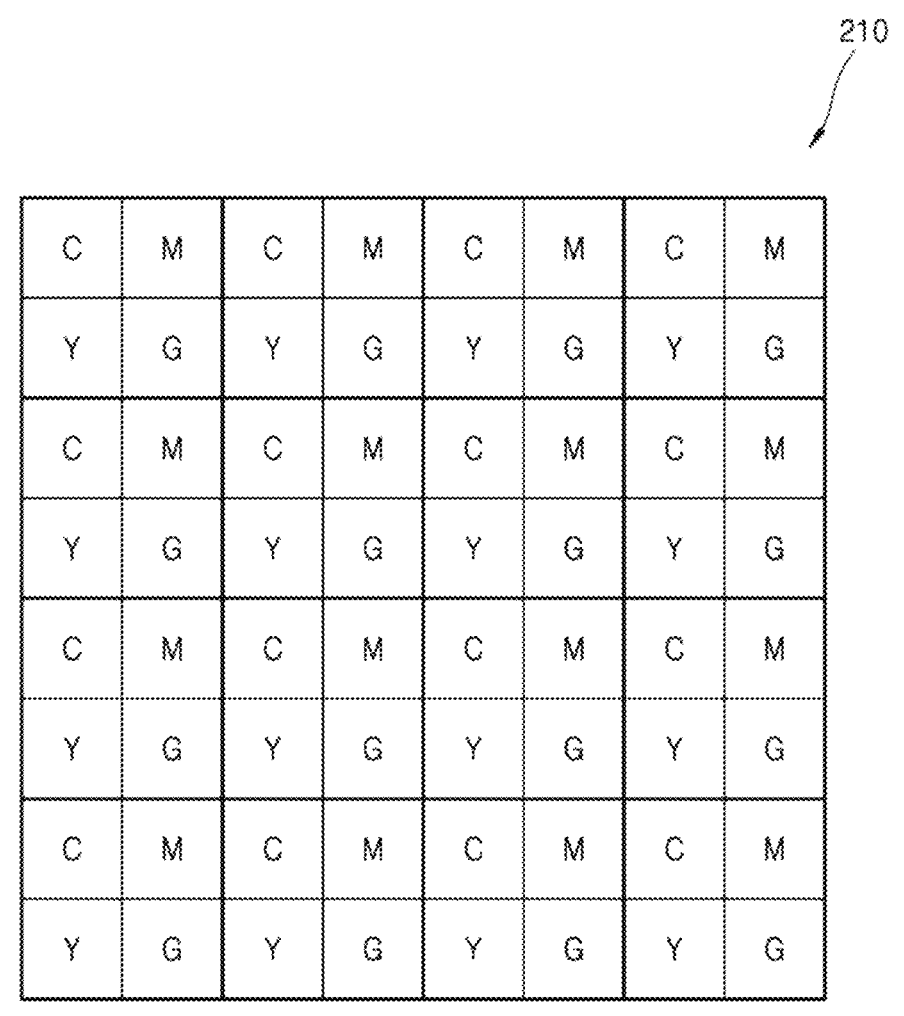
Figure 3C:
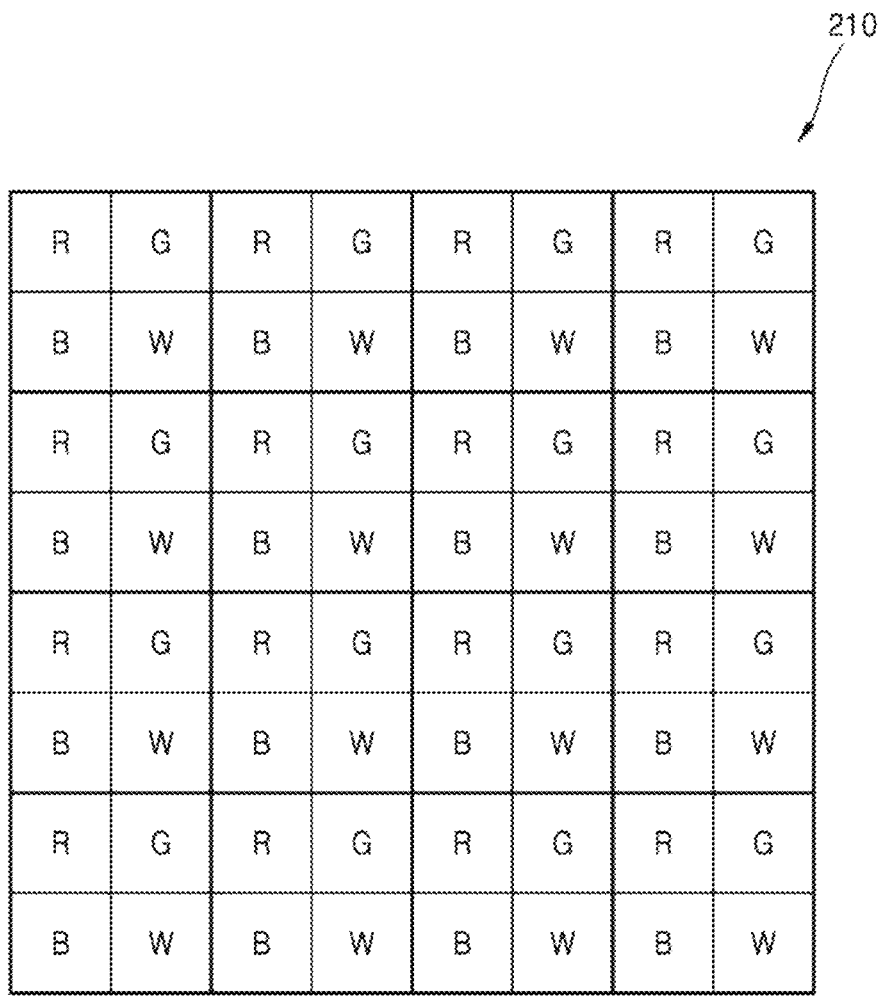

First, FIG. 3A shows a Bayer pattern that is generally adopted in the image sensor 200. Referring to FIG. 3A, one unit pixel includes four quadrant regions, and first to fourth quadrants may be a blue pixel B, a green pixel G, a red pixel R, and a green pixel G, respectively. These unit pixels are repeatedly arranged two-dimensionally in a first direction (X-direction) and a second direction (Y-direction). In other words, two green pixels G are arranged in one diagonal direction within a 2×2 array-type unit pixel, and one blue pixel B and one red pixel R are arranged in the other diagonal direction. In an overall pixel arrangement, a first row in which a plurality of green pixels G and a plurality of blue pixels B are alternately arranged in the first direction, and a second row in which a plurality of red pixels R and a plurality of green pixels G are alternately arranged in the first direction are repeatedly arranged in the second direction.

Figure 4A:
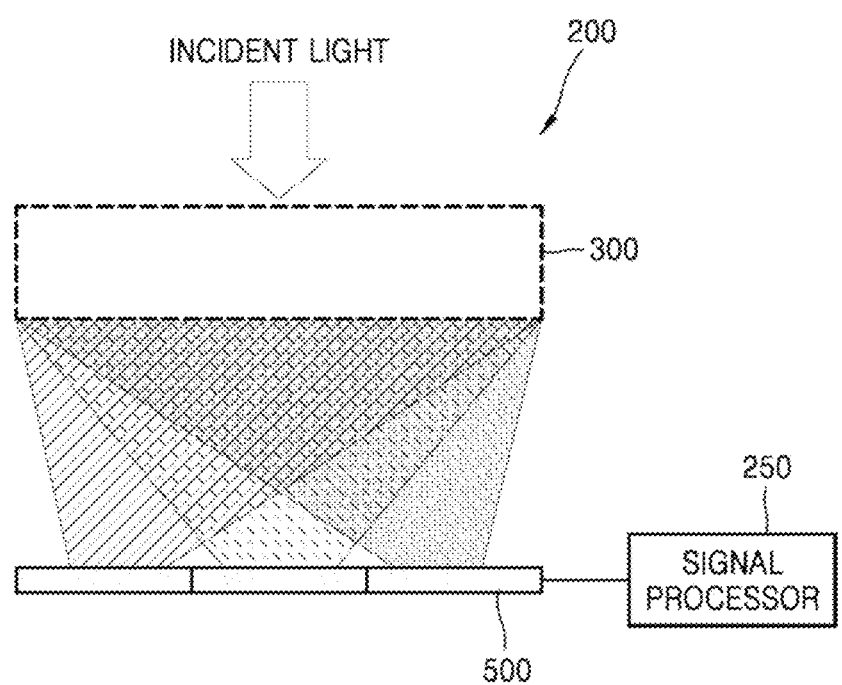
FIGS. 4A and 4B illustrate an image sensor according to an embodiment.
Figure 4B:
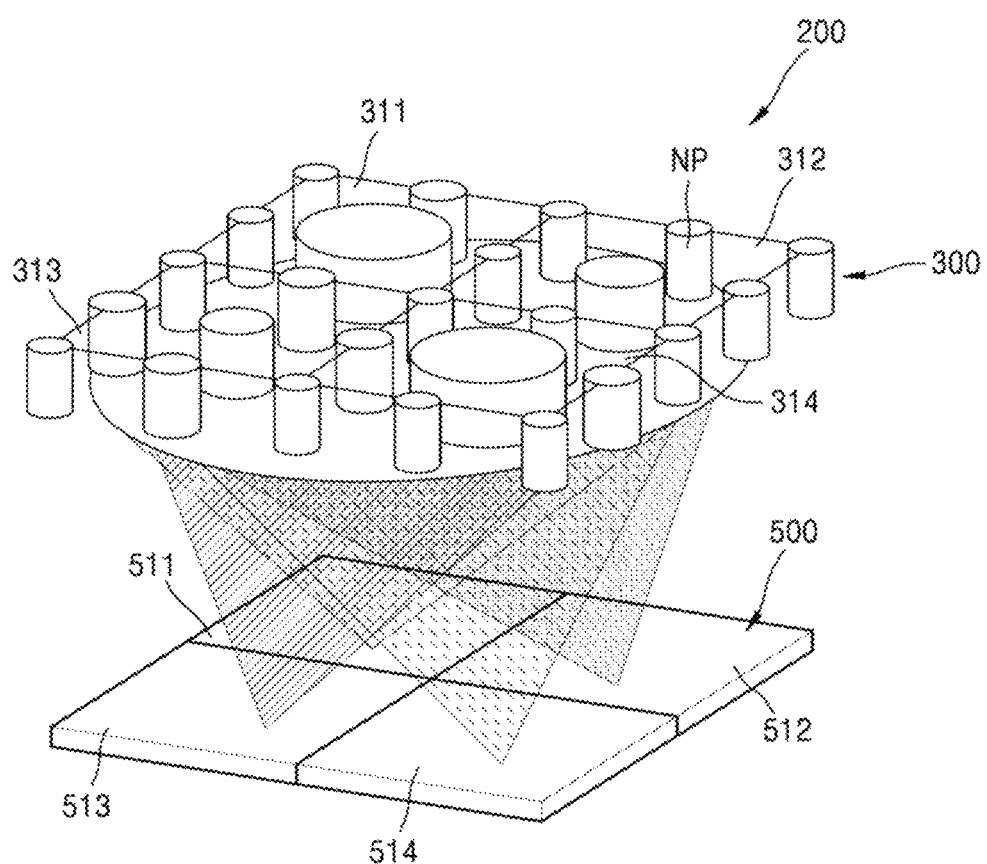

However, the arrangement type of the pixel array 210 is not limited to the Bayer pattern, and there may be various arrangement types other than the Bayer pattern. For example, as in FIG. 3B, the arrangement type of the pixel array may include a CYGM type in which a magenta pixel M, a cyan pixel C, a yellow pixel Y, and a green pixel G constitute one unit pixel. In addition, as in FIG. 3C, the arrangement of an RGBW type in which a green pixel G, a red pixel R, a blue pixel B, and a white pixel W constitute one unit pixel is also possible. Also, although not shown, the unit pixel may have a 3×2 array form. In addition, the pixels of the pixel array 210 may be arranged in various types according to color characteristics of the image sensor 200. Hereinafter, for convenience, the pixel array 210 of the image sensor 200 is described as having a Bayer pattern, but the principles of embodiments described below may be applied to a pixel arrangement other than a Bayer pattern. As shown in FIGS. 4A and 4B, the pixel array of the image sensor 200 includes a sensor substrate 500 including an array of a plurality of photo-sensing cells that sense light, and a color separation lens array 300 arranged in front of the sensor substrate 500 and separating the light according to color to make the separated light enter the plurality of photo-sensing cells.

FIGS. 4A and 4B illustrate an image sensor 200 according to an embodiment. FIG. 4B illustrates a conceptual diagram showing a schematic structure and operation of a color separation lens array 300.

Referring to FIGS. 4A and 4B, a sensor substrate 500 of the image sensor 200 may include a first photo-sensing cell 511, a second photo-sensing cell 512, a third photo-sensing cell 513, and a fourth photo-sensing cell 514, which convert light into an electrical signal. The unit pixels of the first photo-sensing cell 511, the second photo-sensing cell 512, the third photo-sensing cell 513, and the fourth photo-sensing cell 514 may be repeatedly arranged in two dimensions. When the pixel array 210 of the image sensor 200 has a Bayer pattern, the first photo-sensing cell 511 and the fourth photo-sensing cell 514 may correspond to a green pixel G, and one of the second photo-sensing cell 512 and the third photo-sensing cell 513 may correspond to a red pixel R and the other may correspond to a blue pixel B.

The color separation lens array 300 may include a fine structure in each of a plurality of regions 311, 312, 313, and 314 facing a plurality of photo-sensing cells, e.g., the first to fourth photo-sensing cells 511, 512, 513, and 514, respectively. The color separation lens array 300 may be provided to form a phase distribution for condensing light having different wavelengths on adjacent photo-sensing cells to separate incident light according to color. As illustrated in FIG. 4B, the fine structure of the color separation lens array 300 may include a plurality of nanoposts arranged such that one or more nanoposts NP are distributed to form a phase distribution for condensing light of different wavelengths to adjacent photo-sensing cells. As another example, the fine structure of the color separation lens array 300 may be made of a pattern to form a phase distribution for condensing light of different wavelengths to adjacent photo-sensing cells. Hereinafter, a case where the fine structure is made of nanoposts will be described as an example. The signal processor 250 performs, by using a point spread function (PSF) corresponding to each color pixel by the color separation lens array 300 of the image sensor 200, deconvolution on sensing signals of the plurality of photo-sensing cells 511, 512, 513, and 514 of the sensor substrate 500 to process the color image signal acquired by the image sensor 200, and forms a color image corresponding to the processed color image signal. Referring to FIG. 4B, the color separation lens array 300 may include a plurality of regions 311, 312, 313, and 314 that correspond to and face a plurality of photo-sensing cells 511, 512, 513, 514 of the sensor substrate 500 in a one-to-one manner. For example, the color separation lens array 300 may include first to fourth regions 311, 312, 313, and 314 that correspond to and face the first to fourth photo-sensing cells 511, 512, 513, and 514 of the sensor substrate 500 in a one-to-one manner, and the first to fourth regions 311, 312, 313, and 314 may include first to fourth fine structures to form a phase distribution for condensing light of different wavelengths to adjacent photo-sensing cells.

When the first to fourth fine structures each include one or more nanoposts as in FIG. 4B, the first region 311 may include one or more first nanoposts, the second region 312 may include one or more second nanoposts, the third region 313 may include one or more third nanoposts, and the fourth region 314 may include one or more fourth nanoposts. The shapes, sizes, and arrangements of the first to fourth nanoposts may be determined to form a phase at which light having a certain wavelength, which has passed through the color separation lens array 300, is condensed to one of the first to fourth photo-sensing cells 511, 512, 513, and 514 and does not travel to the remaining photo-sensing cells. In addition, each of the plurality of regions included in the color separation lens array 300 may include a plurality of sub-regions, and the plurality of nanoposts may be respectively arranged one-to-one in the plurality of sub-regions. In addition, each of the plurality of regions included in the color separation lens array 300 may include a plurality of sub-regions, and the plurality of nanoposts may be arranged one-to-one at intersections between the plurality of sub-regions.

The image sensor 200 may have a pixel array structure in which unit pixels are repeatedly arranged. For example, the image sensor 200 may have a Bayer pattern structure in which unit pixels, each having four quadrant regions including a blue pixel, a green pixel, a red pixel, and a green pixel, respectively, are repeatedly arranged two-dimensionally in a first direction and a second direction. In this case, among the plurality of nanoposts of the color separation lens array 300, a nanopost provided in a region corresponding to the green pixel from among the plurality of regions may have a larger cross-sectional area than nanoposts provided in regions corresponding to pixels of colors other than the green. In addition, among the plurality of nanoposts, nanoposts provided in a region corresponding to the green pixel from among the plurality of regions may include a nanopost arranged in a central portion and a nanopost arranged in a peripheral portion, which may have a smaller cross-sectional area than the nanopost arranged in the central portion. In addition, nanoposts provided in a region corresponding to the green pixel from among the plurality of regions may have different distribution rules in the first direction and the second direction, and nanoposts provided in regions corresponding to the blue pixel and the red pixel from among the plurality of regions may have symmetrical distribution rules in the first direction and the second direction.

For example, the first photo-sensing cell 511 may sense light having a first wavelength which corresponds to a first pixel, the second photo-sensing cell 512 may sense light having a second wavelength which corresponds to a second pixel, the third photo-sensing cell 513 may sense light having a third wavelength which corresponds to a third pixel, and the fourth photo-sensing cell 514 may sense light having a fourth wavelength which corresponds to a fourth pixel. However, embodiments are not limited thereto. Although not shown in the drawings, a partition wall for cell separation may be further formed at the boundary between the photo-sensing cells.

In the image sensor 200, when the first pixel, the second pixel, the third pixel, and the fourth pixel are the green pixel G, the blue pixel B, the red pixel R, and the green pixel G, respectively, and form a Bayer pattern array, the first photo-sensing cell 511, the second photo-sensing cell 512, the third photo-sensing cell 513, and the fourth photo-sensing cell 514 of the sensor substrate 500 may be arranged to correspond to a Bayer pattern array.

The color separation lens array 300 separates incident light according to color and makes the separated light enter the plurality of photo-sensing cells, for example, the first to fourth photo-sensing cells 511, 512, 513, and 514. As shown in FIG. 4B, the color separation lens array 300 may include a plurality of nanoposts NP.

For example, the color separation lens array 300 may separate incident light according to color, and thus, light having a first wavelength may be incident on the first photo-sensing cell 511 to form the green pixel G, light having a second wavelength may be incident on the second photo-sensing cell 512 to form the blue pixel B, light having a third wavelength may be incident on the third photo-sensing cell 513 to form the red pixel R, and light having the first wavelength may be incident on the fourth photo-sensing cell 514 to form the green pixel G.

The color separation lens array 300 may include a nanopost array in which a plurality of nanoposts NP are arranged according to a certain rule. The nanopost array may be supported by a spacer layer. The spacer layer may maintain a constant gap between the sensor substrate 500 and the color separation lens array 300. The spacer layer may include a material transparent to visible light. For example, the spacer layer may include a dielectric material, such as $SiO_2$ or siloxane-based spin on glass (SOG), having a refractive index lower than that of the nanopost NP of the color separation lens array 300 and having a low absorption rate in a visible band. In FIG. 4B, the illustration of the spacer layer is omitted for convenience to more clearly express separation according to the color of incident light in the color separation lens array 300. The color separation lens array 300 may be further provided with a protective layer for protecting the plurality of nanoposts NP. The protective layer may include a dielectric material having a refractive index lower than that of a material forming the nanoposts NP.

In this case, the rule is applied to parameters such as the shape, size (width and height), interval, and arrangement of the nanoposts NP and may be determined according to a target phase distribution to be implemented by the color separation lens array 300 with respect to incident light. The target phase distribution may be determined considering a target region to be condensed by separating the wavelength of the incident light. The target phase distribution is indicated between the color separation lens array 300 and the target region, but this is merely for convenience of illustration. An actual target phase distribution refers to a phase distribution at a position immediately after incident light passes through the color separation lens array 300, for example, on the lower surface of the color separation lens array 300 or the upper surface of the spacer layer.

The nanoposts NP of the color separation lens array 300 may form a phase distribution in which light of different wavelengths included in the incident light is branched in different directions and condensed. For example, the shape, size, and arrangement of nanoposts NP distributed in first to fourth regions 311, 312, 313, and 314 of the color separation lens array 300 may be determined to form a target phase distribution in which light (e.g., green light) of a first wavelength included in incident light has a first phase distribution, light (e.g., blue light) of a second wavelength included in the incident light has a second phase distribution, and light (e.g., red light) of a third wavelength included in the incident light has a third phase. According to the target phase distribution, specific color light may be condensed at a target position at a certain distance from the array of nanoposts NP.

The nanopost NP may have a shape dimension of a sub-wavelength smaller than a wavelength band in which light is branched. The nanopost NP may have a shape dimension smaller than the shortest wavelength among the first to third wavelengths, and may have a dimension smaller than 400 nm, 300 nm, or 200 nm when incident light is visible light.

The nanopost NP may include a material having a refractive index higher than that of a surrounding material. For example, the nanopost NP may include c-Si, p-Si, a-Si, a Group III-V compound semiconductor (GaP, GaN, GaAs, etc.), SiC, $TiO_2$, SiN, and/or a combination thereof. The nanopost NP having a difference in refractive index from the surrounding material may change the phase of passing light. This is due to a phase delay caused by the shape dimension of the sub-wavelength, and the degree of the phase delay is determined by the detailed shape dimension and arrangement shape of the nanopost NP. The surrounding material may include a dielectric material (e.g., SiO2 or air) having a refractive index lower than that of the nanopost NP.

The first to third wavelengths may be in the range of visible light wavelength bands, but are not limited thereto. Various wavelength bands may be implemented according to the rules of the arranged nanoposts NP.

Hereinafter, an example in which the color separation lens array 300 described above is applied to the pixel array 210 of the image sensor 200 will be described in more detail.

Figure 5A:
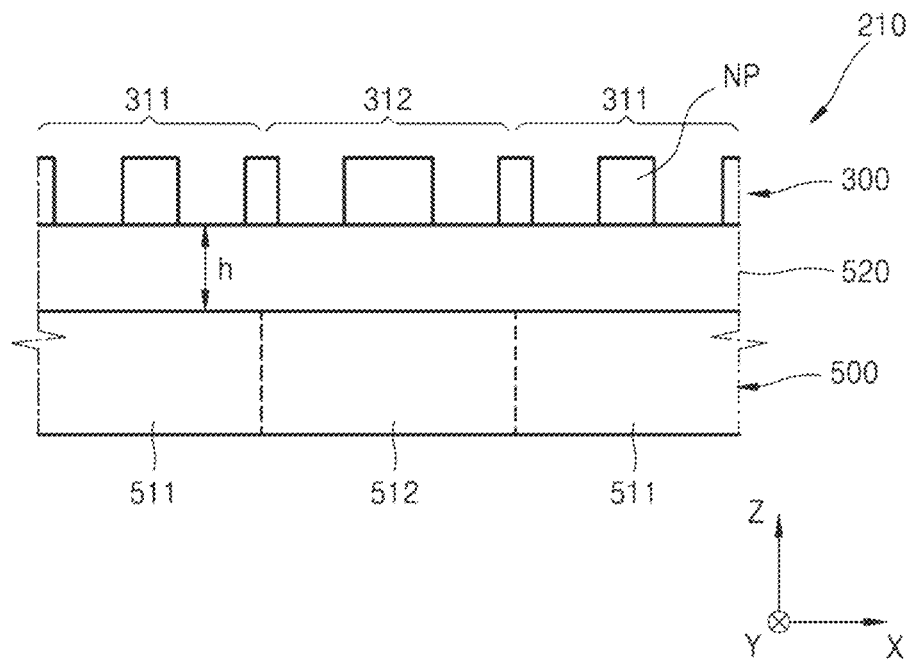
FIGS. 5A and 5B are schematic cross-sectional views of a pixel array of an image sensor according to an embodiment.
Figure 5B:
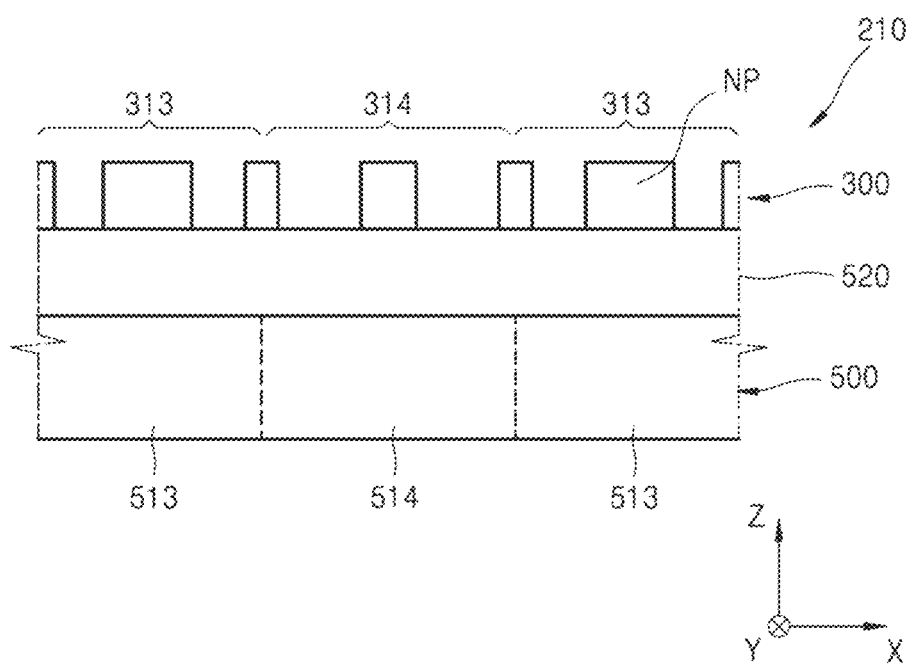

FIGS. 5A and 5B are schematic cross-sectional views of a pixel array of an image sensor according to an embodiment.

Referring to FIGS. 5A and 5B, the pixel array 210 includes a sensor substrate 500 including a plurality of photo-sensing cells for sensing light, a spacer layer 520 that is transparent and arranged on the sensor substrate 500, and a color separation lens array 300 arranged on the spacer layer 520.

The sensor substrate 500 may include a first photo-sensing cell 511, a second photo-sensing cell 512, a third photo-sensing cell 513, and a fourth photo-sensing cell 514, which convert light into an electrical signal. As shown in FIG. 5A, the first photo-sensing cell 511 and the second photo-sensing cell 512 may be alternately arranged in the first direction (X direction). In a cross-section with a different position in the second direction (Y direction), the third photo-sensing cell 513 and the fourth photo-sensing cell 514 may be alternately arranged as shown in FIG. 5B. The area division is for sensing incident light by dividing the incident light in pixel units. For example, the first photo-sensing cell 511 and the fourth photo-sensing cell 514 may sense light of a first wavelength corresponding to a first pixel, the second photo-sensing cell 512 may sense light of a second wavelength corresponding to a second pixel, and the third photo-sensing cell 513 may sense light of a third wavelength corresponding to a third pixel. Hereinafter, the light of the first wavelength, the light of the second wavelength, and the light of the third wavelength may be green light, blue light, and red light, respectively, and the first pixel, the second pixel, and the third pixel may be the green pixel G, the blue pixel B, and the red pixel R, respectively, but are not limited thereto. A partition wall for cell separation may be further formed at the boundary between the photo-sensing cells.

The spacer layer 520 supports the color separation lens array 300 and maintains a constant interval h between the sensor substrate 500 and the color separation lens array 300. The spacer layer 520 may include a material transparent to visible light. For example, the spacer layer 520 may include a dielectric material, such as SiO2 and siloxane-based spin on glass (SOG), having a refractive index lower than that of the nanopost NP of the color separation lens array 300 and having a low absorption rate in the visible light band.

Figure 6:
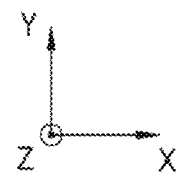
FIG. 6 is a schematic plan view illustrating an arrangement of photo-sensing cells in a pixel array of an image sensor.

The pixel array 210 of the image sensor 200 may have a two-dimensional arrangement. That is, as shown in FIG. 6, in the sensor substrate 500, a plurality of first photo-sensing cells 511, a plurality of second photo-sensing cells 512, a plurality of third photo-sensing cells 513, and a plurality of fourth photo-sensing cells 514 may be two-dimensionally arranged in the first direction (X direction) and the second direction (Y direction), and thus, a first row, in which the first photo-sensing cells 511 and the second photo-sensing cells 512 are alternately arranged, and a second row, in which the third photo-sensing cells 513 and the fourth photo-sensing cells 514 are alternately arranged, may be alternately repeated. In this case, when the pixel array 210 of the image sensor 200 is a Bayer pattern array as shown in FIG. 3A, the first photo-sensing cell 511 and the fourth photo-sensing cell 514 correspond to the green pixel G, the second photo-sensing cell 512 corresponds to the blue pixel B, and the third photo-sensing cell 513 corresponds to the red pixel R. The nanopost array of the color separation lens array 300 may be divided into a plurality of regions, e.g., first to fourth regions 311, 312, 313, and 314, corresponding one-to-one to the first to fourth photo-sensing cells 511, 512, 513, and 514 of the sensor substrate 500, as shown in FIGS. 7A and 7B.

FIG. 6 is a schematic plan view illustrating an arrangement of photo-sensing cells in a pixel array of an image sensor. FIG. 7A is a plan view illustrating an arrangement of a plurality of nanoposts in a plurality of regions of a color separation lens array, the arrangement corresponding to an arrangement of photo-sensing cells of a sensor substrate of an image sensor, and FIG. 7B is an enlarged and detailed plan view of a portion of FIG. 7A.

For example, when the pixel array of the image sensor 200 is a Bayer pattern array, one unit pixel includes four quadrant regions and first to fourth quadrants may be a blue pixel B, a green pixel G, a red pixel R, and a green pixel G, respectively. Unit pixels are repeatedly arranged two-dimensionally in the first direction (X direction) and the second direction (Y direction).

Figure 7A:
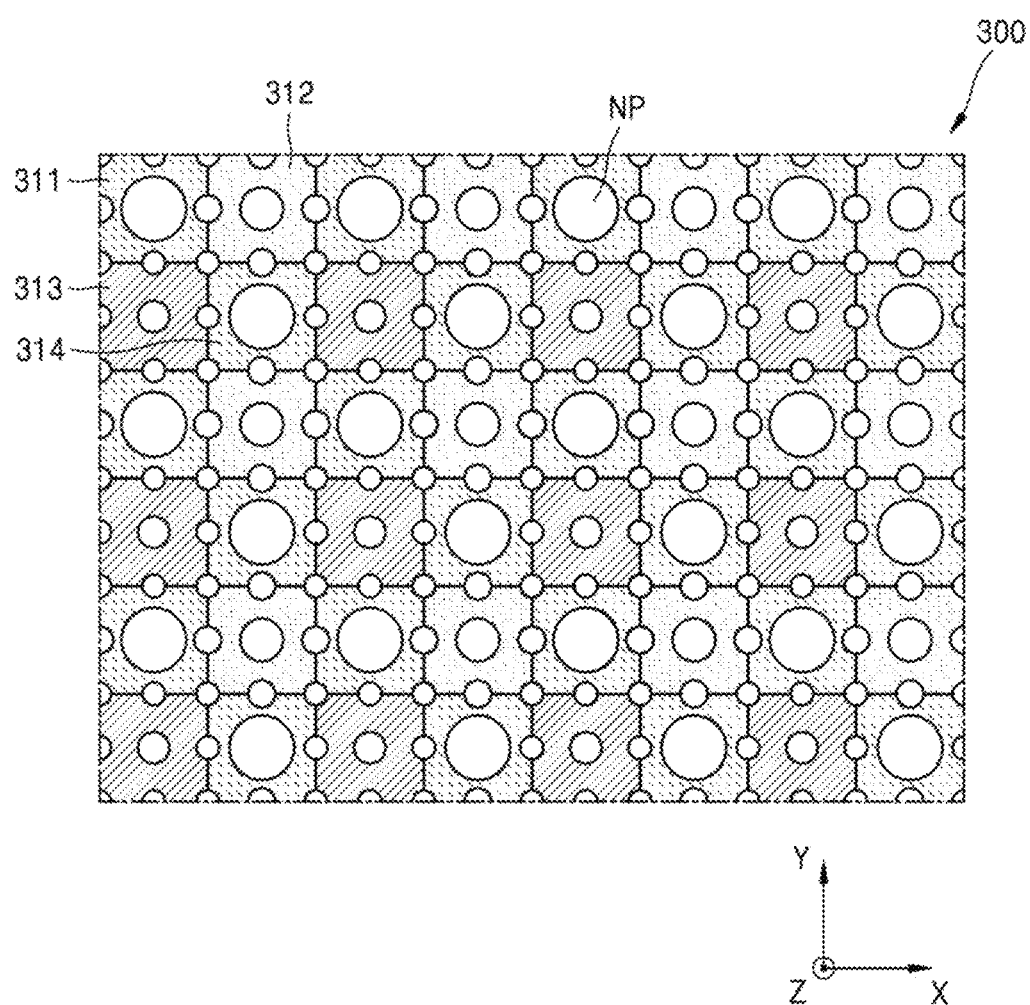
FIG. 7A is a plan view illustrating an arrangement of a plurality of nanoposts in a plurality of regions of a color separation lens array, the arrangement corresponding to an arrangement of photo-sensing cells of a sensor substrate of an image sensor.
Figure 7B:
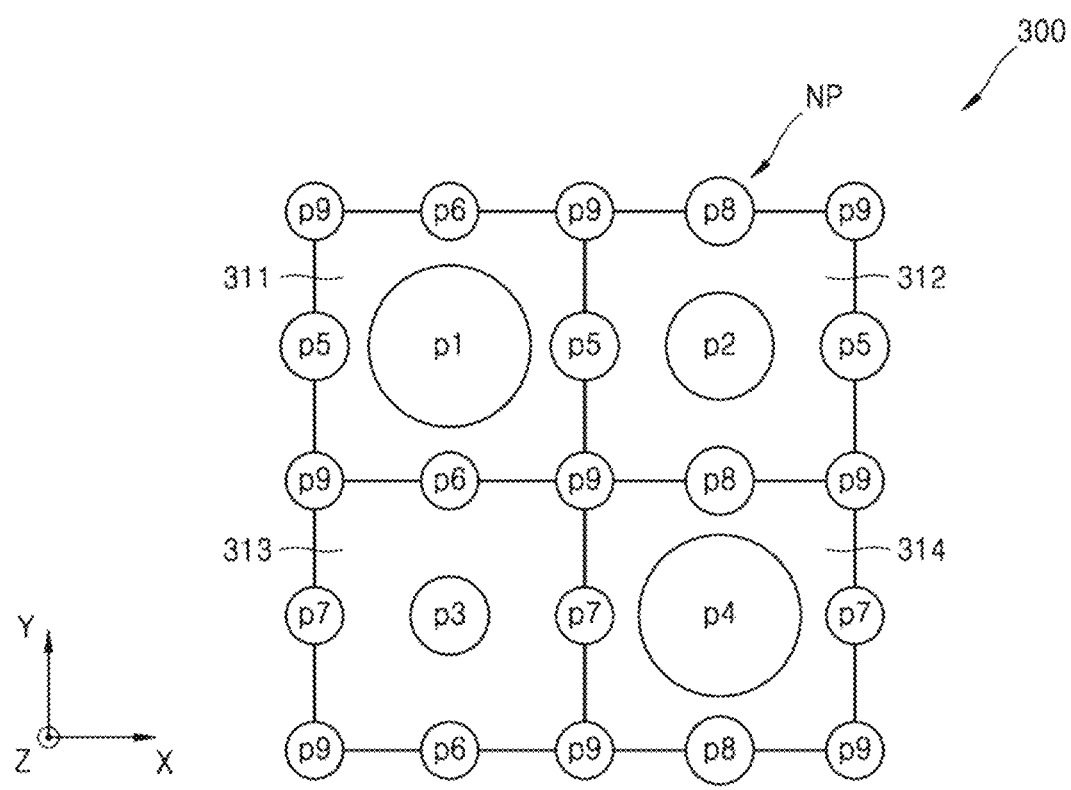
FIG. 7B is an enlarged and detailed plan view of a portion of FIG. 7A.

Referring to FIGS. 6, 7A, and 7B, in the unit cells, the first photo-sensing cell 511 and the first region 311 of the color separation lens array 300 corresponding thereto may correspond to the green pixel G, and the second photo-sensing cell 512 and the second region 312 of the color separation lens array 300 corresponding thereto may correspond to the blue pixel B. The third photo-sensing cell 513 and the third region 313 of the color separation lens array 300 corresponding thereto may correspond to the red pixel R, and the fourth photo-sensing cell 514 and the fourth region 314 of the color separation lens array 300 corresponding thereto may correspond to the green pixel G.

Referring to FIGS. 6 and 7A, the nanopost array of the color separation lens array 300 is divided into the first to fourth regions 311, 312, 313, and 314 corresponding to and facing the first to fourth photo-sensing cells 511, 512, 513, and 514, respectively. One or more nanoposts NP may be arranged in each of the first to fourth regions 311, 312, 313, and 314, and at least one of the shape, size, and arrangement of each of the nanoposts NP may vary depending on regions.

The shapes, sizes, and arrangement of the plurality of nanoposts NP of the color separation lens array 300 may be determined to form a phase distribution for condensing light having different wavelengths on the first photo-sensing cell 511 and the second photo-sensing cell 512 of the sensor substrate 500, which are adjacent to each other. In addition, the shapes, sizes, and arrangement of the plurality of nanoposts NP of the color separation lens array 300 may be determined to form a phase distribution for condensing light having different wavelengths on the third photo-sensing cell 513 and the fourth photo-sensing cell 514 of the sensor substrate 500, which are adjacent to each other.

For example, when the pixel array 210 of the image sensor 200 is a Bayer pattern array, because, as shown in FIG. 7A, the first region 311 of the color separation lens array 300 corresponds to the green pixel G, the second region 312 of the color separation lens array 300 corresponds to the blue pixel B, the third region 313 of the color separation lens array 300 corresponds to the red pixel R, and the fourth region 314 of the color separation lens array 300 corresponds to the green pixel G, nanoposts NP having different cross-sectional areas may be arranged in the central portions of regions of the color separation lens array 300 corresponding to the green pixel G, the blue pixel B, and the red pixel R, and nanoposts NP may be arranged at the center of each of the boundaries between pixels and at the intersection between the boundaries. The nanoposts NP arranged at the boundaries between the pixels may have smaller cross-sectional areas than the nanoposts NP arranged at the central portions of the pixels.

FIG. 7B illustrates the arrangement of nanoposts NP in some regions of FIG. 7A, that is, the regions 311, 312, 313, and 314 constituting a unit pattern array. In FIG. 7B, the nanoposts NP are indicated as p1 to p9 according to detailed positions in the unit pattern array. Referring to FIG. 7B, the cross-sectional areas of the nanopost p1 arranged in the central portion of the region 311 and the nanopost p4 arranged in the central portion of the region 314 are greater than the cross-sectional area of the nanopost p2 arranged in the central portion of the region 312 or the nanopost p3 arranged in the central portion of the region 313, and the cross-sectional area of the nanopost p2 arranged in the central portion of the region 312 is greater than the cross-sectional area of the nanopost p3 arranged in the central portion of the region 313. However, this is only an example, and nanoposts NP having various shapes, sizes, and arrangements may be used as needed.

That is, the cross-sectional areas of nanoposts NP arranged in the central portions of the regions 311 and 314 corresponding to the green pixel G are greater than the cross-sectional area of a nanopost NP arranged in the central portion of the region 312 corresponding to the blue pixel B or the region 313 corresponding to the red pixel R, and the cross-sectional area of the nanopost NP arranged in the central portion of the region 312 corresponding to the blue pixel B is greater than the cross-sectional area of the nanopost NP arranged in the central portion of the region 313 corresponding to the red pixel R. However, this is only an example, and nanoposts NP having various shapes, sizes, and arrangements may be used as needed. In this case, the cross-sectional area denotes the area of a cross-section perpendicular to the height direction (Z direction) of the nanopost NP.

The nanoposts NP provided in the regions 311 and 314 corresponding to the green pixel G may have different distribution rules in the first direction (X direction) and the second direction (Y direction). That is, the nanoposts NP provided in the regions 311 and 314 corresponding to the green pixel G may have an asymmetric size arrangement in the first direction (X direction) and the second direction (Y direction). As shown in FIG. 7B, the cross-sectional area of a nanopost p5 positioned at the boundary between the region 311 and the region 312 adjacent to the region 311 in the first direction (X direction) may be different from the cross-sectional area of a nanopost p6 positioned at the boundary between the region 311 and the region 313 adjacent to the region 311 in the second direction (Y direction). Likewise, the cross-sectional area of a nanopost p7 positioned at the boundary between the region 314 and the region 313 adjacent to the region 314 in the first direction (X direction) may be different from the cross-sectional area of a nanopost p8 positioned at the boundary between the region 314 and the region 312 adjacent to the region 314 in the second direction (Y direction).

On the other hand, the nanoposts NP provided in the regions 312 and 313 corresponding to the blue pixel B and the red pixel R may have a symmetrical distribution rule in the first direction (X direction) and the second direction (Y direction). As shown in FIG. 7B, in the region 312 corresponding to the blue pixel B, the cross-sectional area of the nanopost p5 placed at the boundary between adjacent pixels in the first direction (X direction) may be equal to the cross-sectional area of the nanopost p8 placed at the boundary between adjacent pixels in the second direction (Y direction). In addition, also in the region 313 corresponding to the red pixel R, the cross-sectional area of the nanopost p7 placed at the boundary between adjacent pixels in the first direction (X direction) may be equal to the cross-sectional area of the nanopost p6 placed at the boundary between adjacent pixels in the second direction (Y direction).

The nanoposts p9 arranged at four corners of each of the region 311, the region 312, the region 313, and the region 314, that is, at positions where the four regions intersect one another, have the same cross-sectional area. This distribution is caused because, in the Bayer pattern array, pixels adjacent to the blue pixel B and the red pixel R in the first direction (X direction) and the second direction (Y direction) are of the same type, that is, are green pixels G, whereas a pixel adjacent to the green pixel G in the first direction (X direction) is the blue pixel B and a pixel adjacent to the green pixel G in the second direction (Y direction) is the red pixel R that is different from the blue pixel B. Therefore, in the second region 312 and the third region 313 respectively corresponding to the blue pixel B and the red pixel R, the nanoposts NP may be arranged in a form of 4-fold symmetry. In addition, in the first and fourth regions 311 and 314 corresponding to the green pixel G, the nanoposts NP may be arranged in a form of 2-fold symmetry. In particular, the region 311 and the region 314 are rotated 90 degrees with respect to each other.

In FIGS. 4B, 7A, and 7B, the plurality of nanoposts NP are illustrated as having symmetrical circular cross-sectional shapes, but are not limited thereto. Some nanoposts may have asymmetrical cross-sectional shapes. For example, a nanopost having an asymmetric cross-sectional shape having different widths in the first direction (X direction) and the second direction (Y direction) may be employed in the regions 311 and 314 corresponding to the green pixel G. A nanopost having a symmetric cross-sectional shape having the same width in the first direction (X direction) and the second direction (Y direction) may be employed in the region 312 corresponding to the blue pixel B and the region 313 corresponding to the red pixel R.

The arrangement rule of the nanopost array shown in the drawings is only an example for realizing a target phase distribution to separate and condense light having a first wavelength onto the first photo-sensing cell 511 and the fourth photo-sensing cell 514, to separate and condense light having a second wavelength onto the second photo-sensing cell 512, and to separate and condense light having a third wavelength onto the third photo-sensing cell 513, but is not limited thereto.

The shapes, sizes, and arrangements of the nanoposts NP provided in the first to fourth regions 311, 312, 313, and 314 of the color separation lens array 300 may be determined to form a phase at which light (e.g., green (G) light) of a first wavelength at a position after passing through the color separation lens array 300 is condensed to the first and fourth photo-sensing cells 511 and 514 and does not travel to the second and third photo-sensing cells 512 and 513 adjacent to the first and fourth photo-sensing cells 511 and 514. The shapes, sizes, and arrangements of the nanoposts NP provided in the first to fourth regions 311, 312, 313, and 314 of the color separation lens array 300 may be determined to form a phase at which light (e.g., blue (B) light) having a second wavelength at a position after passing through the color separation lens array 300 is condensed to the second photo-sensing cell 512 and does not travel to the first, third, and fourth photo-sensing cells 511, 513, and 514 adjacent to the second photo-sensing cell 512. In addition, the shapes, sizes, and arrangements of the nanoposts NP provided in the first to fourth regions 311, 312, 313, and 314 of the color separation lens array 300 may be determined to form a phase at which light (e.g., red (R) light) having a third wavelength at a position after passing through the color separation lens array 300 is condensed to the third photo-sensing cell 513 and does not travel to the first, second, and fourth photo-sensing cells 511, 512, and 514 adjacent to the third photo-sensing cell 513.

The shapes, sizes, and arrangements of the nanoposts NP satisfying all of these conditions may be determined, and the color separation lens array 300 may allow light immediately after passing through the color separation lens array 300 to have the following target phase distribution. At a position immediately after passing through the color separation lens array 300, that is, on the lower surface of the color separation lens array 300 or the upper surface of the spacer layer, the target phase distribution to be implemented by the color separation lens array 300 may be a distribution in which the phase of light of a first wavelength is $2N\pi$ in the central portions of the first and fourth regions 311 and 314 corresponding to the first and fourth photo-sensing cells 511 and 514 and is $(2N-1)\pi$ in the central portion of the second region 312 corresponding to the second photo-sensing cell 512 and in the central portion of the third region 313 corresponding to the third photo-sensing cell 513. Here, N is an integer greater than 0. In other words, the phase of light of a first wavelength at a position immediately after passing through the color separation lens array 300 may be maximum in the central portion of the first region 311 and the central portion of the fourth region 314, may gradually decrease in a concentric circle shape as the distance from the central portion of the first region 311 and the central portion of the fourth region 314 increases, and may be minimized in the central portion of the second region 312 and the central portion of the third region 313. For example, in the case of N=1, the phase of the light of the first wavelength at a position after passing through the color separation lens array 300 may be $2\pi$ in the central portion of the first region 311 and the central portion of the fourth region 314 and may be $\pi$ in the central portion of the second region 312 and the central portion of the third region 313. In this case, the phase may refer to a phase value relative to a phase immediately before light passes through the nanopost NP.

In addition, in the target phase distribution, the phase of light of a second wavelength at a position immediately after passing through the color separation lens array 300 may be $2M\pi$ in the central portion of the second region 312 corresponding to the second photo-sensing cell 512, may be $(2M-1)\pi$ in the central portion of the first region 311 corresponding to the first photo-sensing cell 511 and in the central portion of the fourth region 314 corresponding to the fourth photo-sensing cell 514, and may be greater than $(2M-2)\pi$ and less than $(2M-1)\pi$ in the central portion of the third region 313 corresponding to the third photo-sensing cell 513. Here, M is an integer greater than 0. In other words, the phase of light of a second wavelength at a position immediately after passing through the color separation lens array 300 may be maximum in the central portion of the second region 312, may gradually decrease in a concentric circle shape as the distance from the central portion of the second region 312 increases, and may be locally minimized in the central portion of the third region 313. For example, in the case of M=1, the phase of the light of the second wavelength at a position after passing through the color separation lens array 300 may be $2\pi$ in the central portion of the second region 312, may be $\pi$ in the central portion of the first region 311 and the central portion of the fourth region 314, and may be about $0.2\pi$ to about $0.7\pi$ in the central portion of the third region 313.

In addition, in the target phase distribution, the phase of light of a third wavelength at a position immediately after passing through the color separation lens array 300 may be $2L\pi$ in the central portion of the third region 313 corresponding to the third photo-sensing cell 513, may be $(2L-1)\pi$ in the central portion of the first region 311 corresponding to the first photo-sensing cell 511 and in the central portion of the fourth region 314 corresponding to the fourth photo-sensing cell 514, and may be greater than $(2L-2)\pi$ and less than $(2L-1)\pi$ in the central portion of the second region 312 corresponding to the second photo-sensing cell 512. Here, L is an integer greater than 0. In other words, the phase of light of a third wavelength at a position immediately after passing through the color separation lens array 300 may be maximum in the central portion of the third region 313, may gradually decrease in a concentric circle shape as the distance from the central portion of the third region 313 increases, and may be locally minimized in the central portion of the second region 312. For example, in the case of L=1, the phase of the light of the third wavelength at a position after passing through the color separation lens array 300 may be $2\pi$ in the central portion of the third region 313, may be $\pi$ in the central portion of the first region 311 and the central portion of the fourth region 314, and may be about $0.2\pi$ to about $0.7\pi$ in the central portion of the second region 313.

The target phase distribution refers to the phase distribution of light at the position immediately after passing through the color separation lens array 300, that is, on the lower surface of the color separation lens array 300 or the upper surface of the spacer layer. When light passing through the color separation lens array 300 has such a phase distribution, lights of the first to third wavelengths are collected in the first to fourth photo-sensing cells 511, 512, 513, and 514 of the sensor substrate 500, respectively. In other words, it is possible to obtain an optical effect that light transmitted through the color separation lens array 300 is branched according to wavelength and travels in different directions to be condensed.

In this way, a certain propagation distance requirement may be determined in order to condense light of a corresponding wavelength to a photo-sensing cell corresponding thereto, and accordingly, a thickness of the spacer layer may be determined. The thickness of the spacer layer may vary depending on a wavelength A of the light to be branched, a pixel size, and an arrangement period p of the photo-sensing cells. The thickness of the spacer layer may be greater than a center wavelength λ of a visible light wavelength band to be branched. Compared with the arrangement period p of the photo-sensing cells, which is the distance between the centers of adjacent photo-sensing cells, the thickness of the spacer layer may be within a range of about 1p to about 3p. Specifically, the thickness of the spacer layer may be within a range of about 500 nm to about 5 μm.

Figure 8A:
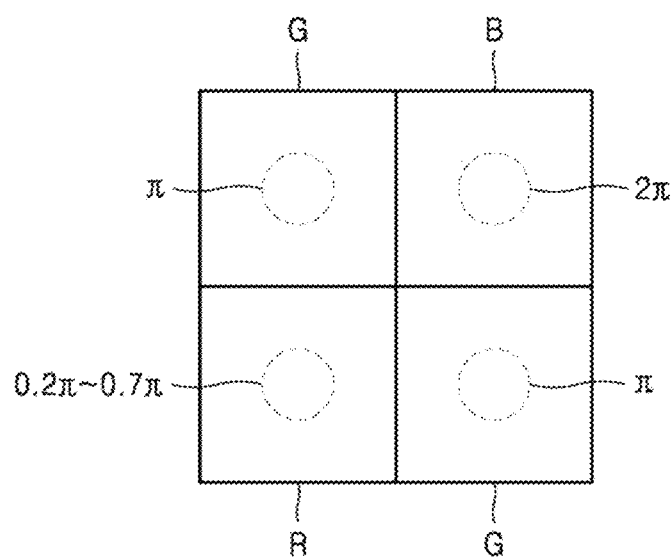
FIGS. 8A and 8B are diagrams illustrating a transfer simulation of a phase distribution of blue light passing through a color separation lens array and a focusing distribution of blue light in opposing photo-sensing cells.
Figure 8B:
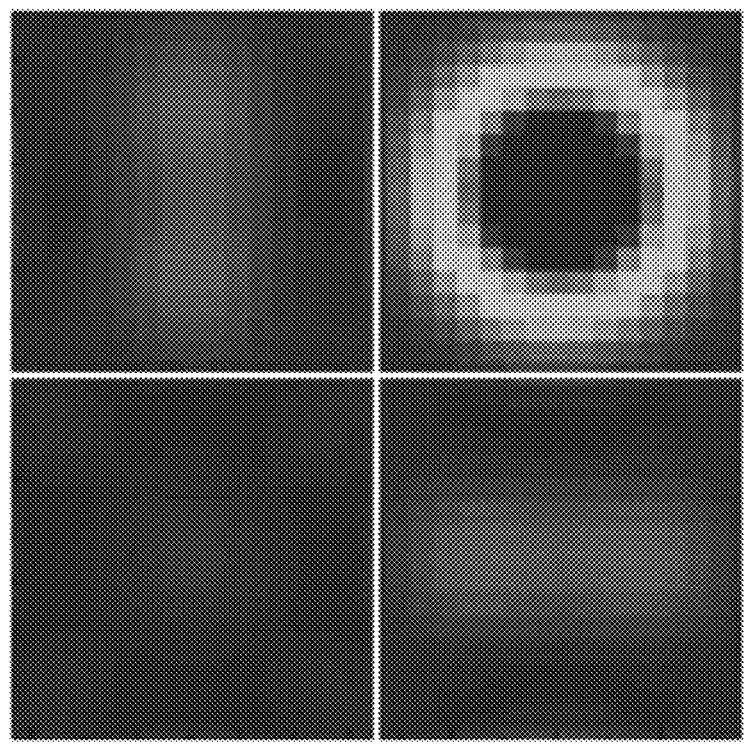
Figures 8C, 8D:
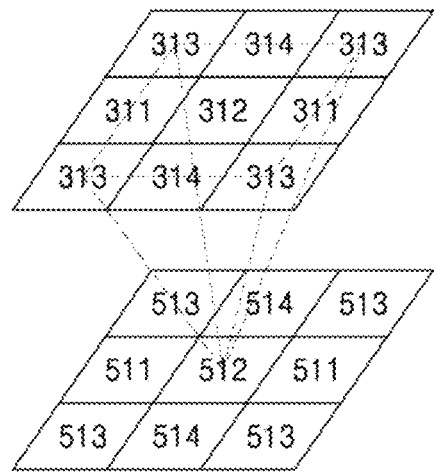
FIG. 8C is a diagram illustrating a direction of blue light incident on and around a second region of the color separation lens array corresponding to a blue pixel.
FIG. 8D is a diagram illustrating a microlens array that acts equivalently to the color separation lens array with respect to blue light.

FIGS. 8A and 8B are diagrams illustrating a transfer simulation of a phase distribution of blue light passing through the color separation lens array and a focusing distribution of blue light in opposing photo-sensing cells, FIG. 8C is a diagram illustrating a direction of blue light incident on and around the second region 312 of the color separation lens array 300 corresponding to a blue pixel B, and FIG. 8D is a diagram illustrating a microlens array that acts equivalently to the color separation lens array 300 with respect to blue light.

According to the phase distribution of the blue light illustrated in FIG. 8A, a phase at the central portion of a region corresponding to blue pixel B may be approximately $2\pi$, a phase at the central portion of a region corresponding to an adjacent green pixel G may be approximately $\pi$, and a phase in the central portion of a region corresponding to the red pixel R in the diagonal direction may represent a value approximately smaller than $\pi$ (e.g., about $0.2\pi$ to about $0.7\pi$). The phase distribution may represent a focusing distribution of the blue light as shown in FIG. 8B. Due to the phase distribution, the blue light is mostly focused on the second photo-sensing cell 512 of the sensor substrate 500 corresponding to the blue pixel B, and rarely reaches the first, third, and fourth photo-sensing cells 511, 513, and 514 corresponding to the other pixels.

As a result, the blue light incident on and around the second region 312 corresponding to the blue pixel B passes through the color separation lens array 300 and then travels as shown in FIG. 8C. For example, among incident lights incident on the second region 312 of the color separation lens array 300 and some of the other regions surrounding the second region 312, the blue light is condensed on the second photo-sensing cell 512 directly under the second region 312. In other words, blue light from the second region 312 corresponding to the blue pixel B, blue light from two first regions 311 adjacent to the second region 312 in a horizontal direction, blue light from two fourth regions 314 adjacent to the second region 312 in a longitudinal direction, and blue light from four third regions 313 adjacent to the second region 312 in a diagonal direction are incident on one blue pixel B.

Accordingly, as illustrated in FIG. 8D, the color separation lens array 300 may function equivalent to an array of a plurality of microlens ML1 arranged around the second photo-sensing cell 512 for blue light. Because each equivalent microlens ML1 is larger than the corresponding second photo-sensing cell 512, the blue light incident on a region of the second photo-sensing cell 512 as well as blue light incident on another region surrounding the second photo-sensing cell 512 may be condensed onto the second photo-sensing cell 512. For example, each microlens ML1 may be about 4 times larger than the corresponding second photo-sensing cell 512, and the four sides of each microlens ML1 may be parallel to the four sides of the second photo-sensing cell 512.

Figure 9A:
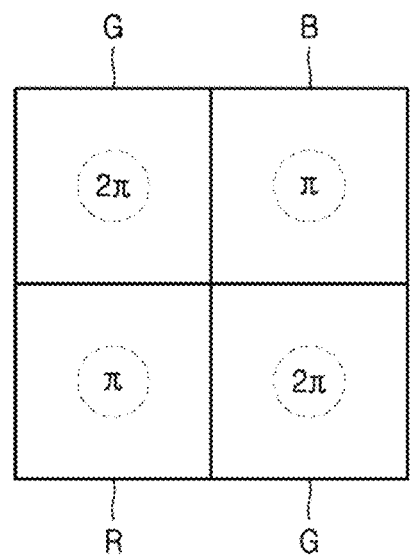
FIGS. 9A and 9B are diagrams illustrating a transfer simulation of a phase distribution of green light passing through a color separation lens array and a focusing distribution of green light in opposing photo-sensing cells.
Figure 9B:
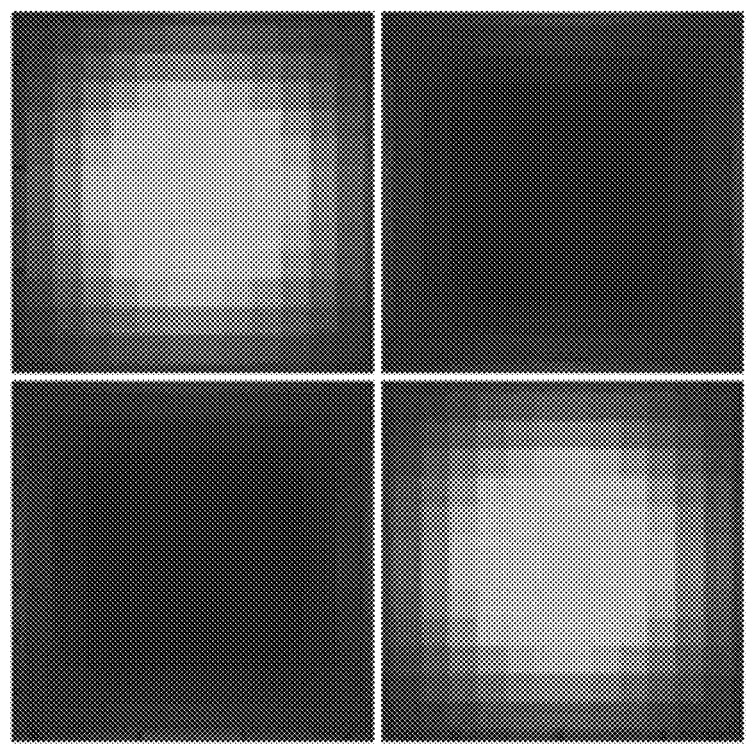
Figure 9C:
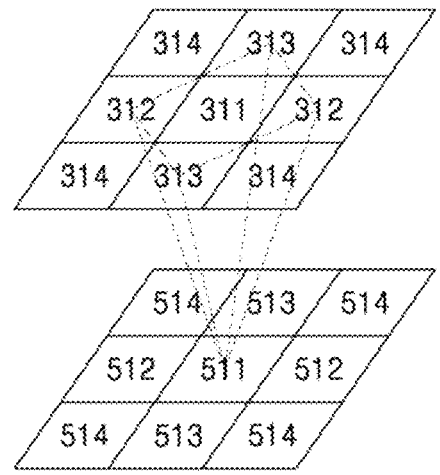
FIG. 9C is a diagram illustrating a direction of green light incident on and around a first region of the color separation lens array corresponding to a green pixel.
Figure 9D:
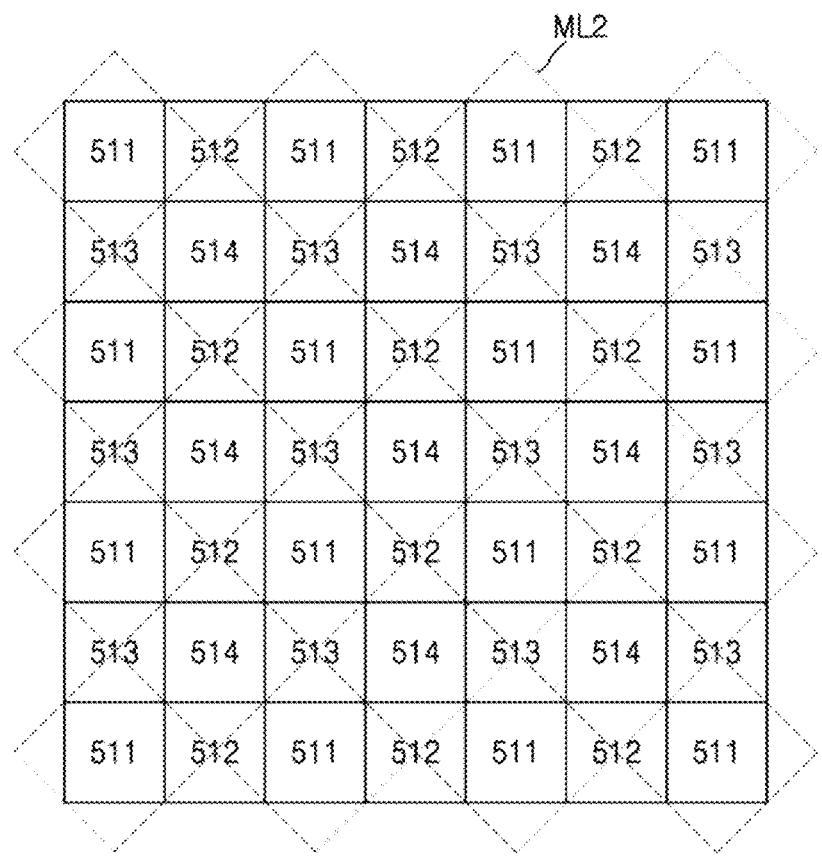
FIG. 9D is a diagram illustrating a microlens array that acts equivalently to the color separation lens array for green light.

FIGS. 9A and 9B are diagrams illustrating a transfer simulation of a phase distribution of green light passing through the color separation lens array 300 and a focusing distribution of green light in opposing photo-sensing cells, FIG. 9C is a diagram illustrating a direction of green light incident on and around the first region 311 of the color separation lens array 300 corresponding to a green pixel, and FIG. 9D is a diagram illustrating a microlens array that acts equivalently to the color separation lens array 300 for green light.

According to the phase distribution of green light exemplarily shown in FIG. 9A, the phase at the central portion of the region corresponding to the green pixel G may be about $2\pi$, and the phase at the central portions of the regions corresponding to the blue pixel B and the red pixel R adjacent to the green pixel G may represent a value of about $\pi$. The above phase distribution may represent a focusing distribution of the green light as shown in FIG. 9B. Due to the phase distribution, the green light is branched to be condensed on the first and fourth photo-sensing cells 511 and 514 corresponding to two green pixels G, and rarely reaches the second and third photo-sensing cells 512 and 513 corresponding to the other pixels.

As a result, the green light incident on and around the first and fourth regions 311 and 314 corresponding to the green pixel G passes through the color separation lens array 300 and then travels as shown in FIG. 9C. For example, among incident pieces of light incident on the first region 311 of the color separation lens array 300 and some of the other regions surrounding the first region 311, the green light is condensed on the first photo-sensing cell 511 directly under the first region 311. In other words, green light from the first region 311 or the fourth region 314 corresponding to the green pixel G and green light from two second regions 312 and two third regions 313 adjacent to the first region 311 or the fourth region 314 in the horizontal direction and longitudinal direction are incident one green pixel G.

Accordingly, as illustrated in FIG. 9D, the color separation lens array 300 may function equivalent to an array of a plurality of microlens ML2 arranged around the first photo-sensing cell 511 and the fourth photo-sensing cell 514 for green light. Because each equivalent microlens ML2 is larger than the corresponding first photo-sensing cell 511 or fourth photo-sensing cell 514, the green light incident on regions of the first photo-sensing cell 511 and the fourth photo-sensing cell 514 as well as green light incident on another region surrounding the first photo-sensing cell 511 and the fourth photo-sensing cell 514 may be condensed onto the first photo-sensing cell 511 and the fourth photo-sensing cell 514. For example, each microlens ML2 may be about twice as large as the corresponding first photo-sensing cell 511 or fourth photo-sensing cell 514, and may be arranged to contact with respect to the corresponding first photo-sensing cell 511 and fourth photo-sensing cell 514 in a diagonal direction.

Figure 10A:
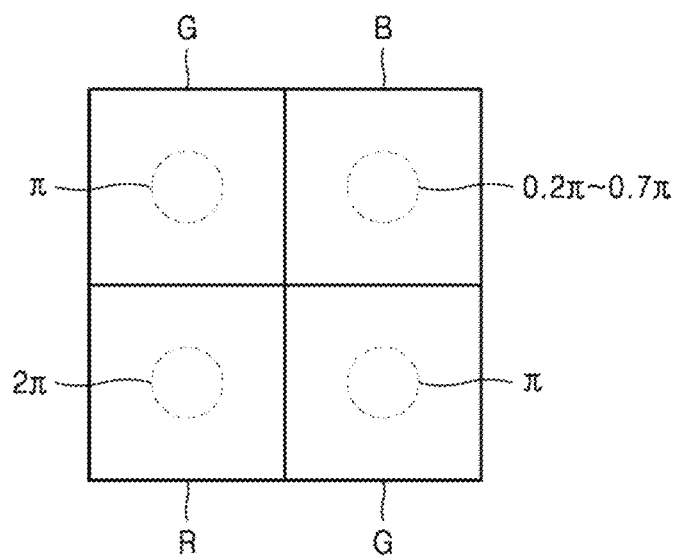
FIGS. 10A and 10B are diagrams illustrating a transfer simulation of a phase distribution of red light passing through a color separation lens array and a focusing distribution of red light in opposing photo-sensing cells.
Figure 10B:
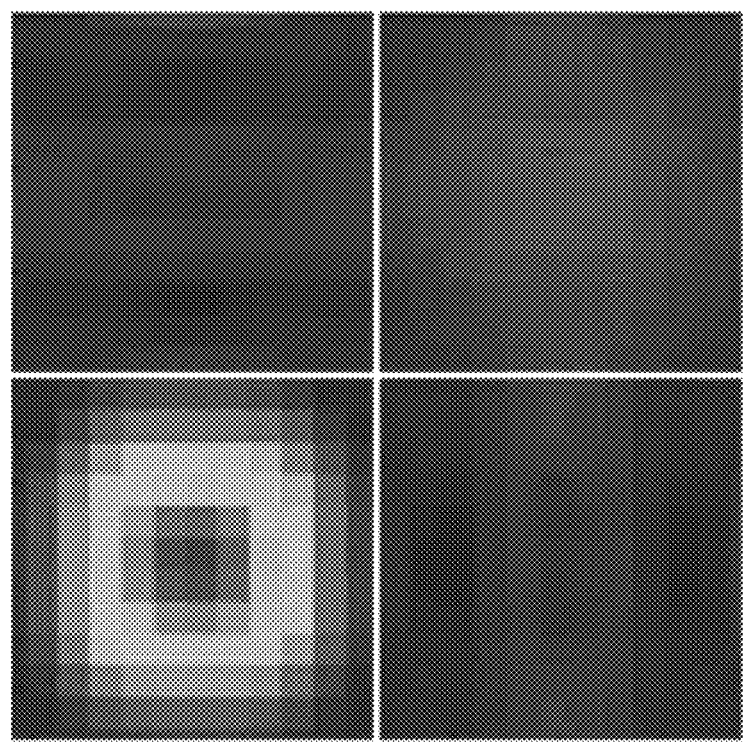
Figures 10C, 10D:
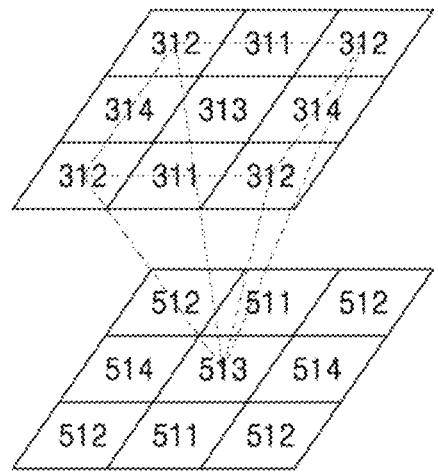
FIG. 10D is a diagram illustrating a microlens array that acts equivalently to the color separation lens array for red light.

FIGS. 10A and 10B are diagrams illustrating a transfer simulation of a phase distribution of red light passing through the color separation lens array 300 and a focusing distribution of red light in opposing photo-sensing cells, FIG. 10O is a diagram illustrating a direction of red light incident on and around the third region 313 of the color separation lens array 300 corresponding to a red pixel, and FIG. 10D is a diagram illustrating a microlens array that acts equivalently to the color separation lens array 300 for red light. According to the phase distribution of red light illustrated in FIG. 10A, a phase at the central portion of a region corresponding to the red pixel R may be approximately $2\pi$, a phase at the central portion of a region corresponding to an adjacent green pixel G may be approximately 1T and a phase in the central portion of a region corresponding to the blue pixel B in the diagonal direction may represent a value approximately smaller than $\pi$ (e.g., about $0.2\pi$ to about $0.7\pi$). The above phase distribution may represent a focusing distribution of the red light as shown in FIG. 10B. Due to the phase distribution, the red light is condensed on the third photo-sensing cell 513 of the sensor substrate 500 corresponding to the red pixel R and rarely reaches the first, second, and fourth photo-sensing cells 511, 512, and 514 corresponding to the other pixels.

As a result, the light incident on and around the third region 313 corresponding to the red pixel R passes through the color separation lens array 300 and then travels as shown in FIG. 10O. For example, among incident pieces of light incident on the third region 313 of the color separation lens array 300 and some of the other regions surrounding the third region 313, the red light is condensed on the third photo-sensing cell 513 directly under the third region 313. In other words, red light from the third region 313 corresponding to the red pixel R, red light from two fourth regions 314 adjacent to the third region 313 in a horizontal direction, red light from two first regions 311 adjacent to the third region 313 in a longitudinal direction, and red light from four second regions 312 adjacent to the third region 313 in a diagonal direction are incident on one red pixel R.

Accordingly, as illustrated in FIG. 10D, the color separation lens array 300 may function equivalent to a plurality of microlens ML3 arrays arranged around the third photo-sensing cell 513 for red light. Because each equivalent microlens ML3 is larger than the corresponding third photo-sensing cell 513, the red light incident on a region of the third photo-sensing cell 513 as well as red light incident on another region surrounding the third photo-sensing cell 513 may be condensed onto the third photo-sensing cell 513. For example, each microlens ML3 may be about 4 times larger than the corresponding third photo-sensing cell 513, and the four sides of each microlens ML3 may be parallel to the four sides of the third photo-sensing cell 513.

When the results shown in FIGS. 8C, 8D, 9C, 9D, 100, and 10D are expressed differently, among the incident pieces of light incident on the first region 311 of the color separation lens array 300, the green light travels toward the central portion of the first photo-sensing cell 511 corresponding to the first region 311, the blue light travels toward the central portion of the second photo-sensing cell 512 around the first photo-sensing cell 511 corresponding to the first region 311, and the red light travels toward the central portion of the third photo-sensing cell 513 around the first photo-sensing cell 511 corresponding to the first region 311. In addition, among the incident pieces of light incident on the second region 312 of the color separation lens array 300, the blue light travels toward the central portion of the second photo-sensing cell 512 corresponding to the second region 312, the green light travels toward the central portions of the first photo-sensing cell 511 and the fourth photo-sensing cell 514 around the second photo-sensing cell 512 corresponding to the second region 312, and the red light travels toward the central portion of the third photo-sensing cell 513 around the second photo-sensing cell 512 corresponding to the second region 312. Similarly, among the incident light incident on the third region 313 of the color separation lens array 300, the red light travels toward the central portion of the third photo-sensing cell 513 corresponding to the third region 313, the green light travels toward the central portion of the first photo-sensing cell 511 and the fourth photo-sensing cell 514 around the third photo-sensing cell 513 corresponding to the third region 313, and the blue light travels toward the central portion of the second photo-sensing cell 512 around the third photo-sensing cell 513 corresponding to the third region 313. Finally, among the incident light incident on the fourth region 314 of the color separation lens array 300, the green light travels toward the central portion of the fourth photo-sensing cell 514 corresponding to the fourth region 314, the blue light travels toward the central portion of the second photo-sensing cell 512 around the fourth photo-sensing cell 514 corresponding to the fourth region 314, and the red light travels toward the central portion of the third photo-sensing cell 513 around the fourth photo-sensing cell 514 corresponding to the fourth region 314.

This color separation and condensing of light may be achieved more effectively by properly setting the thickness of the spacer layer. For example, when a theoretical thickness of the spacer layer is ht, a refractive index of the spacer layer with respect to a wavelength of λ0 is n, and a pitch of the photo-sensing cells is p, the following equation 1 may be satisfied.

$$h_t = \frac{np^2}{\lambda_0} - \frac{\lambda_0}{4n} \qquad \text{[Equation 1]}$$

Here, the theoretical thickness ht of the spacer layer may mean the focal length at which light having a wavelength of λ0 is condensed on the upper surface of the photo-sensing cell 511, 512, 513, or 514 by the color separation lens array 300. In other words, the light having the wavelength of λ0 may be focused at a distance ht from a lower surface of the color separation lens array 300 while passing through the color separation lens array 300.

As described in Equation 1, the theoretical thickness ht of the spacer layer may vary according to the pitch p of the photo-sensing cells 511, 512, 513, and 514 and the refractive index n of the spacer layer. For example, assuming that the center wavelength λ0 of the visible light band is about 540 nm, the pitch p of the photo-sensing cells 511, 512, 513, and 514 is about 0.8 μm, and the refractive index n of the spacer layer at a wavelength of about 540 nm is about 1.46, the theoretical thickness ht of the spacer layer, that is, the distance between the lower surface of the color separation lens array 300 and the upper surface of the sensor substrate 500, may be about 1.64 μm. However, the actual thickness of the spacer layer need not be limited only to the theoretical thickness ht described in Equation 1. For example, the actual thickness of the spacer layer 120 may be selected within a certain range based on the theoretical thickness ht considering the efficiency of the color separation lens array 300. For example, the actual thickness h of the spacer layer may be selected within a range of ht−p≤h≤ht+p.

Because the color separation lens array 300 described above may branch the incident light by wavelength without absorbing or blocking the incident light and condense the branched light on a specific region, the light utilization efficiency of the image sensor may be improved. Also, because the color separation lens array 300 has an improved color separation performance, the image sensor adopting the color separation lens array 300 may have a good color purity. In addition, the image sensor adopting the color separation lens array 300 may keep the Bayer pattern type that is generally adopted in the image sensor. Moreover, because the color separation lens array 300 may function as a lens for condensing the incident light, the image sensor employing the color separation lens array 300 may not require a separate microlens for condensing the light on each pixel.

Figure 11:
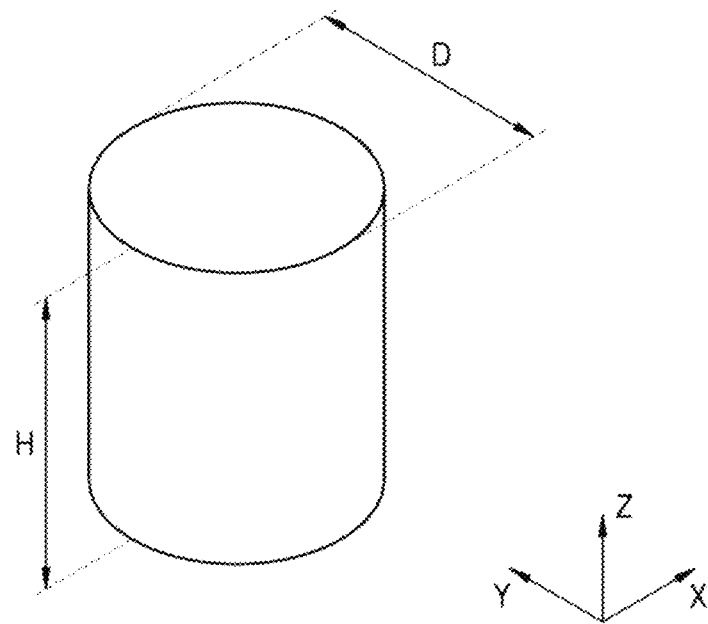
FIG. 11 is a perspective view illustrating a form of a nanopost that may be employed in a color separation lens array of an image sensor according to an embodiment.

FIG. 11 is a perspective view illustrating a form of a nanopost that may be employed in a color separation lens array of an image sensor according to an embodiment.

Referring to FIG. 11, the nanopost may have a cylindrical shape having a diameter D and a height H. At least one of the diameter D and the height H may be a sub wavelength. The diameter D may vary depending on where the nanopost is placed.

The nanopost may include a pillar having various cross-sectional shapes, for example, a square shape, a square ring shape, or a cross shape. FIGS. 12A to 12H are plan views illustrating shapes of nanoposts that may be used in a color separation lens array of an image sensor.

Figure 12A:
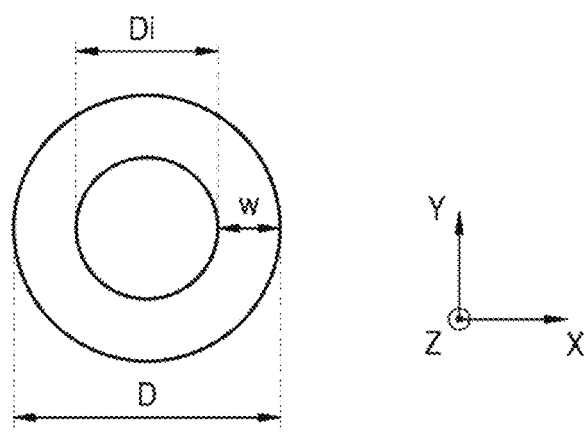
FIGS. 12A to 12H are plan views illustrating shapes of nanoposts that may be employed in a color separation lens array of an image sensor according another embodiment.

As shown in FIG. 12A, the cross-section of a nanopost may have the shape of a circular ring having an outer diameter D and an inner diameter Di. A width w of the circular ring may correspond to a sub-wavelength.

Figure 12B:
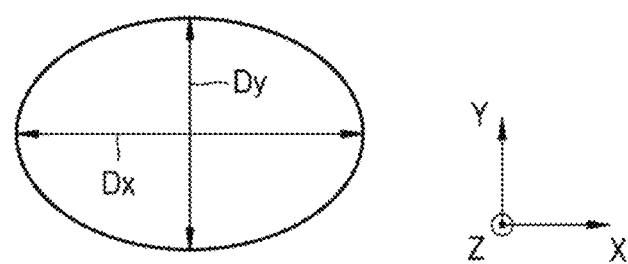

As shown in FIG. 12B, the cross-section of a nanopost may have an elliptical shape in which a major axis length Dx in the first direction (X direction) is different from a minor axis length Dy in the second direction (Y direction). The elliptical shape may be employed, for example, in the first region 311 and the fourth region 314 corresponding to the green pixel, as described above with reference to FIG. 7A.

Figure 12C:
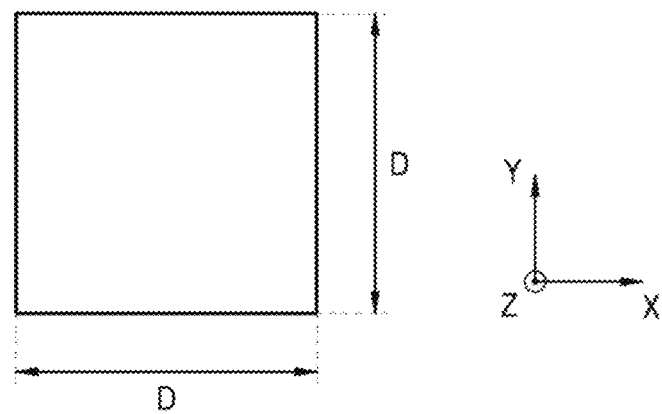
Figure 12D:
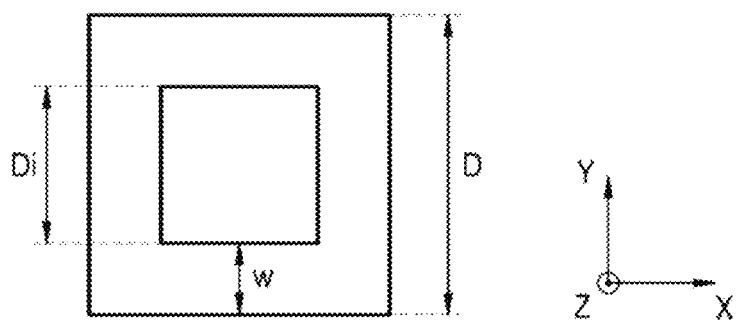
Figure 12E:
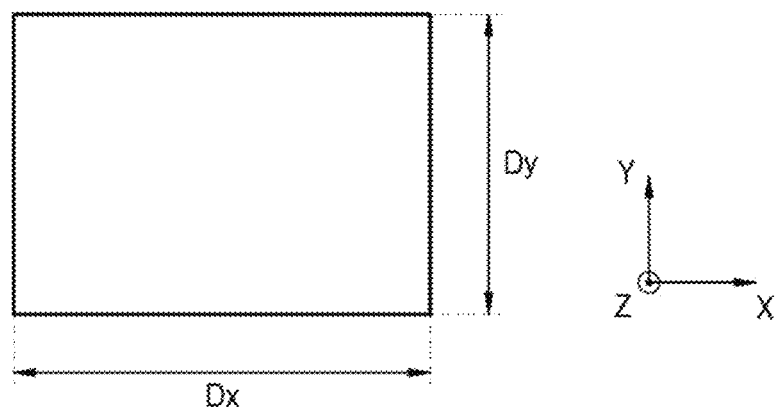
Figure 12F:
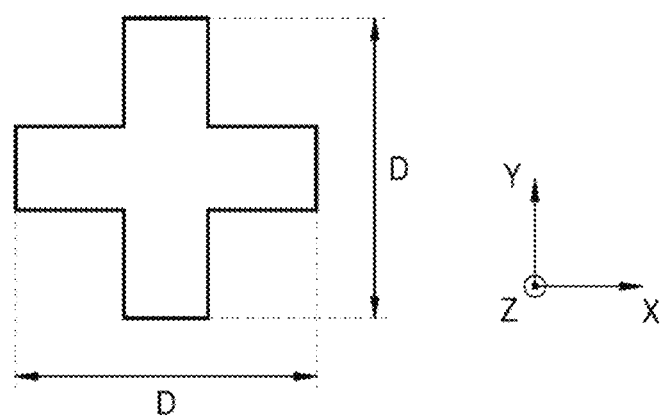

As shown in FIGS. 12C, 12D, and 12F, the cross-section of a nanopost may have a square shape, a square ring shape, or a cross shape.

As shown in FIG. 12C, the cross-section of a nanopost may have a square shape, and the four sides of the square-shaped cross-section may have the same length D.

As shown in FIG. 12D, the cross-section of a nanopost may have a square ring shape. The square ring shaped cross-section may have four outer sides having a length of D, and four inner sides having a length of Di smaller than D, wherein an interval between the outer sides and the corresponding inner sides is set to w.

As shown in FIG. 12E, the cross-section of a nanopost may have a cross shape. The cross shape may be formed by two intersecting bars that are perpendicular to each other. The length D of each of the two intersecting bars may be the same.

Figure 12G:
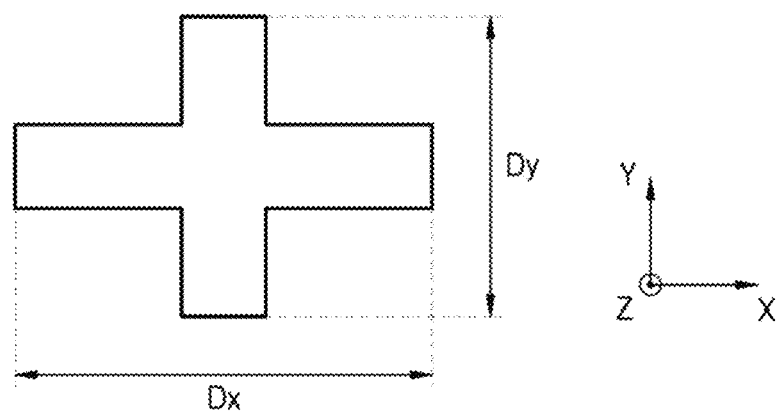

As shown in FIGS. 12E and 12G, the cross-section of a nanopost may have a rectangular shape or a cross shape, in which a length Dx in the first direction (X direction) is different from a length Dy in the second direction (Y direction). The rectangular shape or the cross shape may be employed in the first region 311 and the fourth region 314 corresponding to the green pixel, as described above with reference to FIG. 7A.

Figure 12H:
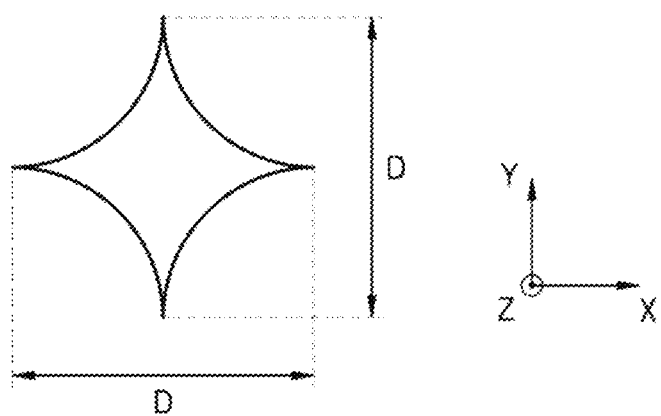

In addition, as shown in FIG. 12H, the cross-section of a nanopost may have a shape having a plurality of concave arcs and having four vertices. Among the four vertices, two opposing vertices are spaced apart from each other by a distance of D.

Although FIGS. 4B and 7A illustrate a case in which one nanopost NP is arranged in the central portion of each of the regions 311, 312, 313, and 314 of the color separation lens array 300, the present disclosure is not limited thereto. For example, as shown in FIG. 13, a plurality of nanoposts may be arranged in the central portion.

Figure 13:
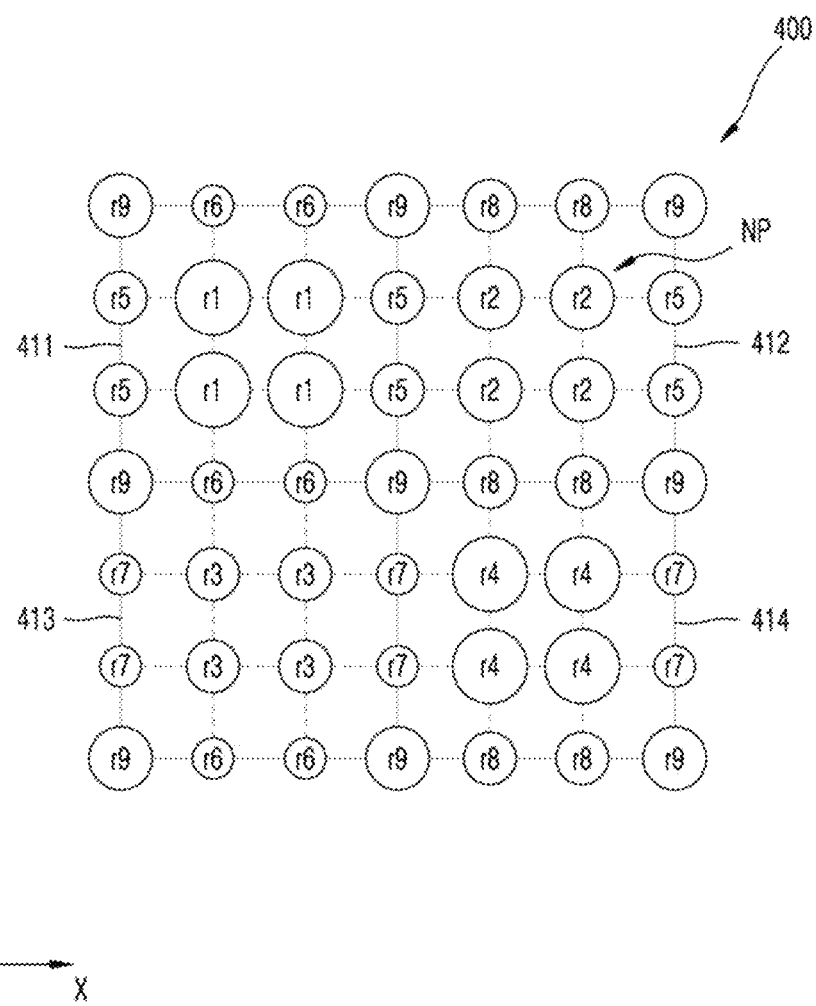
FIG. 13 is a plan view illustrating an arrangement of a plurality of nanoposts constituting a color separation lens array that may be employed in the image sensor according to another embodiment.

FIG. 13 is a plan view illustrating an arrangement of a plurality of nanoposts constituting a color separation lens array 400 that may be employed in the image sensor 200, according to another embodiment.

A nanopost array region of the color separation lens array 400 may have a form corresponding to the pixel arrangement of the Bayer pattern illustrated in FIG. 3A, and may include a region divided into four regions, that is, a first region 411 corresponding to a green pixel G, a second region 412 corresponding to a blue pixel B, a third region 413 corresponding to a red pixel R, and a fourth region 414 corresponding to a green pixel G. Although not shown in the drawings, these unit regions may be repeatedly arranged in the first direction (X direction) and the second direction (Y direction).

Each of the four regions may be divided into a plurality of sub-regions, and nanoposts NP may be arranged at the intersections between the boundaries of the sub-regions. In FIG. 13, the number of sub-regions is illustrated as nine.

As shown in FIG. 13, in each of the first region 411, the second region 412, the third region 413, and the fourth region 414, a nanopost NP located at a relatively central portion may have a larger cross-sectional area than a nanopost NP located at a peripheral portion, and the cross-sectional areas of nanoposts arranged in the first and fourth regions 411 and 414 corresponding to the green pixels G may be greater than those of nanoposts NP arranged in a central portion of the second region 412 and a central region of the third region 413. The cross-sectional area of the nanopost NP arranged in the central portion of the second region 412 may be greater than that of the nanopost NP arranged in the central portion of the third region 413.

Nanoposts NP are arranged on grid points of 9 sub-regions, and thus, a nanopost NP is not arranged in the center of each of the regions 411, 412, 413, and 414 and four nanoposts NP having a same size form a central portion. Nanoposts NP in a peripheral portion other than the central portion are arranged on boundary lines with other regions. However, this arrangement is only an example, and the present disclosure is not limited thereto. Nanoposts NP are indicated by r1 to r9 according to their detailed positions in the unit pattern array.

Referring to FIG. 13, a nanopost r1 arranged in the central portion of the first region 411 corresponding to a green pixel has a larger cross-sectional area than nanoposts r5, r6, and r9 arranged in the peripheral portion, and a nanopost r4 arranged in the central portion of the fourth region 414 corresponding to a green pixel has a larger cross-sectional area than nanoposts r7, r8, and r9 arranged in the peripheral portion. The cross-sectional areas of the nanoposts r1 and r4 respectively arranged in the central portions of the first region 411 and the fourth region 414 corresponding to the green pixels may be greater than that of the nanopost r2 arranged in the central portion of the second region 412 corresponding to the blue pixel and that of the nanopost r3 arranged in the central portion of the third region 413 corresponding to the red pixel. In addition, the cross-sectional area of the nanopost r2 arranged in the central portion of the second region 412 corresponding to the blue pixel may be greater than that of the nanopost r3 arranged in the central portion of the third region 413 corresponding to the red pixel.

The arrangement of nanoposts NP in the second region 412 and the arrangement of nanoposts NP in the third region 413 may be symmetrical in the first direction (X direction) and the second direction (Y direction), and the arrangement of nanoposts NP in the first region 411 and the arrangement of nanoposts NP in the fourth region 414 may be asymmetrical in the first direction (X direction) and the second direction (Y direction). That is, the nanoposts NP in the second region 412 corresponding to the blue pixel and the nanoposts NP in the third region 413 corresponding to the red pixel may have the same distribution rule in the first direction (X direction) and the second direction (Y direction). The nanoposts NP in the first region 411 corresponding to the green pixel and the nanoposts NP in the fourth region 414 corresponding to the green pixel may have different distribution rules in the first direction (X direction) and the second direction (Y direction).

The cross-sectional area of the nanopost r5 located at the boundary between the first region 411 and the second region 412 adjacent thereto in the first direction (X direction) is different from that of the nanopost r6 located at the boundary between the first region 411 and the third region 413 adjacent thereto in the second direction (Y direction). In addition, the cross-sectional area of the nanopost r7 located at the boundary between the fourth region 414 and the third region 413 adjacent thereto in the first direction (X direction) is different from that of the nanopost r8 located at the boundary between the fourth region 414 and the second region 412 adjacent thereto in the second direction (Y direction).

On the other hand, the cross-sectional area of the nanopost r5 located at the boundary between the first region 411 and the second region 412 adjacent thereto in the first direction (X direction) is equal to that of the nanopost r8 located at the boundary between the fourth region 414 and the second region 412 adjacent thereto in the second direction (Y direction). The cross-sectional area of the nanopost r6 located at the boundary between the first region 411 and the third region 413 adjacent thereto in the second direction (Y direction) is equal to that of the nanopost r7 located at the boundary between the fourth region 414 and the third region 413 adjacent thereto in the first direction (X direction).

Nanoposts r9 arranged at four corners of each of the first region 411, the second region 412, the third region 413, and the fourth region 414, that is, at the intersections between the four regions, have the same cross-sectional area.

In this way, in the second region 412 and the third region 413 corresponding to the blue pixel and the red pixel, respectively, nanoposts NP are arranged in a form of 4-fold symmetry, and in the first and fourth regions 411 and 414 corresponding to the green pixels, nanoposts NP are arranged in a form of 2-fold symmetry. In addition, the first region 411 and the fourth region 414 are rotated 90 degrees with respect to each other. This form is the same as those of the embodiments of FIGS. 15 and 16 to be described later.

Although FIG. 13 illustrates a case where the number of sub-regions is 9 and a nanopost NP is not arranged in the center of each of the regions 411, 412, 413, and 414, the number of sub-regions may be set to 16 and a nanopost NP may be arranged in the center of each of the regions 411, 412, 413, and 414.

Figure 14:
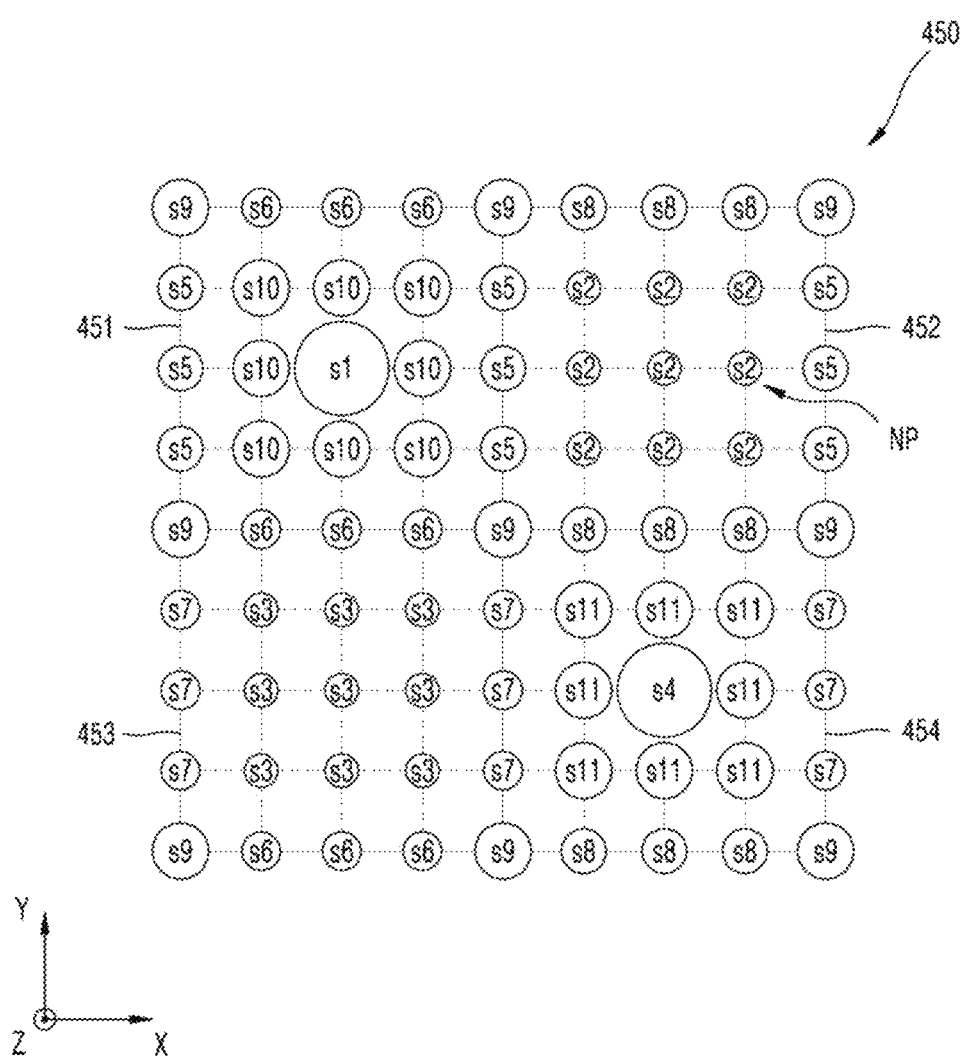
FIG. 14 is a plan view illustrating an arrangement of a plurality of nanoposts constituting a color separation lens array of an image sensor according to another embodiment.

FIG. 14 is a plan view illustrating an arrangement of a plurality of nanoposts constituting a color separation lens array 450 of an image sensor according to another embodiment.

The color separation lens array 450 may have a form corresponding to the pixel arrangement of the Bayer pattern, and may include a region divided into four regions, that is, a first region 451 corresponding to a green pixel, a second region 452 corresponding to a blue pixel, a third region 453 corresponding to a red pixel, and a fourth region 454 corresponding to a green pixel.

Each of the four regions may be divided into a plurality of sub-regions, and nanoposts NP may be arranged at the intersections between the boundaries of the sub-regions. FIG. 14 illustrates an example in which the number of sub-regions is 16, unlike FIG. 13, and in FIG. 14, nanoposts NP are arranged on grid points of 16 sub-regions and thus a nanopost NP is arranged in the center of each of the regions 451, 452, 453, and 454. Nanoposts NP are indicated by s1 to s11 according to their detailed positions in the unit pattern array.

In an embodiment of FIG. 14, a nanopost s1 located at the center of the first region 451 corresponding to a green pixel and a nanopost s4 located at the center of the fourth region 454 corresponding to a green pixel may have cross-sectional areas greater than those of nanoposts NP located in a peripheral portion, and may have cross-sectional areas greater than those of nanoposts NP located in the second region 452 corresponding to a blue pixel and the third region 453 corresponding to a red pixel.

In an embodiment of FIG. 14 as in an embodiment of FIG. 13, nanoposts NP in the second region 452 and nanoposts NP in the third region 453 may be symmetrically arranged in the first direction (X direction) and the second direction (Y direction), and nanoposts NP in the first region 451 and nanoposts NP in the fourth region 454 may be asymmetrically arranged in the first direction (X direction) and the second direction (Y direction). In addition, nanoposts s9 arranged at four corners of each of the first region 451, the second region 452, the third region 453, and the fourth region 454, that is, at the intersections between the four regions, have the same cross-sectional area.

Figure 15:
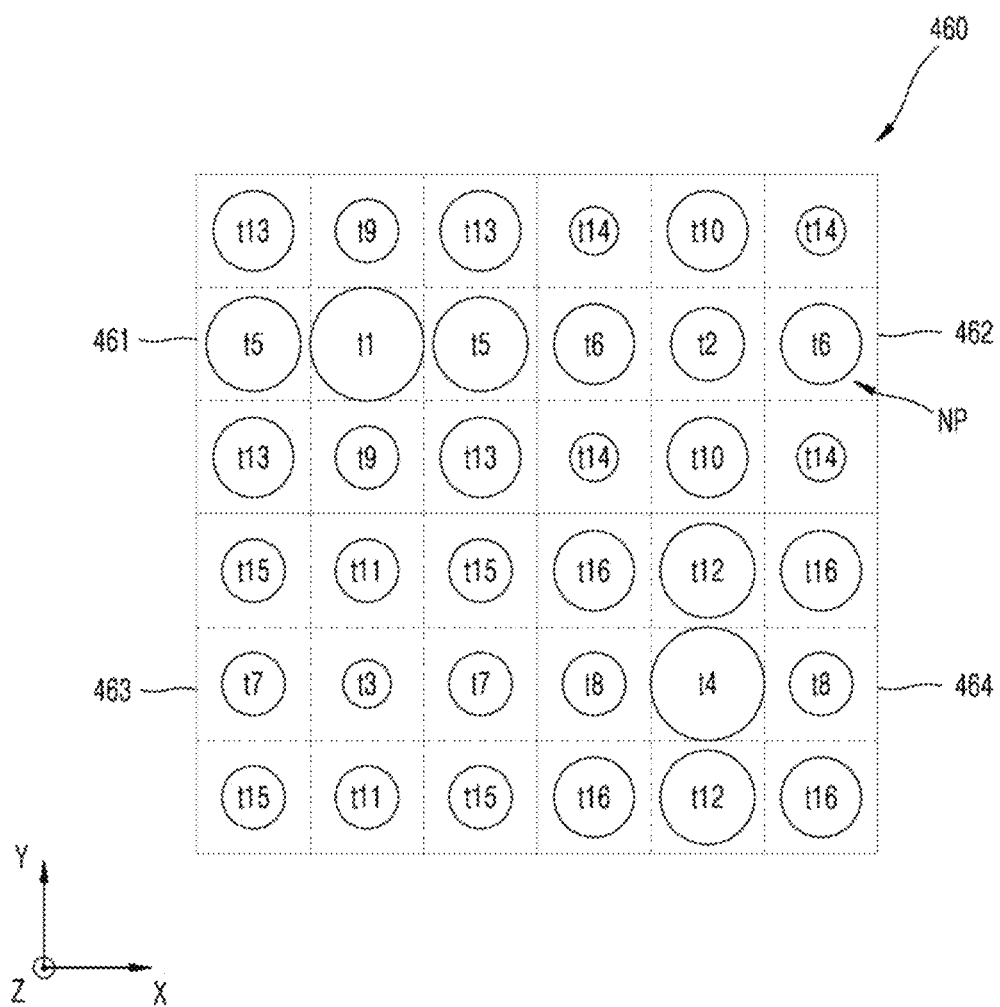
FIG. 15 is a plan view illustrating an arrangement of a plurality of nanoposts constituting a color separation lens array of an image sensor according to another embodiment.

FIG. 15 is a plan view illustrating an arrangement of a plurality of nanoposts constituting a color separation lens array 460 of an image sensor according to another embodiment.

The color separation lens array 460 may have a form corresponding to the pixel arrangement of the Bayer pattern, and may include a region divided into four regions, that is, a first region 461 corresponding to a green pixel, a second region 462 corresponding to a blue pixel, a third region 463 corresponding to a red pixel, and a fourth region 464 corresponding to a green pixel.

Each of the four regions may be divided into a plurality of sub-regions, and nanoposts NP may be arranged in the sub-regions. As in FIG. 13, each region of the color separation lens array 460 may be divided into 9 sub-regions. However, an embodiment of FIG. 15 is different from an embodiment of FIG. 13 in that nanoposts NP are arranged inside the sub-regions, not at the intersections between the sub-regions. The nanoposts NP are indicated by t1 to t16 according to their detailed positions in the unit pattern array.

In the embodiment of FIG. 15, a nanopost t1 located in a central portion of the first region 461 and a nanopost t4 located in a central portion of the fourth region 464 may have cross-sectional areas greater than those of nanoposts NP arranged in the second region 462 and the third region 463 as well as nanoposts NP located in a peripheral portion.

The cross-sectional area of a nanopost t2 arranged in a central portion of the second region 462 may be greater than that of a nanopost t3 arranged in a central portion of the third region 463. In the second region 462, the cross-sectional areas of nanoposts t6 and t10 located in a peripheral portion spaced apart from the central portion of the second region 462 in the first direction (X direction) and the second direction (Y direction) are greater than that of the nanopost t2 arranged in the central portion of the second region 462. Unlike this, the cross-sectional areas of nanoposts t14 located in a peripheral portion spaced apart from the central portion in a diagonal direction are less than that of the nanopost t2 arranged in the central portion of the second region 462.

In the third region 463, the cross-sectional area of the nanopost t3 arranged in the central portion of the third region 463 is the smallest, and all of the nanoposts t7, t11, and t15 in the peripheral portion have larger cross-sectional areas than the nanopost t3 arranged in the central portion of the third region 463.

Nanoposts NP in the second region 462 and nanoposts NP in the third region 463 may be symmetrically arranged in the first direction (X direction) and the second direction (Y direction), and nanoposts NP in the first region 461 and nanoposts NP in the fourth region 464 may be asymmetrically arranged in the first direction (X direction) and the second direction (Y direction). In other words, the nanoposts NP in the second region 462 corresponding to the blue pixel and the nanoposts NP in the third region 463 corresponding to the red pixel have the same distribution rule in the first direction (X direction) and the second direction (Y direction). The nanoposts NP in the first region 461 corresponding to the green pixel and the nanoposts NP in the fourth region 464 corresponding to the green pixel have different distribution rules in the first direction (X direction) and the second direction (Y direction).

In the first region 461, a nanopost t1 in a central portion of the first region 461, a nanopost t5 adjacent to the nanopost t1 in the first direction (X direction), and a nanopost t9 adjacent to the nanopost t1 in the second direction (Y direction) have different cross-sectional areas. Also in the fourth region 464, a nanopost t4 in a central portion of the fourth region 464, a nanopost t8 adjacent to the nanopost t4 in the first direction (X direction), and a nanopost t12 adjacent to the nanopost t4 in the second direction (Y direction) have different cross-sectional areas. In addition, the nanopost t1 in the central portion of the first region 461 and the nanopost t5 adjacent to the nanopost t1 in the first direction (X direction) have the same cross-sectional areas as the nanopost t4 in the central portion of the fourth region 464 and the nanopost t12 adjacent to the nanopost t4 in the second direction (Y direction), respectively. The nanopost t1 in the central portion of the first region 461 and the nanopost t9 adjacent to the nanopost t1 in the second direction (Y direction) have the same cross-sectional areas as the nanopost t4 in the central portion of the fourth region 464 and the nanopost t8 adjacent to the nanopost t4 in the first direction (X direction), respectively. Nanoposts t13 at positions adjacent to four corners of the first region 461 and nanoposts t16 at positions adjacent to four corners of the fourth region 464 have the same cross-sectional area. In this way, the first region 461 and the fourth region 464 are rotated 90 degrees with respect to each other.

In the second region 462, a nanopost t2 in a central portion of the second region 462, a nanopost t6 adjacent to the nanopost t2 in the first direction (X direction), and a nanopost t10 adjacent to the nanopost t2 in the second direction (Y direction) have the same cross-sectional area. Nanoposts t14 at positions adjacent to four corners of the second region 462 have the same cross-sectional area.

Also in the third region 463, a nanopost t3 in a central portion of the third region 463, a nanopost t7 adjacent to the nanopost t3 in the first direction (X direction), and a nanopost t11 adjacent to the nanopost t3 in the second direction (Y direction) have the same cross-sectional area. Nanoposts t15 at positions adjacent to four corners of the third region 463 have the same cross-sectional area.

Figure 16:
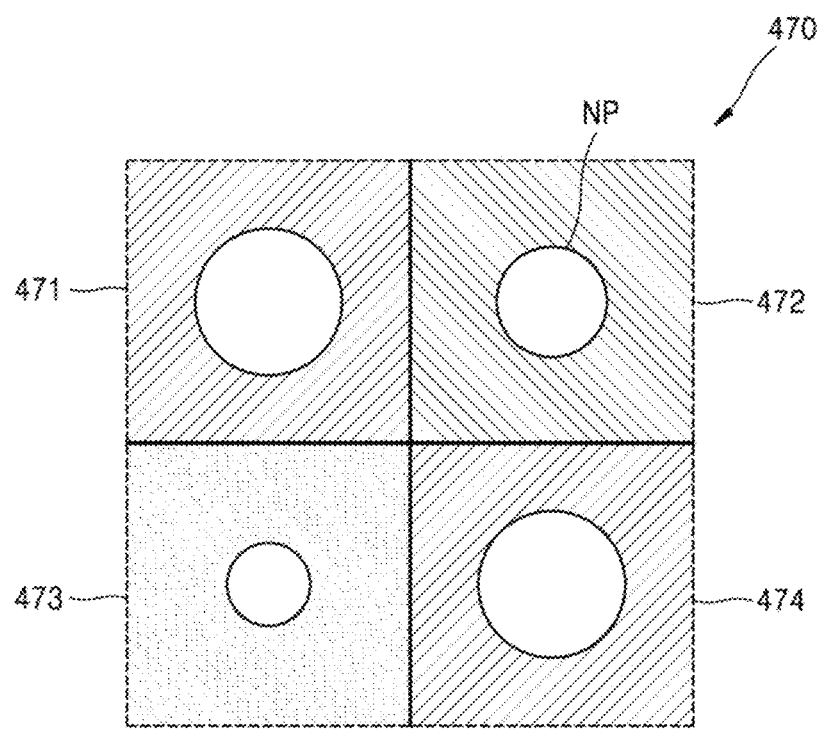
FIG. 16 is a plan view illustrating an arrangement of a plurality of nanoposts constituting a color separation lens array according to another embodiment.

FIG. 16 is a plan view illustrating an arrangement of a plurality of nanoposts constituting a color separation lens array 470 according to another embodiment.

The color separation lens array 470 of the image sensor according to a present embodiment is an embodiment of the simplest structure. One nanopost NP is arranged in each of a first region 471 corresponding to a green pixel, a second region 472 corresponding to a blue pixel, a third region 473 corresponding to a red pixel, and a fourth region 474 corresponding to a green pixel. The cross-sectional area of a nanopost NP provided in the first region 471 and the fourth region 474 is the largest, the cross-sectional area of a nanopost NP provided in the second region 472 is less than that of the nanopost NP provided in the first region 471, and the cross-sectional area of a nanopost NP provided in the third region 473 is the smallest. In this way, depending on sub-region partitioning, a nanopost may or may not be arranged in the center.

In the pixel array 210 of the image sensor 200, a color filter may be further arranged between the sensor substrate 500 and the color separation lens array 300, 400, 450, 460, or 470. In particular, a color filter may be arranged between the sensor substrate 500 and the spacer layer. Also, the pixel array 210 may further include a transparent dielectric layer covering the nanoposts NP to protect the color separation lens arrays 300, 400, 450, 460, or 470. The dielectric layer may be arranged to completely cover spaces between adjacent nanoposts NP and upper surfaces of the nanoposts NP. The dielectric layer may include a material having a refractive index lower than those of the nanoposts NP. For example, the dielectric layer may include the same material as the spacer layer.

Because the color separation lens arrays 300, 400, 450, 460, and 470 branch light of different wavelengths and condense the light of different wavelengths onto a plurality of photo-sensing cells 511, 512, 513, and 514, the color filter is not an essential component. However, by providing an additional color filter in this way, color purity may be more supplemented, and since light that is color-separated to a considerable extent is incident on the color filter, light loss is not significant.

The color separation lens arrays 300, 400, 450, 460, and 470 applied to the image sensor 200 may have a nanopost arrangement as shown in FIG. 7A, a nanopost arrangement as shown in FIGS. 13 to 16, and various nanopost arrangements.

In this way, the color separation lens arrays 300, 400, 450 and 460, which are arranged on the sensor substrate 500 in the image sensor 200 to separate light according to color and make the separated light incident on the plurality of photo-sensing cells 511, 512, 513, and 514, may include a plurality of nanopost arrays, and the arrangement of nanoposts, the cross-sectional shapes of the nanoposts, and the cross-sectional size distribution of the nanoposts may be variously modified.

The image sensor 200 including the color separation lens array 300, 400, 450, 460, or 470 according to the above-described embodiments may be applied to various optical devices such as a camera. The camera may be mounted in mobile electronic apparatuses such as cellular phones, smart phones, notebook computers, and tablet PCs.

From the perspective of the image sensor 200, the main ray angle of light incident on a central portion of the image sensor 200 is 0 degrees, and the closer to the edge of the image sensor 200, the larger the main ray angle of the incident light. However, the color separation lens arrays 300, 400, 450, 460, and 470 described above may generally have directionality. In other words, the color separation lens arrays 300, 400, 450, 460, and 470 operates efficiently with respect to light incident in a certain angle range, but when the incident angle of the light is further away from the certain angle range, the color separation performance of the color separation lens array 300, 400, 450, 460, and 470 is deteriorated. Therefore, when the nanoposts of the color separation lens arrays 300, 400, 450, 460, and 470 all have the same arrangement shape in the entire area of the image sensor 200, the color separation efficiency may be not uniform in the entire area of the image sensor 200 and may vary depending on regions of the image sensor 200. Due to this, the quality of images provided by the camera may be deteriorated.

Figure 17A:
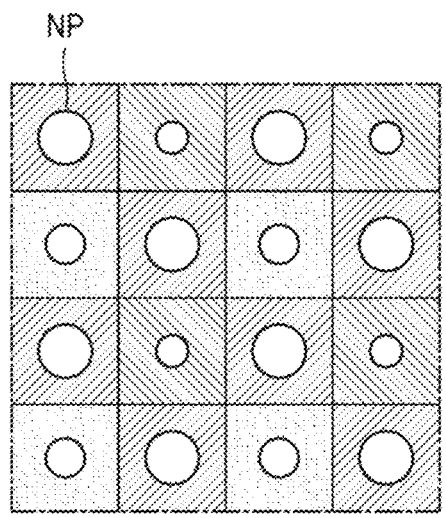
FIGS. 17A to 17C are schematic plan views illustrating changes in the arrangement shape of nanoposts of a color separation lens array according to positions on an image sensor.
Figure 17B:
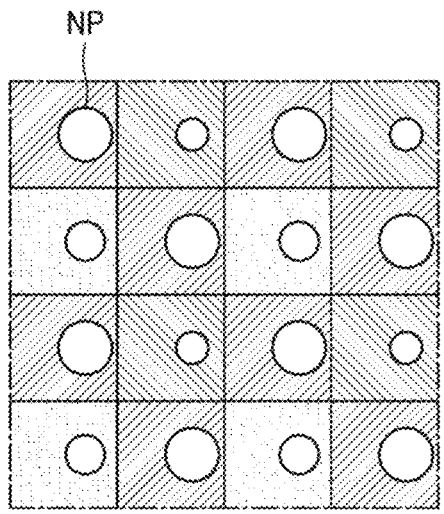
Figure 17C:
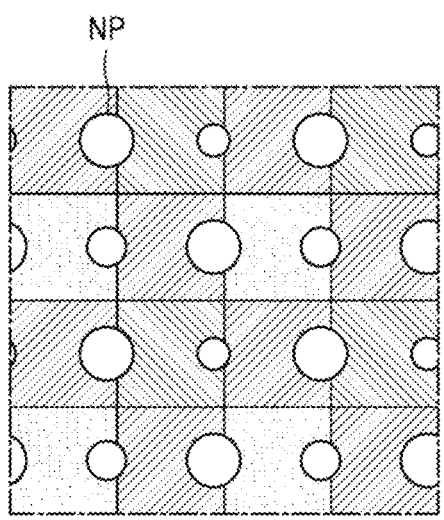

Therefore, taking into account the main ray angle of the incident light that varies depending on positions on the image sensor 200, the arrangement of the nanoposts of the color separation lens arrays 300, 400, 450, 460, and 470 may be designed differently as illustrated in FIGS. 17A to 17C.

FIGS. 17A to 17C are schematic plan views illustrating changes in the arrangement shape of nanoposts of a color separation lens array according to positions on the image sensor 200. In particular, FIG. 17A illustrates the position of a nanopost NP arranged in a central portion of the image sensor 200, FIG. 17B illustrates the position of a nanopost NP arranged between the central portion and the edge of the image sensor 200, and FIG. 17C illustrates the position of a nanopost NP arranged on the edge of the image sensor 200. FIGS. 17A to 17C are not intended to limit a certain arrangement of nanoposts NP, but are merely for conceptually explaining the relative position change of the nanoposts NP according to positions on the image sensor 200.

As shown in FIGS. 17A to 17C, the closer to the edge from the central portion of the image sensor 200, the further a first region, a second region, a third region, and a fourth region of the color separation lens array may be shifted away from pixels or photo-sensing cells corresponding to the first region, the second region, the third region, and the fourth region, respectively. For example, in the central portion of the image sensor 200, the central portion of the color separation lens array, or the central portion of the sensor substrate, the positions of the first region, the second region, the third region, and the fourth region of the color separation lens array may coincide with the positions of a green pixel, a blue pixel, a red pixel, and a green pixel (or the positions of photo-sensing cells) corresponding to the first region, the second region, the third region, and the fourth region, respectively. In addition, the further away from the central portion of the image sensor 200, the central portion of the color separation lens array, or the central portion of the sensor substrate, the further the first region, the second region, the third region, and the fourth region of the color separation lens array may be shifted away from the positions of the green pixel, the blue pixel, the red pixel, and the green pixel (or the positions of the photo-sensing cells) corresponding to the first region, the second region, the third region, and the fourth region, respectively. The degree to which the first region, the second region, the third region, and the fourth region of the color separation lens array are shifted may be determined by the main ray angle of light incident on the color separation lens array. In particular, in a peripheral portion of the image sensor 200, a peripheral portion of the color separation lens array, or a peripheral portion of the sensor substrate, the first region, the second region, the third region, and the fourth region of the color separation lens array are shifted toward the central portion of the image sensor 200 with respect to a first photo-sensing cell, a second photo-sensing cell, a third photo-sensing cell, and a fourth photo-sensing cell corresponding to the first region, the second region, the third region, and the fourth region, respectively.

Hereinafter, although expressed as the central portion of the image sensor 200, the central portion of the image sensor 200 may also refer to the central portion of the color separation lens array or the central portion of the sensor substrate because the image sensor 200, the color separation lens array, and the sensor substrate are arranged to face one another. Similarly, hereinafter, the peripheral portion/edge of the image sensor 200 may refer to the peripheral portion/edge of the color separation lens array or the peripheral portion/edge of the sensor substrate.

Figure 18A:
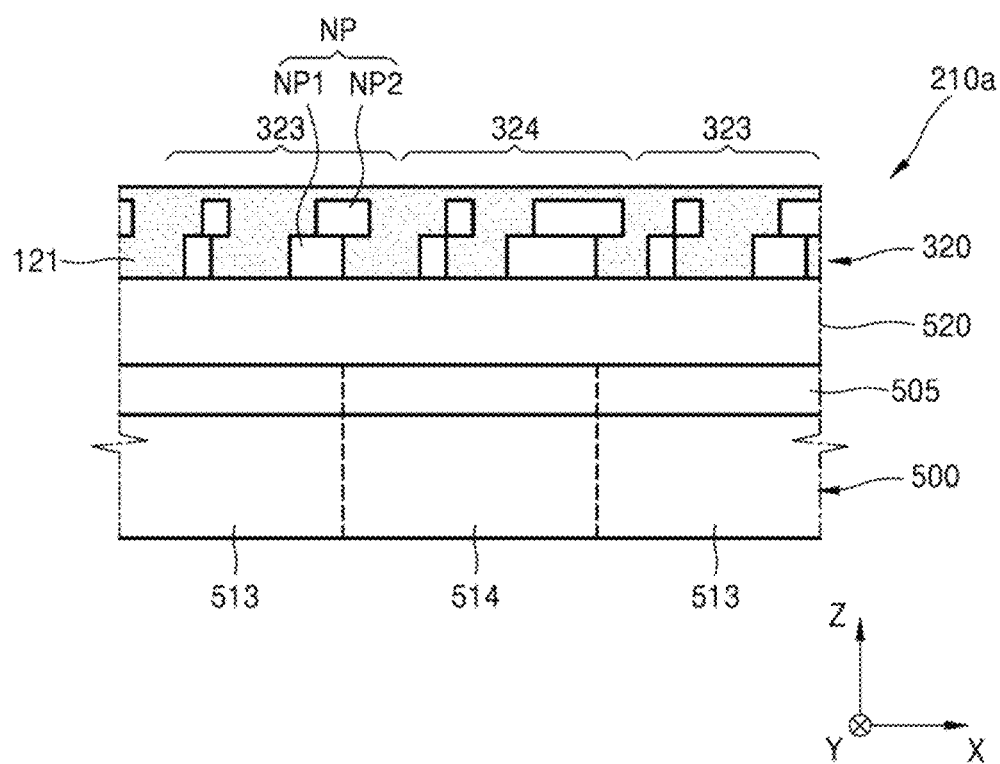
FIG. 18A is a cross-sectional view illustrating a schematic structure of a pixel array according to another embodiment.

FIG. 18A is a cross-sectional view illustrating a schematic structure of a pixel array 210a according to another embodiment.

Referring to FIG. 18A, the pixel array 210a of an image sensor according to a present embodiment differs from those of the above-described embodiments in that the pixel array 210a includes a color separation lens array 320 having nanoposts NP stacked in two layers. Each of the nanoposts NP may include a first nanopost NP1 arranged on a spacer layer 520, and a second nanopost NP2 arranged on the first nanopost NP1. The second nanopost NP2 may be shifted in an inclination direction of light with respect to the first nanopost NP1. For example, when light incident on the color separation lens array 320 is inclined from right to left, the second nanopost NP2 may be shifted to the right with respect to the first nanopost NP1. Conversely, when the light incident on the color separation lens array 320 is inclined from left to right, the second nanopost NP2 may be shifted to the left with respect to the first nanopost NP1.

In addition, the second nanopost NP2 may be shifted toward the central portion of the image sensor 200 with respect to the first nanopost NP1. For example, the closer to the left edge from the central portion of the image sensor 200, the further the second nanopost NP2 may be shifted to the right with respect to the first nanopost NP1. The closer to the right edge from the central portion of the image sensor 200, the further the second nanopost NP2 may be shifted to the left with respect to the first nanopost NP1.

Similarly, a third region 323 and a fourth region 324 of the color separation lens array 320 may be shifted toward the central portion of the image sensor 200 with respect to a red pixel (or third photo-sensing cell) and a green pixel (or fourth photo-sensing cell) corresponding to the third region 323 and the fourth region 324, respectively. For example, the closer to the left edge from the central portion of the image sensor 200, the further the third region 323 and the fourth region 324 of the color separation lens array 320 may be shifted to the right with respect to the red pixel and the green pixel corresponding to the third region 323 and the fourth region 324, respectively. Although not shown in the drawings, a first region and a second region arranged in another cross-section of the color separation lens array 320 may be also shifted toward the central portion of the image sensor 200 with respect to a green pixel (or first photo-sensing cell) and a blue pixel (or second photo-sensing cell) corresponding to the first region and the second region, respectively.

In particular, the third region 323 and the fourth region 324 of the color separation lens array 320 may be shifted to respectively condense red light and green light in a central portion of a third photo-sensing cell 513 corresponding to the third region 323 and a central portion of a fourth photo-sensing cell 514 corresponding to the fourth region 324. A distance s at which the third region 323 and the fourth region 324 of the color separation lens array 320 are shifted may be determined by, for example, Equation 2 below.

$$s = d \times \tan(CRA') \qquad \text{Equation 2}$$

In Equation 2, d is the shortest straight line distance or interval between the lower surface of the color separation lens array 320 and the upper surface of a sensor substrate 500, and CRA' is the incident angle of light incident on the sensor substrate 500. In addition, CRA' may be determined by Equation 3 below.

$$CRA' = \sin^{-1}(\sin CRA \times n) \qquad \text{Equation 3}$$

In Equation 3, CRA is the incident angle of light incident on the color separation lens array 320, and n is the refractive index of a material arranged between the color separation lens array 320 and the sensor substrate 500. Accordingly, the distance s at which the third region 323 and the fourth region 324 of the color separation lens array 320 are shifted from pixels corresponding to the third region 323 and the fourth region 324 may be determined by the incident angle of light incident on the color separation lens array 320 and the refractive index of a material arranged between the color separation lens array 320 and the sensor substrate 500. If not only the spacer layer 520 but also a color filter 505 is arranged between the color separation lens array 320 and the sensor substrate 500, CRA may be determined considering the incident angle of light incident on the spacer layer 520 and the refractive index of the spacer layer 520, and the incident angle of light incident on the color filter 505 and the refractive index of the color filter 105.

Even when a pixel array includes the color separation lens array 320 having nanoposts NP stacked in two layers, like the pixel array 210a of the image sensor according to the present embodiment, the first to fourth regions of the color separation lens array 320 may not be shifted, with respect to pixels (or photo-sensing cells) corresponding to the first to fourth regions, in the central portion of the image sensor 200. In addition, in the central portion of the image sensor 200, the second nanopost NP2 may not be shifted with respect to the first nanopost NP1. In addition, in the peripheral portion of the image sensor 200, the first to fourth regions of the color separation lens array 320 may be shifted toward the central portion of the image sensor 200, and the second nanopost NP2 may also be shifted toward the central portion of the image sensor 200 with respect to the first nanopost NP1. In consideration of this, in the case of the image sensor 200 employed in a camera, the total area of the color separation lens array 320 may be less than the total area of the pixel array 210a of the image sensor 200 or the total area of the sensor substrate 500.

In an embodiment of FIG. 18A, the color filter 505 is arranged on the sensor substrate 500. However, when the color separation lens array 320 has sufficient performance in the peripheral portion of the image sensor 200, the color filter 505 may be omitted.

Figure 18B:
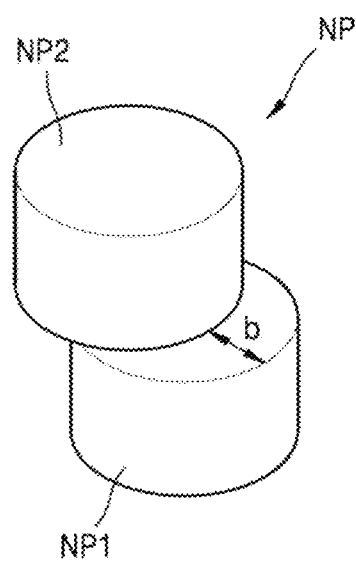
FIG. 18B is a perspective view illustrating a shape of a nanopost employed in a color separation lens array of an image sensor of FIG. 18A.

FIG. 18B is a perspective view illustrating a shape of a nanopost employed in the color separation lens array of the image sensor of FIG. 18A. As shown in FIG. 18B, a first nanopost NP1 and a second nanopost NP2 arranged on the first nanopost NP1 may be stacked to be shifted from each other. The degree of being shifted from each other is indicated by b in FIG. 18B, and the size of the degree may increase from the central portion of the image sensor 200 to the peripheral portion thereof, that is, in a radial direction. A direction in which the second nanopost NP2 is shifted from the first nanopost NP1 may be a direction from the peripheral portion toward the central portion. In particular, the degree b of being shifted may be determined such that light is incident on a central portion of the upper surface of the second nanopost NP2 and is incident on a central portion of the upper surface of the first nanopost NP1.

The first nanopost NP1 and the second nanopost NP2 of the two-layered structure may be covered with a dielectric layer having a refractive index lower than that of the material of the first and second nanoposts NP1 and NP2.

Figure 19:
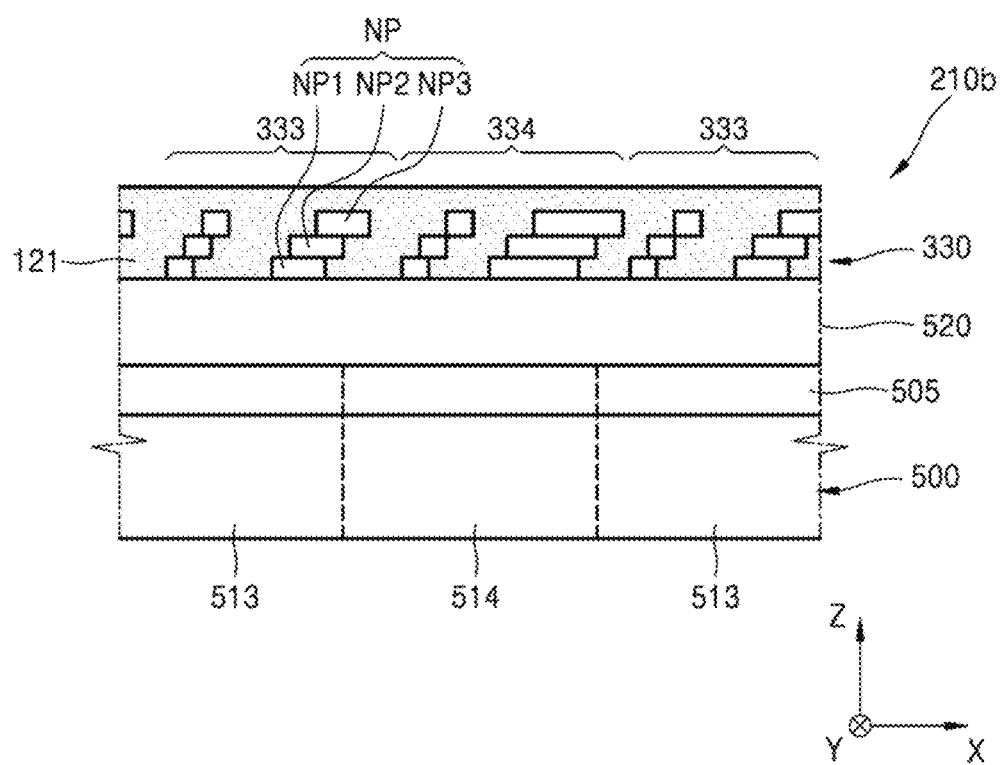
FIG. 19 is a cross-sectional view illustrating a schematic structure of a pixel array according to another embodiment.

FIGS. 18A and 18B illustrate a structure in which nanoposts NP are stacked in two layers, but the structure is not limited thereto and may have a structure of three or more layers as in FIG. 19.

FIG. 19 is a cross-sectional view illustrating a schematic structure of a pixel array 210b according to another embodiment.

Referring to FIG. 19, the pixel array 210b of an image sensor includes a color separation lens array 330 having nanoposts NP stacked in three layers. Each of the nanoposts NP may include a first nanopost NP1 arranged on a spacer layer 520, a second nanopost NP2 arranged on the first nanopost NP1, and a third nanopost NP3 arranged on the second nanopost NP2. The second nanopost NP2 may be shifted toward a central portion of the image sensor with respect to the first nanopost NP1, and the third nanopost NP3 may be shifted toward the central portion of the image sensor with respect to the second nanopost NP2.

In addition, a fourth region 334 of the color separation lens array 330 may be shifted toward the central portion of the image sensor with respect to a green pixel or a fourth photo-sensing cell 514 corresponding to the fourth region 334, and a third region 333 of the color separation lens array 330 may be shifted toward the central portion of the image sensor with respect to a red pixel or a third photo-sensing cell 514 corresponding to the third region 333.

Even when nanoposts NP are stacked in two layers shifted from each other, or have a structure in which three or more layers are stacked, nanoposts having various shapes may be used.

For example, nanoposts having rectangular shapes having different sizes and stacked in two layers may be shifted with respect to each other. In addition, ring-type nanoposts stacked in two layers, circular nanoposts stacked in two layers, and rectangular nanoposts stacked in two layers may be shifted with respect to each other in respective regions of the color separation lens array.

In addition, an inclined surface may be formed on the side of each of the nanoposts stacked in two layers. For example, an inclined surface may be formed on the side of the nanopost in a way that the cross-sectional area of the nanopost increases from the bottom to the top, and thus, the nanopost may have a trapezoidal cross-section in which an upper side is larger than a lower side. In addition, an inclined surface may be formed on the side of the nanopost in a way that the cross-sectional area of the nanopost decreases from the bottom to the top, and thus, the nanopost may have a trapezoidal cross-section in which a lower side is larger than an upper side. In this case, the inclination degrees of the inclined surfaces of nanoposts arranged in the first region, the second region, the third region, and the fourth region of the color separation lens array may be different from one another. In addition, the inclination degree of the inclined surfaces of nanoposts positioned corresponding to the central portion of the image sensor may be different from the inclination degree of the inclined surfaces of nanoposts positioned corresponding to the peripheral portion of the image sensor. As described above, the color separation efficiency may be increased by a color separation lens array in which sub-wavelength nanoposts are arranged in a certain rule, and the performance of an image sensor using the color separation lens array may be improved. The specific forms described above are only examples, and various modifications and combinations thereof are possible. For example, although the wavelength band of visible light has been described as an example, the present disclosure is not limited thereto, and color separation by wavelength bands other than the wavelength band of visible light is possible according to nanopost arrangement rules. In addition, the number of nanoposts provided in each of the plurality of regions of a nanopost array may be variously changed. The pixel arrangement of the image sensor has been described as including a Bayer pattern, but is not limited thereto. For example, an arrangement in which red, green, and blue pixels are repeated in one direction in this order may be applied to the pixel arrangement of the image sensor. Alternatively, an arrangement by the CYGM method shown in FIG. 3B or an arrangement by the RGBW method shown in FIG. 3C may be applied to the pixel arrangement of the image sensor. In addition, it may be applied to a pixel arrangement pattern in which a plurality of unit pixels including pixels of two or more colors are repeatedly arranged. The color separation lens array may adopt a region division suitable for this pixel arrangement, and a nanopost arrangement rule may be selected for each region.

Figure 20:
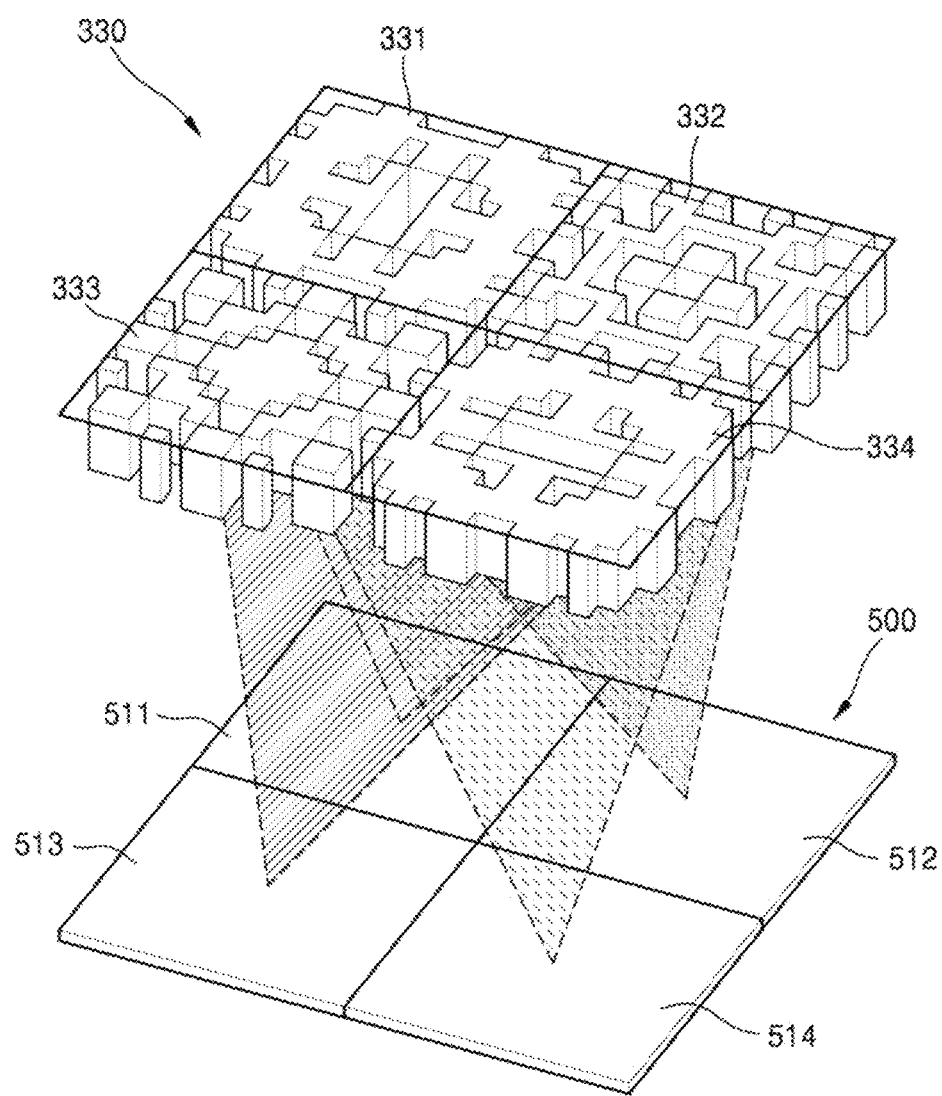
FIG. 20 is a conceptual diagram illustrating a schematic structure and operation of a color separation lens array according to another embodiment.

Until now, it has been described that the color separation lens array is composed of an array of nanoposts formed in a definable shape, but the color separation lens array may also be composed of various types of free patterns that may not be defined, as illustrated in FIG. 20.

FIG. 20 is a conceptual diagram illustrating a schematic structure and operation of a color separation lens array 330 according to another embodiment.

Referring to FIG. 20, a unit pattern array of the color separation lens array 330 may include first to fourth regions 331, 332, 333, and 334 respectively having first to fourth fine structures separated from one another. For example, the first region 331 may have a first pattern, the second region 332 may have a second pattern patterned in a different form from the first pattern, the third region 333 may have a third pattern patterned in a form different from the first pattern and the second pattern, and the fourth region 334 may have a fourth pattern patterned in a form different from the first to third patterns.

The first to fourth regions 331, 332, 333, and 334 may be arranged on the same plane in the form of, for example, 2×2. Accordingly, the first region 331 and the second region 332 may be arranged adjacent to each other in a first direction, and the third region 333 and the fourth region 334 may be arranged adjacent to each other in the first direction. In addition, the first region 331 and the third region 333 may be arranged adjacent to each other in a second direction perpendicular to the first direction, and the second region 332 and the fourth region 334 may be arranged adjacent to each other in the second direction. The first region 331 and the fourth region 334 may be arranged in a diagonal direction, and the second region 332 and the third region 333 are arranged in a different diagonal direction.

According to an embodiment, the first to fourth patterns may be determined so that, among incident pieces of light incident on the color separation lens array 330, first wavelength light λ1 is condensed in a first photo-sensing cell 511 facing the first region 331 in the vertical direction, second wavelength light λ2 is condensed in a second photo-sensing cell 512 facing the second region 332 in the vertical direction, third wavelength light λ3 is condensed in a third photo-sensing cell 513 facing the third region 333 in the vertical direction, and fourth wavelength light λ4 is condensed in a fourth photo-sensing cell 514 facing the fourth region 334 in the vertical direction.

The first to fourth patterns of the first to fourth regions 331, 332, 333 and 334 may be variously designed according to the pixel arrangement and color characteristics of the image sensor to which the color separation lens array 330 is applied.

For example, when the color separation lens array 330 is applied to the Bayer pattern type image sensor shown in FIG. 3A, the first region 331 and the fourth region 334 may be arranged to face the green pixel G, the second region 332 may be arranged to face the blue pixel B, and the third region 333 may be arranged to face the red pixel R. In addition, the first wavelength light λ1 and the fourth wavelength light λ4 may be green light, the second wavelength light λ2 may be blue light, and the third wavelength light λ3 may be red light.

In the color separation lens array 330 applied to the Bayer pattern type image sensor, as another rule of the first to fourth patterns of the first to fourth regions 331, 332, 333, and 334, the first to fourth patterns of the first to fourth regions 331, 332, 333, and 334 may be designed so that the blue light, green light, and red light transmitted through the color separation lens array 330 have a certain target phase distribution. For example, the first to fourth patterns of the first to fourth regions 331, 332, 333 and 334 may be determined to form a phase at which the blue light transmitted through the color separation lens array 330 is condensed to a position of the blue pixel B corresponding to the second region 332 and does not travel to positions corresponding to the first region 331 and the fourth region 334 adjacent to the second region 332.

In addition, the first to fourth patterns of the first to fourth regions 331, 332, 333 and 334 may be determined to form a phase at which the green light transmitted through the color separation lens array 330 is condensed to positions of the green pixel G corresponding to the first region 331 and the fourth region 334 and does not travel to positions corresponding to the second region 332 and third region 333 adjacent to the first region 331 and the fourth region 334.

In addition, the first to fourth patterns of the first to fourth regions 331, 332, 333 and 334 may be determined to form a phase at which the red light transmitted through the color separation lens array 330 is condensed to a position of the red pixel R corresponding to the third region 333 and does not travel to positions corresponding to the first region 331 and the fourth region 334 adjacent to the third region 333.

Since the target phase distribution to be implemented by the color separation lens array 330 is the same as described above, a detailed description will be omitted. According to the shapes of the first to fourth patterns of the first to fourth regions 331, 332, 333, and 334, the color separation lens array 330 may perform the same operation as described with reference to FIGS. 8A to 8D, 9A to 9D, and 10A to 10D.

The pattern of the color separation lens array 300 that satisfies the phase distribution described above may be automatically designed through various computer simulations. For example, the patterns of the first to fourth regions 331, 332, 333, and 334 may be optimized through a nature-inspired algorithm such as a genetic algorithm, a particle swarm optimization algorithm, an ant colony optimization algorithm, etc., or a reverse design based on an adjoint optimization algorithm.

For the design of the color separation lens array 300, the first to fourth patterns of the first to fourth regions 331, 332, 333, and 334 may be optimized by evaluating the performance of a candidate color separation lens arrays by using evaluation factors such as color separating spectrum, luminance efficiency, and signal-to-noise ratio. For example, the first to fourth patterns of the first to fourth regions 331, 332, 333, and 334 may be optimized in a manner that a target numerical value of each evaluation element is determined in advance and then the sum of the differences between the actual values and the target numerical values of a plurality of evaluation elements is minimized. Alternatively, the performance may be indexed for each evaluation element, and the first to fourth patterns of the first to fourth regions 331, 332, 333, and 334 may be optimized so that a value representing the performance may be maximized.

Various types of color separation lens array 330 may be obtained through the above-described optimized design according to the size and thickness of the first to fourth regions 331, 332, 333, and 334 of the color separation lens array 330, the color characteristics and the pixel pitch of an image sensor to which the color separation lens array 300 is applied, the distance between the color separation lens array 330 and the sensor substrate 500, and the incident angle of incident light.

The above-described specific patterns of the color separation lens array 330 are merely examples and may be variously modified. For example, according to the different pattern types of the first to fourth regions 331, 332, 333, and 334 of the color separation lens array 330, it is possible to separate light of wavelength bands other than visible light. Also, the number of color separation patterns constituting one unit pattern array in the color separation lens array 330 may vary depending on application examples of the color separation lens array 330. The pixel arrangement of the image sensor has been described by exemplifying the Bayer pattern, but is not limited thereto, and may also be applied to the pixel arrangement shown in FIGS. 3B and 3C. A pattern suitable for this pixel arrangement may be determined by adopting regions of the color separation lens array 330 and using the above-described optimization method for each region.

Figure 21:
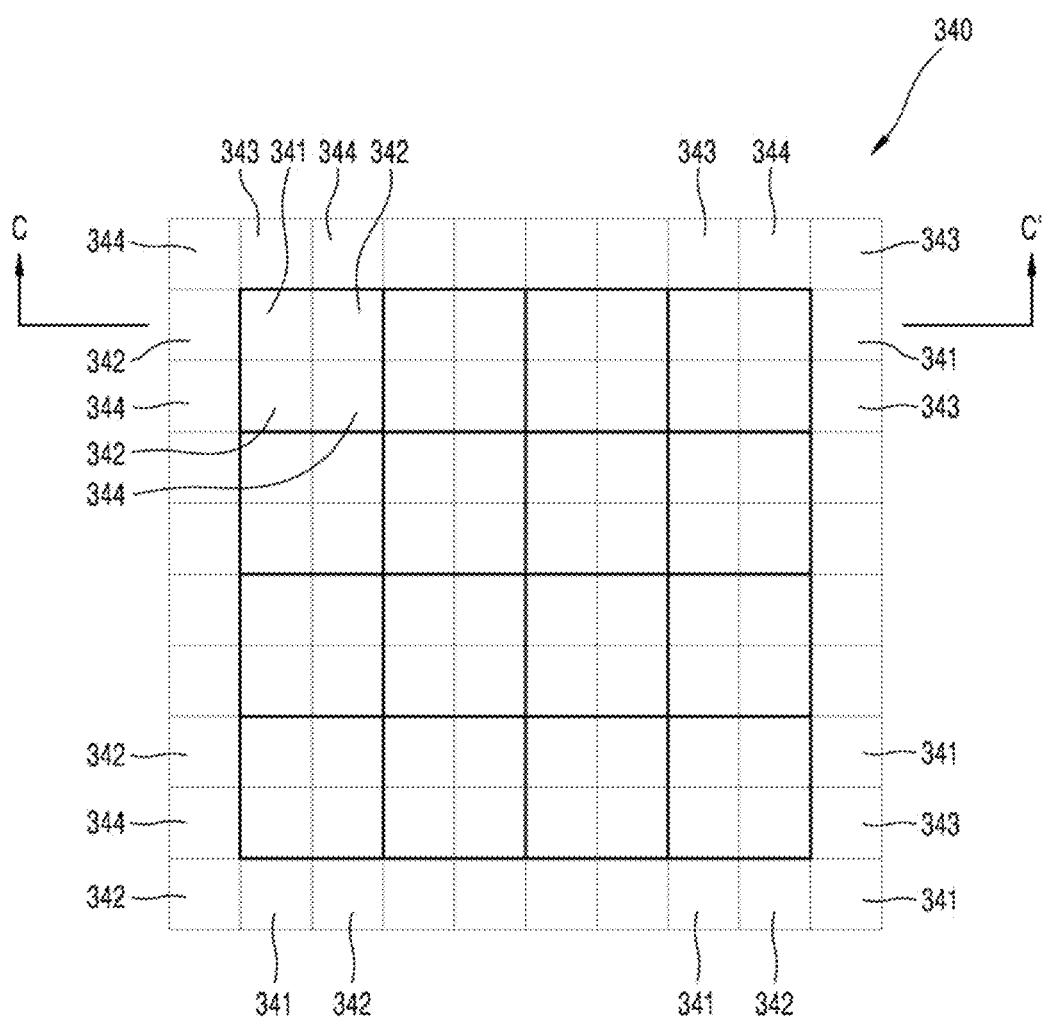
FIG. 21 is a plan view illustrating a color separation lens array according to another embodiment.

FIG. 21 is a plan view illustrating a color separation lens array 340 according to another embodiment. Referring to FIG. 21, the color separation lens array 340 may include a plurality of unit pattern arrays indicated by bold lines and arranged two-dimensionally. Each unit pattern array may be arranged in the form of 2×2 including a first region 341, a second region 342, a third region 343, and a fourth region 344. In the entire structure of the color separation lens array 340, the first region 341 and the second region 342 are alternately arranged in the horizontal direction within one row, and the third region 343 and the fourth region 344 are alternately arranged in the horizontal direction within another row. In addition, the first region 341 and the third region 343 are alternately arranged in the longitudinal direction within one column, and the second region 342 and the fourth region 344 are alternately arranged in the longitudinal direction within another column.

In addition, the color separation lens array 340 may further include a plurality of first to fourth regions 341, 342, 343, and 344 that are not included in any of the unit pattern arrays. The first to fourth regions 341, 342, 343, and 344 that are not included in any of the unit pattern arrays may be arranged along the edge of the color separation lens array 340. In other words, a plurality of second regions 342 and a plurality of fourth regions 344 constituting one column are additionally arranged at the left edge of the color separation lens array 340, a plurality of first regions 341 and a plurality of third regions 343 constituting one column are additionally arranged at the right edge, a plurality of third regions 343 and a plurality of fourth regions 344 constituting one row are additionally arranged at the upper edge, and a plurality of first regions 341 and a plurality of second regions 342 constituting one row may be additionally arranged at the lower edge.

Figures 22, 23:
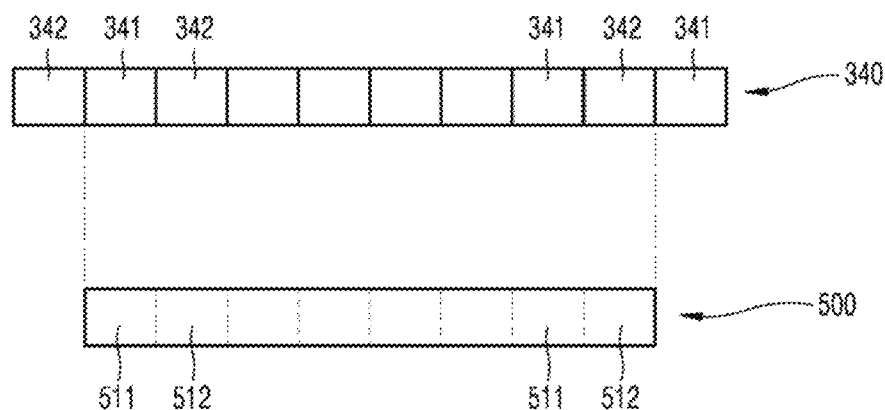
FIG. 22 is a cross-sectional view illustrating a schematic structure of a pixel array of an image sensor including the color separation lens array shown in FIG. 21.
FIG. 23 illustrates a principle of improving light efficiency by a color separation lens array in an image sensor according to an embodiment.

FIG. 22 is a cross-sectional view illustrating a schematic structure of a pixel array of an image sensor including the color separation lens array 340 shown in FIG. 21. The cross-section in FIG. 22 is a cross-section of the color separation lens array 340 of FIG. 21 taken along line C-C'. Referring to FIG. 22, the color separation lens array 340 may include a plurality of first regions 341 and a plurality of second regions 342 that are arranged to protrude in a horizontal direction with respect to an edge of the sensor substrate 500 and do not face any photo-sensing cell in the vertical direction. Although not all shown in FIG. 22, the plurality of first to fourth regions 341, 342, 343, and 344 that are not included in any unit pattern array in FIG. 21 are all arranged to protrude in the horizontal direction and the longitudinal direction with respect to the corresponding edges of the sensor substrate 500 and do not face any photo-sensing cell in the vertical direction.

As described with reference to FIGS. 8A to 8D, 9A to 9D, and 10A to 10D, a photo-sensing cell receives light not only from a corresponding region of the color separation lens array 340 in the vertical direction, but also from a plurality of other regions around the region. Therefore, when there are not the first to fourth regions 341, 342, 343, and 344 added along the edges of the color separation lens array 340, the amount of light incident on the photo-sensing cells arranged along the edges of the sensor substrate 500 may decrease, and color purity may also decrease.

When the first to fourth regions 341, 342, 343, and 344 are additionally arranged along the edges of the color separation lens array 340, light may be provided to photo-sensing cells arranged along the edges of the sensor substrate 500 in the same manner as photo-sensing cells arranged inside the sensor substrate 500. The embodiments shown in FIGS. 21 and 22 may also be applied to a color separation lens array including an arrangement of a plurality of nanoposts described above.

FIG. 23 illustrates a principle of improving light efficiency by a color separation lens array in the image sensor 200 according to the embodiment. Hereinafter, for convenience, a reference numeral of the color separation lens array is indicated as 300, but the color separation lens arrays 300, 330, 400, 450, 460, and 470 of various embodiments described above may be used.

Referring to FIG. 23, as the image sensor 200 includes the color separation lens array 300 that separates light according to color to make the separated light enter the plurality of photo-sensing cells 511, 512, and 513 of the sensor substrate 500, a light component incident through a region of the color separation lens array 300 corresponding to a pixel of the image sensor 200 is incident on the pixel, and in addition, light incident on regions corresponding to a plurality of surrounding pixels surrounding the pixel, for example, four or eight surrounding pixels, is also incident on the pixel by the color separation lens array 300.

As illustrated in FIG. 23, a light component incident on a pixel R33 may be the sum of a red light component, which is incident through a region of the color separation lens array 300 corresponding to the pixel R33, and red light components, which are branched by the color separation lens array 300 from light incident on regions corresponding to pixels G23, G32, G34, and G43 and pixels B22, B24, B42, and B44 and are incident on the pixel R33.

By applying the color separation lens array 300 for separating light according to color to the image sensor 200, as described above, in addition to a light component incident on a unit pixel, incident light corresponding to the light component from surrounding pixels may be condensed, and thus, light efficiency may be improved.

Figure 24A:
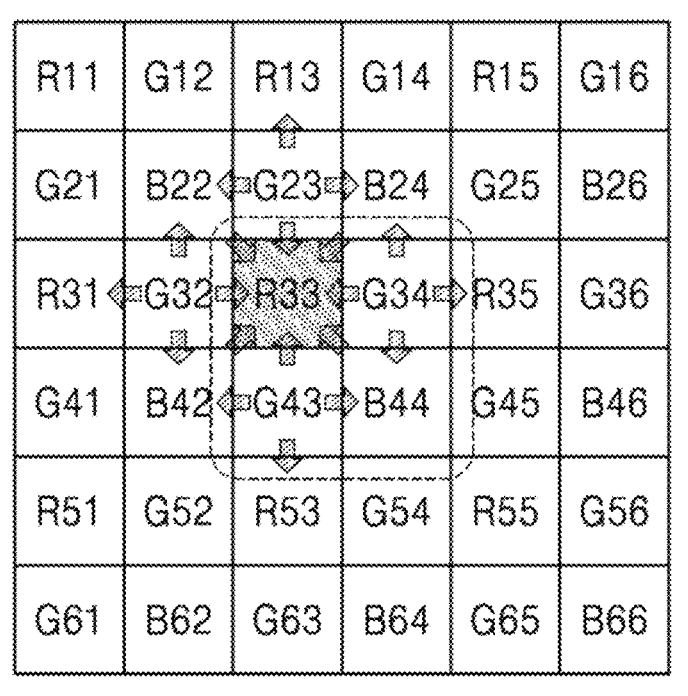
Figure 24C:
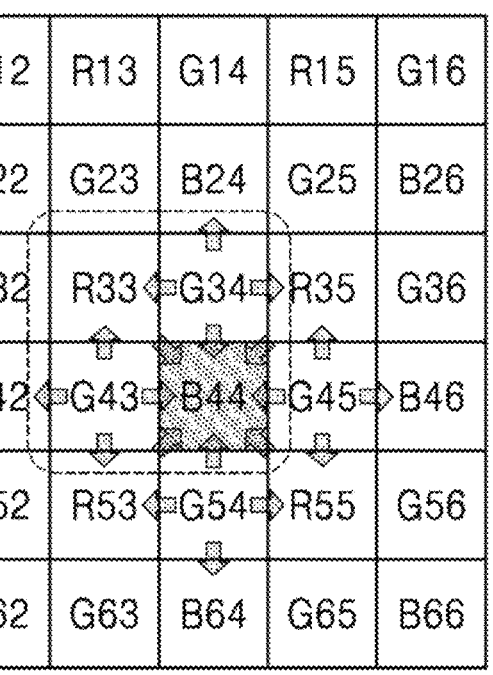

FIGS. 24A to 24C illustrate an increase in the amount of light incident on a unit pixel of the Bayer pattern array of the image sensor 200 to which the color separation lens array 300 is applied. FIG. 24A illustrates an increase in the amount of light incident on a red pixel of the unit pixel, FIG. 24B illustrates an increase in the amount of light incident on two green pixels of the unit pixel, and FIG. 24C illustrates an increase in the amount of light incident on a blue pixel of the unit pixel. In the Bayer pattern array, the unit pixel includes a red pixel R, two green pixels G, and a blue pixel B. The red pixel R and the blue pixel B may be arranged in a diagonal direction with each other, and the two green pixels G may be arranged in other diagonal direction crossing the arrangement of the red pixel R and the blue pixel B in the diagonal direction. The Bayer pattern array corresponds to a plurality of two-dimensional arrays of such unit pixels. With reference to FIGS. 24A to 24C, an example of a unit pixel including a red pixel R33, two green pixels G34 and G43, and a blue pixel B44 will be described.

Referring to FIG. 24A, a light component incident on a red pixel R33 may include a red light component, which is incident through a region of the color separation lens array 300 corresponding to the red pixel R33, and red light components, which are branched by the color separation lens array 300 from light incident on regions corresponding to green pixels G23, G32, G34, and G43 positioned in horizontal and vertical directions and blue pixels B22, B24, B42, and B44 positioned in a diagonal direction and are incident on the red pixel R33.

Referring to FIG. 24B, a light component incident on a green pixel G34 may include a green light component, which is incident through a region of the color separation lens array 300 corresponding to the green pixel G34, and green light components, which are branched by the color separation lens array 300 from light incident on regions corresponding to red pixels R33 and R35 and blue pixels B24 and B44 positioned in the horizontal and vertical directions and are incident on the green pixel G34. In addition, the light component incident on the green pixel G34 may include green light components, which are branched by the color separation lens array 300 from light incident on regions corresponding to green pixels G23, G25, G43, and G45 positioned in the diagonal direction and are incident on the green pixel G34.

A light component incident on a green pixel G43 may include a green light component, which is incident through a region of the color separation lens array 300 corresponding to the green pixel G43, and green light components, which are branched by the color separation lens array 300 from light incident on regions corresponding to blue pixels B42 and B44 and red pixels R33 and R53 positioned in the horizontal and vertical directions and are incident on the green pixel G43. In addition, the light component incident on a green pixel G43 may include green light components, which are branched by the color separation lens array 300 from light incident on regions corresponding to green pixels G32, G34, G52, and G54 positioned in the diagonal directions and are incident on the green pixel G43.

Referring to FIG. 24C, a light component incident on a blue pixel B44 may include a blue light component, which is incident through a region of the color separation lens array 300 corresponding to the blue pixel B44, and blue light components, which are branched by the color separation lens array 300 from light incident on regions corresponding to green pixels G34, G43, G45, and G54 positioned in horizontal and vertical directions and red pixels R33, R35, R53, and R55 positioned in the diagonal directions and are incident on the blue pixel B44.

As such, by applying the color separation lens array 300 for separating light according to color to the image sensor 200, the amount of light for a color corresponding to a certain pixel may be additionally secured from four or eight surrounding pixels surrounding the certain pixel, and thus, light efficiency may be improved.

Figure 25:
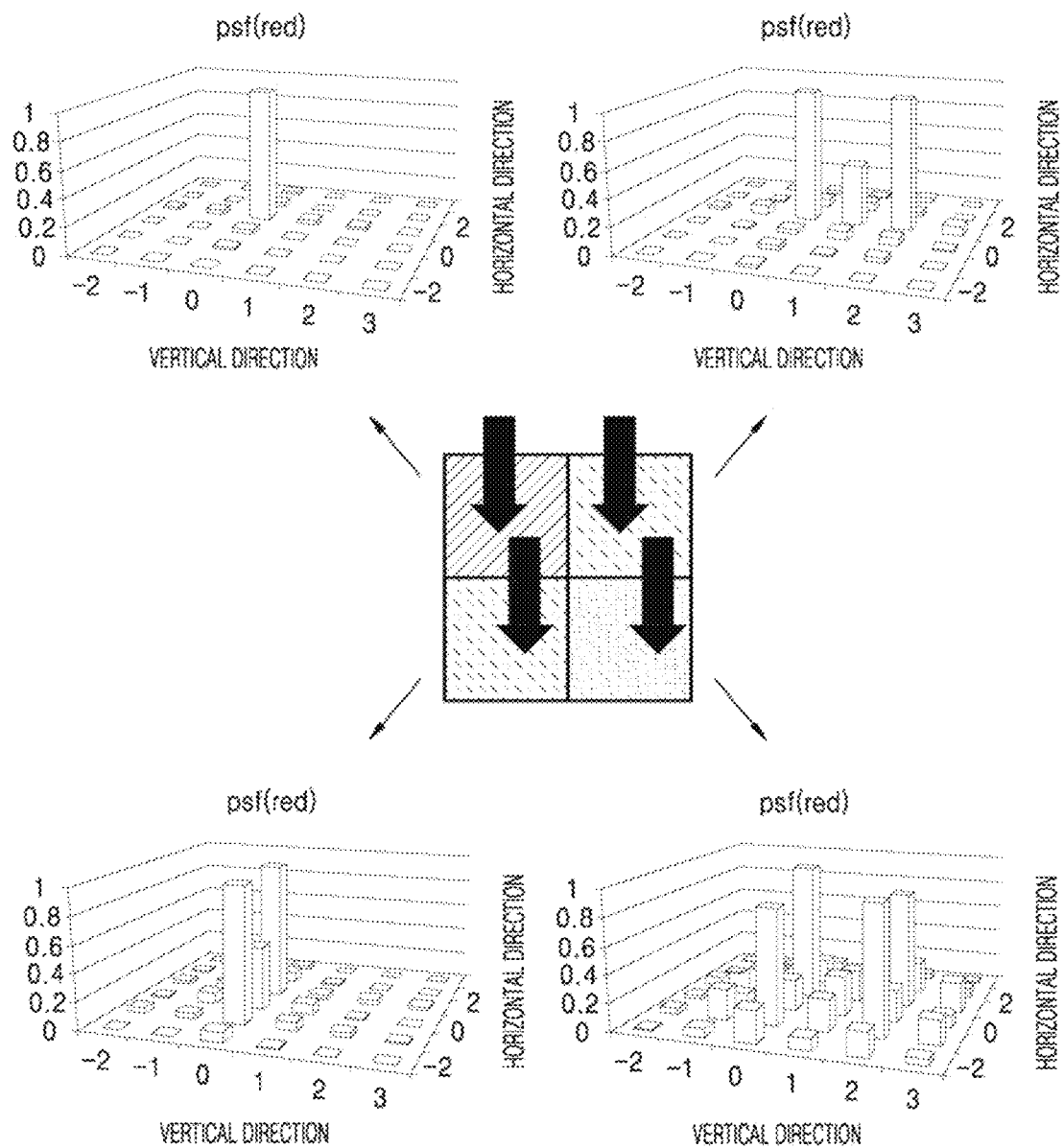
FIG. 25 illustrates point spread function (PSF) characteristics by a color separation lens array of an image sensor according to an embodiment.

FIG. 25 illustrates point spread function (PSF) characteristics by the color separation lens array 300 of the image sensor 200 according to an embodiment. The sizes of PSF bar graphs at upper left, upper right, lower left, and lower right of FIG. 25 represents normalized values. FIG. 25 illustrates color separation characteristics by regions of the color separation lens array 300 corresponding to a red pixel R, two green pixels G, and a blue pixel B, which are in a unit pixel of a Bayer pattern array, when red light is incident on the color separation lens array 300.

As can be seen from the PSF bar graph shown at the upper left of FIG. 25, when red light is incident on a region of the color separation lens array 300 corresponding to the red pixel R, a red light component reaches only the red pixel R. As can be seen from the PSF bar graph at the upper right of FIG. 25, when red light is incident on a region of the color separation lens array 300 corresponding to the green pixel G, a larger amount of red light components reaches red pixels R positioned at both sides of the green pixel G in the vertical direction. As can be seen from the PSF bar graph at lower left of FIG. 25, when red light is incident on a region of the color separation lens array 300 corresponding to the green pixel G, a larger amount of red light components reaches red pixels R positioned at both sides of the green pixel G in the horizontal direction. As can be seen from the PSF bar graph at the lower right of FIG. 35, when red light is incident on a region of the color separation lens array 300 corresponding to the blue pixel B, a larger amount of red light components reaches red pixels R positioned at both sides of the blue pixel B in the diagonal directions.

Figure 26:
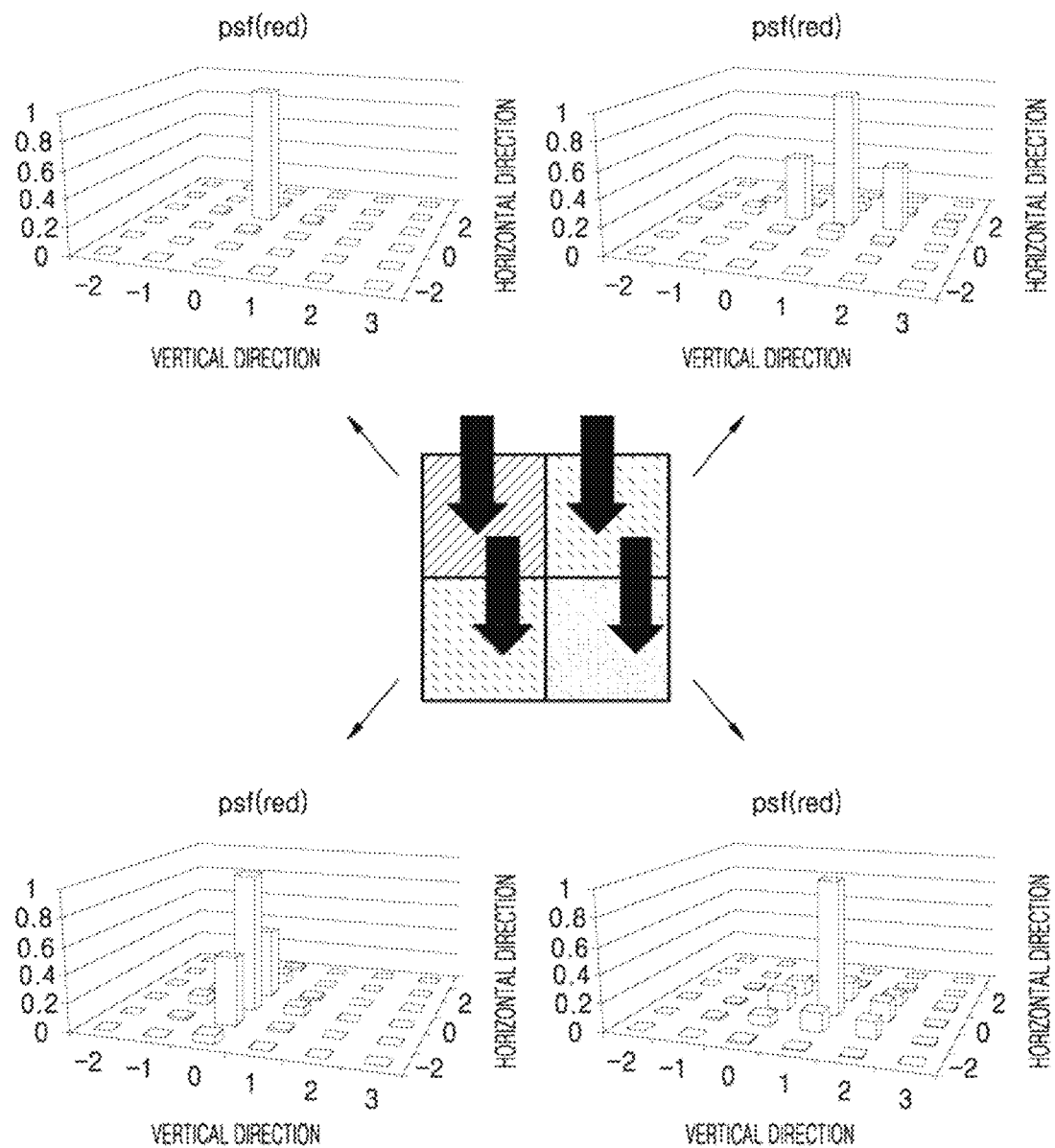
FIG. 26 is a comparative example, which illustrates PSF characteristics by an absorption-type color filter when the absorption-type color filter is applied to an image sensor.

FIG. 26 is a comparative example, which illustrates PSF characteristics by an absorption-type color filter when the absorption-type color filter is applied to an image sensor. The sizes of PSF bar graphs at the upper left, upper right, lower left, and lower right of FIG. 26 represents normalized values. FIG. 26 illustrates PSF bar graphs for a red filter region R, two green filter regions G, and a blue filter region B of the absorption-type color filter, which correspond to a unit pixel of a Bayer pattern array, when red light is incident on the absorption-type color filter having the Bayer pattern array.

As can be seen from the PSF bar graph shown at the upper left of FIG. 26, when red light is incident on the red filter region R, a red light component reaches only a red pixel R. As can be seen from the PSF bar graph at the upper right of FIG. 26, when red light is incident on the green filter region G, a smaller amount of red light components reaches red pixels R, which are positioned at both sides of a green pixel G, than the green pixel G in the vertical direction. As can be seen from the PSF bar graph at the lower left of FIG. 26, when red light is incident on the green filter region G, a smaller amount of red light components reaches red pixels R, which are positioned at both sides of a green pixel G, than the green pixel G in the horizontal direction. As can be seen from the PSF bar graph at the lower right of FIG. 26, when red light is incident on the blue filter region B, a smaller amount of red light components reaches red pixels R, which are positioned at both sides of a blue pixel B, than the blue pixel B in the diagonal direction.

As can be seen from the comparison of PSF bar graph distributions of FIGS. 25 and 26, by applying the color separation lens array 300 for separating light according to color to the image sensor 200, the amount of light for a color corresponding to a certain pixel may be additionally secured from four or eight surrounding pixels surrounding the certain pixel, and thus, light efficiency may be improved. On the other hand, in the existing image sensor to which the absorption-type color filter is applied, it is difficult to additionally secure the amount of light for a color corresponding to a certain pixel from surrounding pixels, and thus, light efficiency is significantly lower than that of a case in which the color separation lens array 300 is employed.

By applying the color separation lens array 300 for separating light according to color to the image sensor 200, the amount of light for a color corresponding to a certain pixel is additionally secured from four or eight surrounding pixels surrounding the certain pixel, and Information of the surrounding pixels is convoluted into the certain pixel.

According to the image acquisition apparatus 100 according to the embodiment, the color separation lens array 300 has an advantage in terms of spatial resolution as the light efficiency is improved. Because a larger amount of light may be received, a signal-to-noise ratio may increase, and thus, more high-frequency components of the signal may be preserved. However, due to condensing characteristics and crosstalk, pieces of information of surrounding pixels are mixed. Therefore, there is a need for an algorithm for solving a deterioration phenomenon while increasing the advantage of the color separation lens array 300. The crosstalk PSF of the color separation lens array 300 is a ratio of color mixing in a spectral aspect, but acts as a blur kernel in a spatial aspect.

According to the image acquisition apparatus 100 including the image sensor 200 to which the color separation lens array 300 is applied, the application of an algorithm capable of reducing the deterioration of image resolution while maintaining such a light efficiency improvement effect is required.

Figure 27:
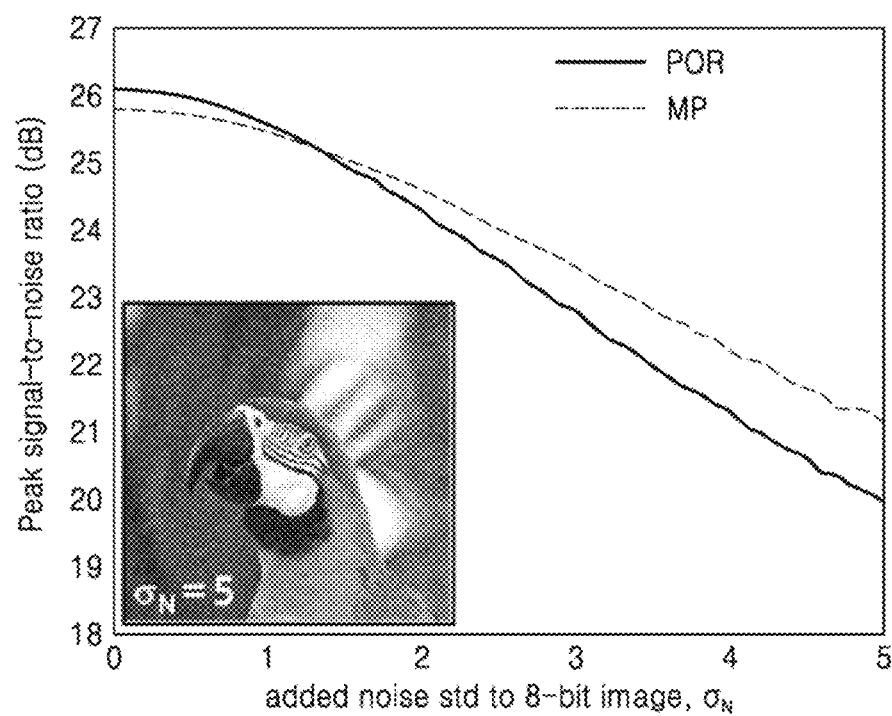
FIG. 27 illustrates a peak signal-to-noise ratio (PSNR) according to external noise conditions.

FIG. 27 illustrates a peak signal-to-noise ratio (PSNR) according to external noise conditions. In FIG. 27, "POR" is a graph for a product of reference (hereinafter, referred to a reference product), and "MP" is a graph for a sensing image to which a color separation lens array is applied. The PSNR represents a signal-to-noise ratio when a mean squared error with respect to an original image is calculated as noise.

As can be seen from FIG. 27, in a low noise environment (high illumination), the PSNR of the color separation lens array MP is lower than that of the reference product POR due to a decrease in spatial resolution, and in a noisy environment (low illumination), the PSNR of the color separation lens array MP is higher than that of the reference product POR due to an increase in sensitivity due to the improvement of light efficiency.

Figure 28:
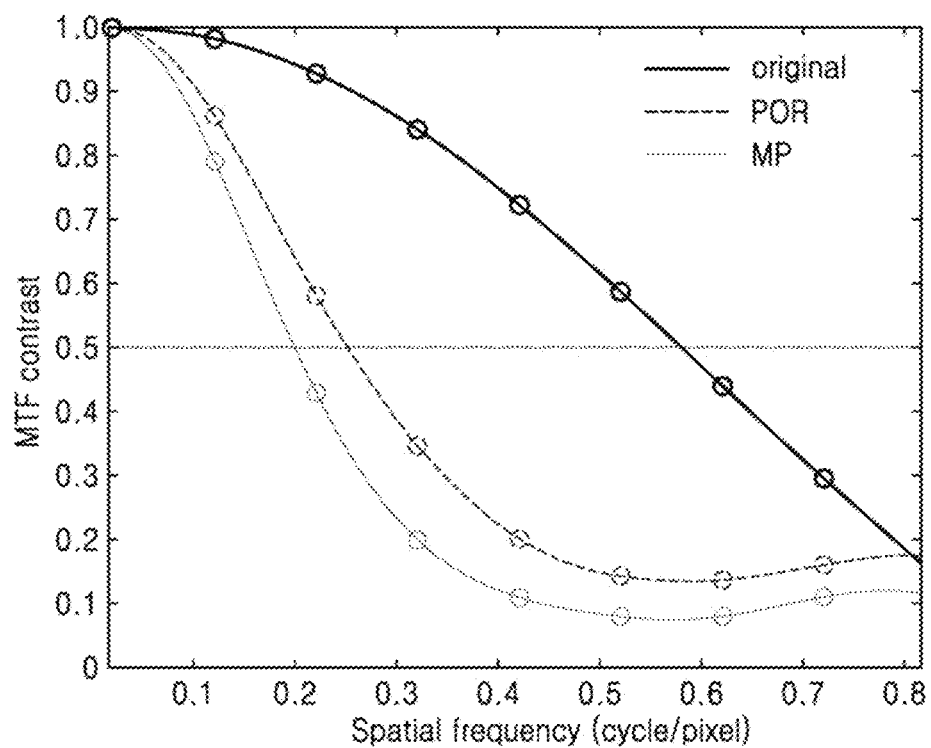
FIG. 28 illustrates the spatial resolution of an image sensor and illustrates a modulation transfer function (MTF) at σ=0.
Figure 29:
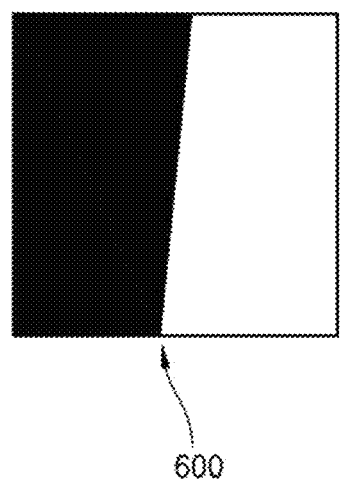
FIG. 29 illustrates an inclined edge image.

FIG. 28 illustrates the spatial resolution of an image sensor and illustrates a modulation transfer function (MTF) at σ=0. In FIG. 28, "original" is a graph for a case where there is no external noise and an ideal module lens is assumed, and a graph for the color separation lens array MP and a graph for the reference product POR are obtained by calculating an MTF curve by applying the PSF of the color separation lens array MP (see FIG. 34) and the PSF of the reference product POR to an inclined edge image 600 as in FIG. 29. Referring to FIG. 28, the MTF50 of the color separation lens array MP is about 85% compared to the reference product POR.

As can be seen in FIGS. 27 and 28, a demosaicing algorithm is required to reduce a decrease in sensitivity of the image sensor 200 to which the color separation lens array 300 is applied, and to reduce spatial resolution deterioration in high illumination.

According to the image acquisition apparatus 100 according to the embodiment, the signal processor 250 may be configured to perform, in a sub-image domain, a deconvolution algorithm to solve a blur phenomenon occurring in the image sensor 200 including the color separation lens array 300, and then perform, for example, a demosaicing algorithm combined with a level balance, and a color correction algorithm. Thus, in terms of spatial resolution, a blur phenomenon may be overcome and grid artifacts may be removed, and in terms of spectral resolution, by performing color correction, a problem of deterioration occurring in the image sensor 200 including the color separation lens array 300 may be solved. Accordingly, an improved image resolution may be secured while a light efficiency improvement effect is maintained.

Figure 30:
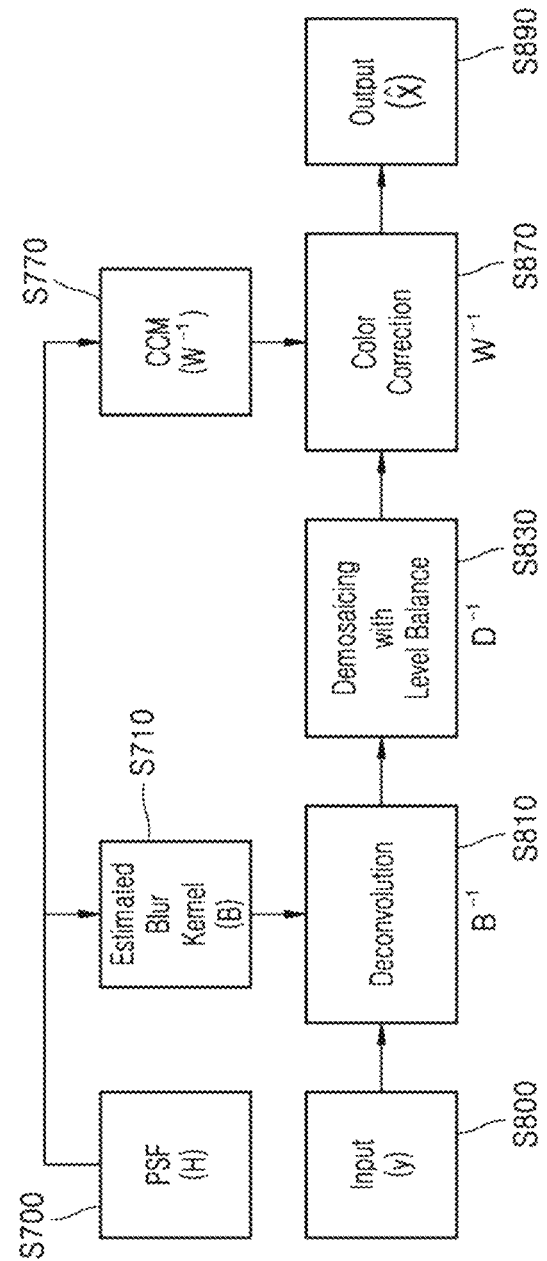
FIG. 30 schematically illustrates a process of processing a color image signal obtained by an image sensor in a signal processor of an image acquisition apparatus according to an embodiment.

FIG. 30 schematically illustrates a process of processing a color image signal obtained by the image sensor 200 in the signal processor 250 of the image acquisition apparatus 100 according to an embodiment.

Referring to FIG. 30, according to the image acquisition device 100 according to the embodiment, a sensing signal Input(y) of a plurality of photo-sensing cells of the image sensor 200 and a crosstalk PSF of the color separation lens array 300 are used as an input value (S800, S700).

According to the image acquisition apparatus 100 according to the embodiment, a color correction matrix may be configured using a PSF of the color separation lens array 300, for example, a crosstalk PSF (operation S770). In addition, by using the crosstalk PSF of the color separation lens array 300, a blur kernel may be estimated, for example, by a regularization method (operation S710), and the estimated blur kernel may be used when performing deconvolution (operation S810). Because the color correction matrix and the blur kernel each have a fixed value as long as the structure of the color separation lens array 300 is not changed, the color correction matrix and the blur kernel may be configured in a lookup table format and may be stored in the image acquisition device 100.

The image acquisition apparatus 100 according to an embodiment may perform a process of restoring an input image by using at least one of the color correction matrix and the blur kernel. The process of restoring the input image may include, for example, deconvolution (B-1), demosaicing (D-1), and color correction (W-1) (operations S810, S830, and S870).

Deconvolution may be performed, in a sub-image domain, on sensing signals of a plurality of photo-sensing cells of the image sensor 200 (operation S810). The deconvolution may be performed for each position of a pattern image acquired by each color pixel arrangement by the color separation lens array 300. For example, when a unit pixel includes four color pixels P1, P2, P3, and P4 in a 2×2 array as in FIG. 33 to be described later, the deconvolution may be performed for each position (e.g. the positions of the color pixels P1, P2, P3, and P4) of a pattern image acquired by each color pixel arrangement.

A blur kernel may be further used as an additional input value during deconvolution in order to solve the deterioration of spatial resolution due to a blur phenomenon (operation S710).

The crosstalk PSF of the color separation lens array 300 is a ratio of color mixing in a spectral aspect, but leads to deterioration in spatial resolution due to a blur phenomenon in a spatial aspect. A blur kernel may be used to solve the deterioration of spatial resolution caused by the blur phenomenon. The blur kernel may be estimated by, for example, a regularization method using a crosstalk PSF of the color separation lens array 300. During deconvolution, the estimated blur kernel may be used (operations S710 and S810).

After the deconvolution, demosaicing for restoring an image having a full resolution from an image sub-sampled by the color pixel arrangement of the color separation lens array 300 may be performed (operation S830). During demosaicing, output images of three channels are obtained for an input image of one channel. A demosaicing algorithm may be applied in various ways. In addition, a level balance algorithm may be additionally applied to solve the deterioration of spatial resolution due to grid artifacts during demosaicing. FIG. 30 illustrates a case in which a level balance algorithm is additionally applied during demosaicing.

In addition, color correction may be performed to solve spectral resolution deterioration due to color degradation (operation S870). Color may be corrected using a color correction matrix (CCM) configured using a PSF corresponding to each color pixel by the color separation lens array 300 (operations S770 and S870). For input images of three channels, a color correction matrix may be applied as an additional input value to output a 3-channel image, and accordingly, an output image Output($\hat{X}$) in which the spectral resolution deterioration is solved may be obtained (operation S890).

Figure 31:
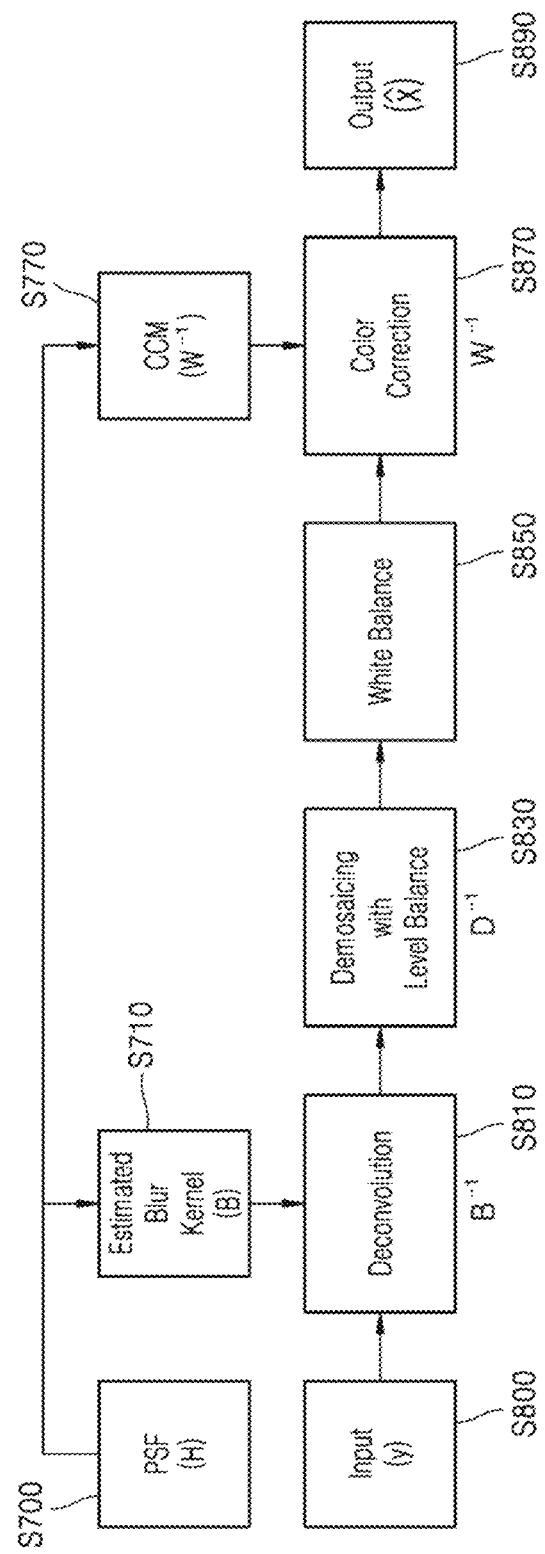
FIG. 31 schematically illustrates a process of processing a color image signal obtained by an image sensor in a signal processor of an image acquisition apparatus according to another embodiment.

As shown in FIG. 31, the signal processor 250 may be configured to additionally perform white balance (operation S850). White balance may be performed after demosaicing and before color correction.

According to the image acquisition apparatus 100 according to the embodiment, the deterioration of spatial resolution due to a blur phenomenon and grid artifacts may be solved in the deconvolution and demosaicing operations, and an output image Output($\hat{X}$) in which the spectral resolution deterioration is solved may be output in the color correction operation.

According to the image acquisition apparatus 100 according to the embodiment, a blur phenomenon may be reduced and thus sharpness may be increased in an edge region of an image, and grid artifacts in a flat region may be removed.

According to the image acquisition apparatus 100 according to the embodiment, a CCM may be configured using the PSF of crosstalk generated by the color separation lens array 300, and a blur kernel may be estimated through simulation. In addition, based on this, an original image may be restored from a deteriorated image by sequentially performing inverse filtering corresponding to blurring, sub-sampling, and color degradation. The inverse filtering corresponding to blurring, sub-sampling, and color degradation may be defined as deconvolution B-1, demosaicing D-1, and color correction W-1, respectively.

In the image acquisition apparatus 100 according to the embodiment, a deconvolution process for overcoming the blur phenomenon may be performed, for example, as follows.

The crosstalk PSF of the color separation lens array 300 is a ratio of color mixing in a spectral aspect, but may act as a blur kernel in a spatial aspect. In order to perform deconvolution while overcoming a blur phenomenon occurring in the image sensor 200 to which the color separation lens array 300 is applied, a modeling as shown in Equation 4 below may be established.

$$y = \begin{bmatrix} y_{P1(B)} \\ y_{P2(G)} \\ y_{P3(R)} \\ y_{P4(G)} \end{bmatrix} = \begin{bmatrix} \tilde{B}_{P1(B)} & 0 & 0 & 0 \\ 0 & \tilde{B}_{P2(G)} & 0 & 0 \\ 0 & 0 & \tilde{B}_{P3(R)} & 0 \\ 0 & 0 & 0 & \tilde{B}_{P4(G)} \end{bmatrix} \begin{bmatrix} x_{B1} \\ x_{G2} \\ x_{R3} \\ x_{G4} \end{bmatrix} = \tilde{B}x \quad \text{[Equation 4]}$$

Here, y denotes an image deteriorated by blurring, x denotes an original image, and denotes a blur matrix. However, it may be difficult to directly specify a blur kernel by using the crosstalk PSF. Therefore, when indicated by position, for example, a total of 48 PSFs may be specified by approximating to 4 kernels. First, an image in which only spectral resolution is deteriorated may be defined as x, and an image in which spectral resolution and spatial resolution are deteriorated by the crosstalk PSF may be defined as y. That is, color degradation may be set as a control variable. A process of estimating a blur kernel from the images may be expressed as Equation 5 below.

$$\tilde{B} = \arg\min_{B} \left\{ \sum_{i=1}^{K} \left\| y^{(i)} - Bx^{(i)} \right\|^2 \right\} \quad \text{[Equation 5]}$$

Here, K denotes the number of datasets and is for designing a filter that may satisfy multiple datasets at the same time.

In this optimization, a solution may be specified as shown in Equation 6 below through the method of least-squares.

$$\tilde{B} = \left[ \sum_{i=1}^{K} x^{(i)T} x^{(i)} \right]^{-1} \left[ \sum_{i=1}^{K} x^{(i)T} y^{(i)} \right] \quad \text{[Equation 6]}$$

Here, because x and y each denote an image, it is easy to perform an operation by converting the x and y into a frequency domain, and a blur kernel may be specified by performing windowing after finally converting into a spatial domain.

Figure 32:
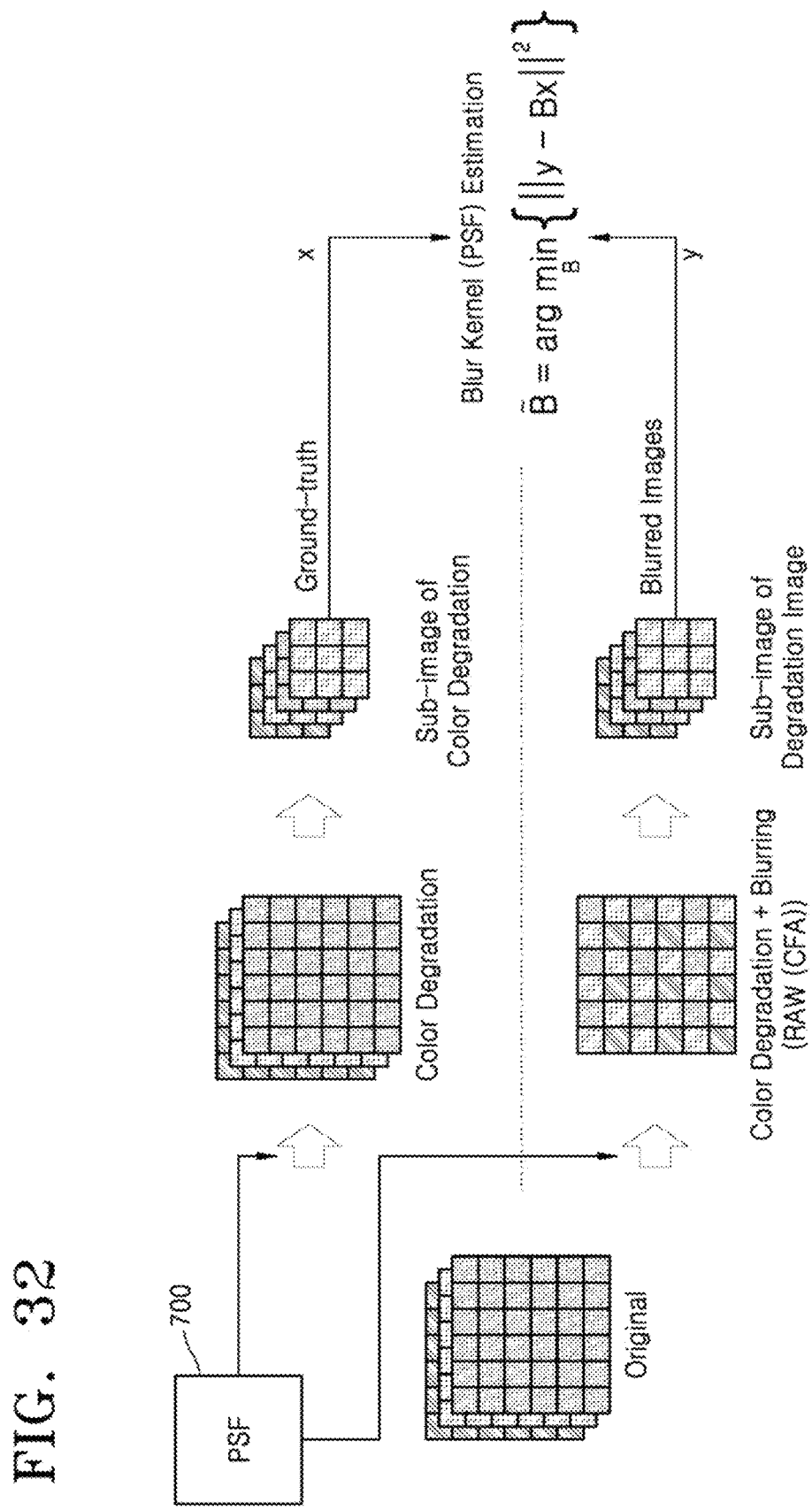
FIG. 32 illustrates a process of estimating a blur kernel from a crosstalk PSF of a color separation lens array by using color degradation as a control variable.

FIG. 32 illustrates a process of estimating a blur kernel from a crosstalk PSF of a color separation lens array by using color degradation as a control variable.

A blur kernel B that determines a decrease in spatial resolution of the image acquisition apparatus 100 according to an embodiment may be statistically inferred by applying a regularization method to, for example, 24 basic KODAK image sets. For example, the blur kernel B may be inferred by obtaining a value of B that minimizes for each KODAK image, and then calculating an average of the value of B and applying, a regularization method according to Equations 4, 5, and 6 that are typical blur kernel equations of the image acquisition apparatus 100 according to the embodiment.

For example, in the image acquisition apparatus 100 to which the color separation lens array 300 according to an example embodiment is applied, the blur kernel may be estimated through a series of processes as follows.

Figure 33:
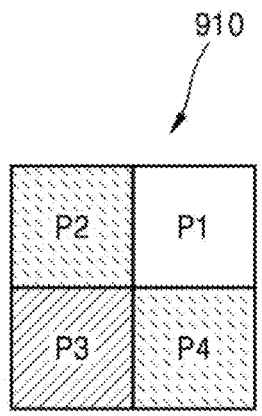
FIG. 33 illustrates an example in which a unit pixel includes four color pixels in a 2×2 array, and illustrates a Bayer unit pixel.
Figure 34:
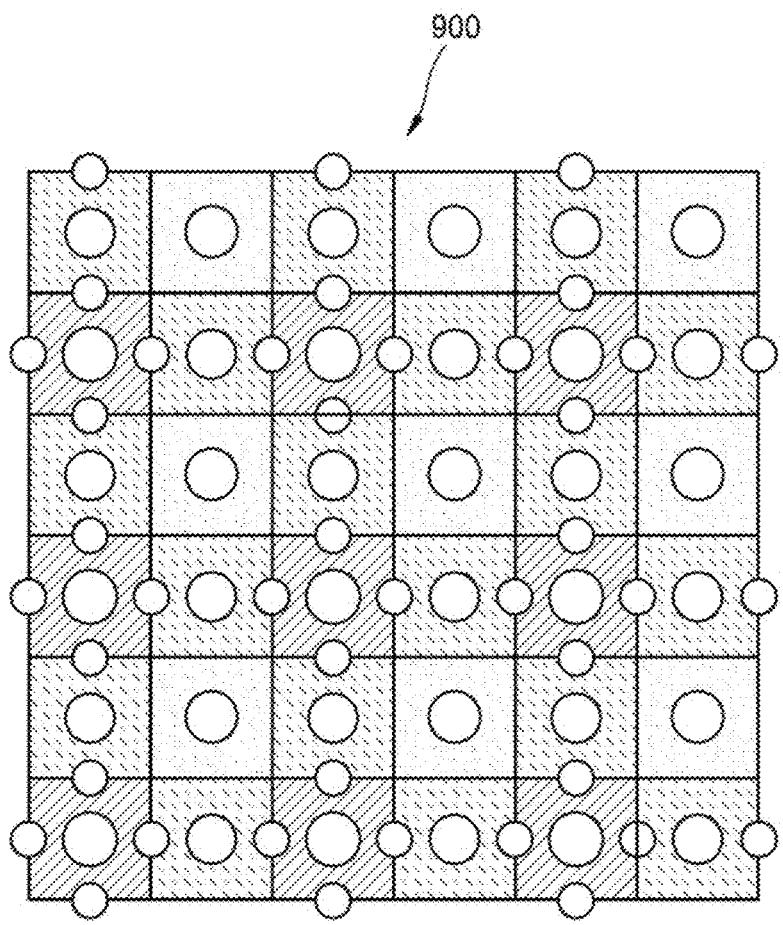
FIG. 34 illustrates a color separation lens array forming a two-dimensional array arrangement of unit pixels of FIG. 33.
Figure 35:
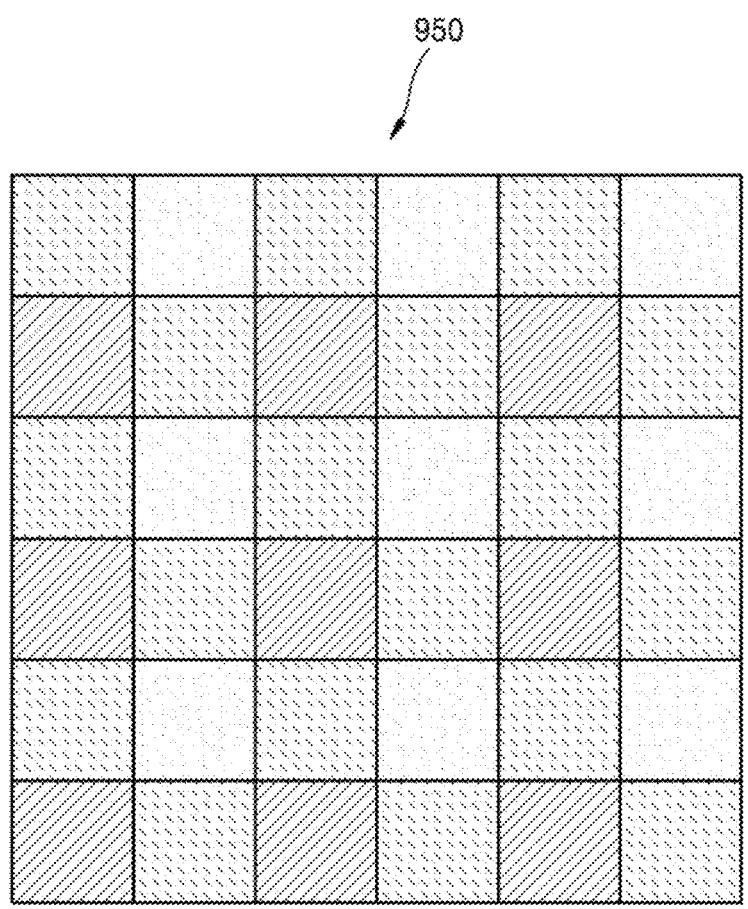
FIG. 35 illustrates a Bayer color filter array, which is a two-dimensional array arrangement of the unit pixels of FIG. 33, and corresponds to a product of reference (POR)

FIG. 33 illustrates an example in which a unit pixel 910 includes four color pixels P1, P2, P3, and P4 in a 2×2 array, and illustrates a Bayer unit pixel. In FIG. 33, the color pixel P1 may be a blue pixel, the color pixel P2 may be a green pixel, the color pixel P3 may be a red pixel, and the color pixel P4 may be a green pixel. FIG. 34 illustrates a color separation lens array 900 forming a two-dimensional array arrangement of the unit pixels 910 of FIG. 33. In FIG. 34, a checkerboard pattern forming a background of the color separation lens array 900 shows a Bayer color pixel arrangement formed by the color separation lens array 900. FIG. 35 illustrates a Bayer color filter arrangement 950, which is a two-dimensional array arrangement of the unit pixels 910 of FIG. 33, and corresponds to a POR.

Figure 36:
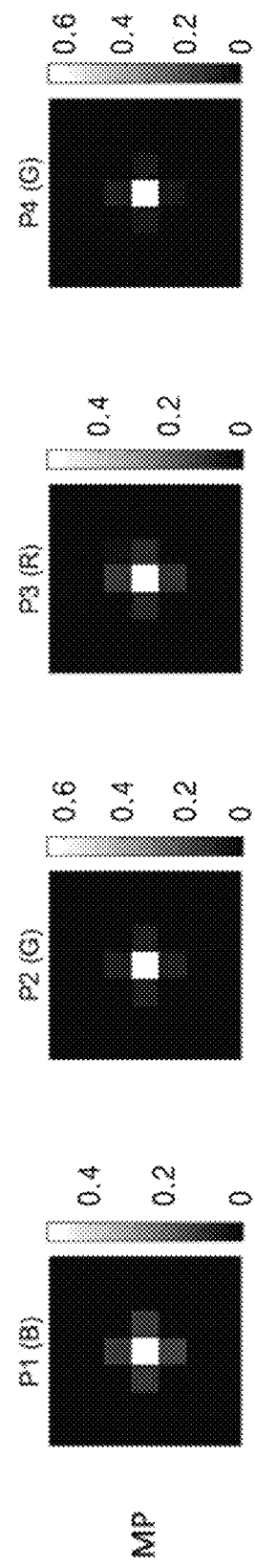
FIG. 36 illustrates a blur kernel estimated using a crosstalk PSF of a color separation lens array.

As shown in FIG. 34, when a Bayer color pixel arrangement is formed by the color separation lens array 900, a blur kernel may be estimated using the crosstalk PSF of the color separation lens array 900, for example, as in FIG. 36. That is, as shown in FIG. 36, the blur kernel may be estimated to be in the form of a 3×3 low-pass filter for four color pixels P1, P2, P3, and P4, and it can be seen that a blurring phenomenon occurs enough to be qualitatively confirmed.

Figure 37:
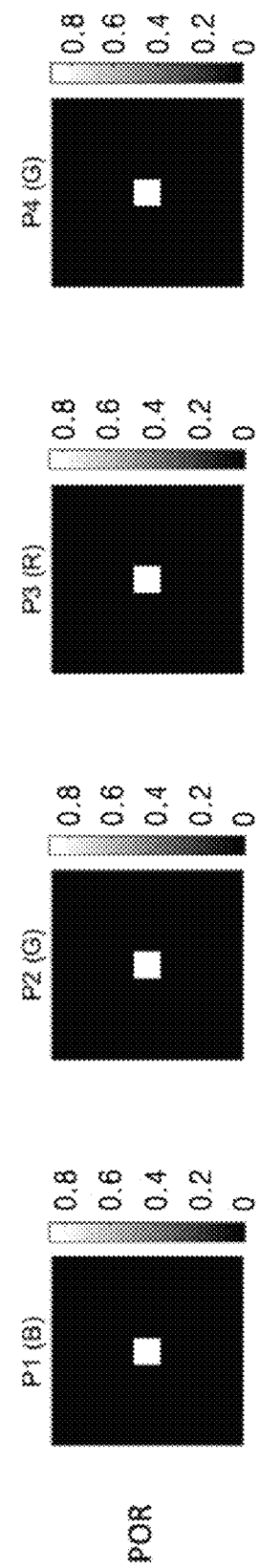
FIG. 37 illustrates that a blur kernel for a Bayer color filter array corresponding to a POR is close to a delta function.

On the other hand, for the Bayer color filter arrangement 950 corresponding to the POR, which is shown in FIG. 35, the blur kernel may be close to a delta function as in FIG. 37.

Comparing FIGS. 36 and 37, it can be seen that a blurring phenomenon occurs when the color separation lens array 900 is applied. When the color separation lens array 900 is applied, the blurring phenomenon may be more severe in a red (R) channel or a blue (B) channel than in a green (G) channel.

Deteriorated spatial resolution may be improved by using the blur kernel estimated using the crosstalk PSF of the color separation lens array 900. This may be expressed as an optimization problem as shown in Equation 7 below.

$$\hat{x} = \arg\min_{x}\{\|y - \tilde{B}x\|^2\}$$ [Equation 7]

In this case, the optimization problem may be expressed as an optimization criterion considering data fidelity and smoothness. A regularization term that considers the characteristics or environment of an acquired image has to be included, and by selecting an appropriate regularization strategy, artifacts occurring in an inverse filtering process may be reduced. To this end, L2-regularization may be used and C may be a 3×3 matrix. For example, a Laplacian filter with a center value of 4 and top, bottom, left, and right values of −1 may be used as an example. Because the Laplacian filter is a high-frequency filter, smoothness may be adjusted by suppressing having high-frequency energy. As another example, a gradient descent optimization method or the like may be used.

According to the image acquisition apparatus 100 according to the embodiment, spatial resolution deteriorated when the color separation lens array 300 is applied may be improved by performing deconvolution to overcome a blur phenomenon through a process of applying, as an additional input value, a blur kernel estimated using the PSF of the color separation lens array 300, that is, the crosstalk PSF, and optimizing the estimated blur kernel. In this case, the deconvolution may perform an algorithm for each position (e.g. the positions of the color pixels P1, P2, P3, and P4) of a pattern image acquired by a color pixel arrangement by the color separation lens array.

For example, a raw image may be acquired by sub-sampling by the image sensor 200 to form a certain color pixel arrangement, such as a Bayer color pixel arrangement, and in order to restore a color image having a full resolution from the acquired raw image, demosaicing may be performed, for example, by interpolating a color value of an empty pixel of each color by using color values of surrounding pixels.

A process of deteriorating spatial resolution due to sub-sampling may be modeled and expressed as shown in Equation 8 below.

$$y = Dx$$ [Equation 8]

Here, y denotes a sub-sampled image, x denotes an original image, and D denotes a sub-sampling matrix. A process of restoring a color image having full resolution from the sub-sampled image may be expressed as an optimization problem as in Equation 9 below.

$$\hat{x} = \arg\min_{x}\{\|y - Dx\|^2\}$$ [Equation 9]

There are various methods for inverse filtering the sub-sampling matrix D, such as a bilinear interpolation method, an approach using correlation between channels, and a method of increasing spatial resolution by using edge orientation.

For example, for demosaicing using a bilinear interpolation method, a two-dimensional arrangement of four pixels P1, P2, P3, and P4 constituting a Bayer unit pixel as shown in FIG. 33 may be considered. When the pixel P1 is a blue pixel, a blue value may be P1, a green value may be interpolated using the average of color values of four surrounding green pixels, and a red value may be interpolated using the average of color values of four surrounding red pixels. When the pixel P2 is a green pixel, a green value may be P2, a blue value may be interpolated using the average of color values of two surrounding blue pixels, and a red value may be interpolated using the average of color values of two surrounding red pixels. When the pixel P3 is a red pixel, a red value may be P3, a green value may be interpolated using the average of color values of four surrounding green pixels, and a blue value may be interpolated using the average of color values of four adjacent blue pixels. When the pixel P4 is a green pixel, a green value may be P4, a blue value may be interpolated using the average of color values of two surrounding blue pixels, and a red value may be interpolated using the average of color values of two surrounding red pixels.

In the image sensor 200 to which the color separation lens array 300 is applied, the ratio of red (R) channels input to two green pixels of the Bayer unit pixel, that is, P2(G1) and P3(G2), may significantly differ. A level balance algorithm may be applied to solve grid artifacts occurring at this time. This is caused by a difference in the color mixing ratio between G1 and G2, and may be solved by adjusting the sensitivity of G1 and G2. In addition, in the case of a demosaicing method using correlation between channels, a grid artifact generated in a green (G) channel may affect a red (R) channel and a blue (B) channel.

Therefore, in the image sensor 200 to which the color separation lens array 300 is applied, during demosaicing for restoring an image having full resolution from a sub-sampled image in which an input image has 1 channel by color pixel arrangement but an output image has 3 channels, a level balance algorithm may be applied to solve the deterioration of spatial resolution due to grid artifacts.

Color correction may be performed to solve spectral resolution deterioration due to color degradation. Color may be corrected using a CCM configured using a PSF corresponding to each color pixel by the color separation lens array 300.

A process of deteriorating spectral resolution may be modeled and expressed as shown in Equation 10 below.

$$y = \begin{bmatrix} y_{P1} \\ y_{P2} \\ y_{P3} \\ y_{P4} \end{bmatrix} = \begin{bmatrix} w_{R\_P1} & w_{G\_P1} & w_{B\_P1} \\ w_{R\_P2} & w_{G\_P2} & w_{B\_P2} \\ w_{R\_P3} & w_{G\_P3} & w_{B\_P3} \\ w_{R\_P4} & w_{G\_P4} & w_{B\_P4} \end{bmatrix} \begin{bmatrix} x_R \\ x_G \\ x_B \end{bmatrix} = Wx$$ [Equation 10]

Here, y denotes an image having deteriorated spectral resolution, x denotes an original image, and W denotes a color mixing ratio. A method of calculating the color mixing ratio by using a crosstalk PSF may be considered. In case of separating a PSF for each channel/position, it may be possible to calculate the ratio of a high-resolution image $X_{R1}$ ... $X_{B4}$ to acquired images y1, y2, y3, and y4. That is, when all the values of the PSF are summed in four units, each component of a W matrix may be acquired.

Because a color correction algorithm for overcoming the spectral resolution deterioration is performed in the R, G, and B channels, the same G channel value may be input to P2(G1) and P3(G2) for color correction. Color correction may be expressed as an optimization problem as shown in Equation 11 below.

$$\hat{x} = \arg\min_x \{\|y - Wx\|^2\}$$
$$= (W^T W)^{-1} W^T y$$
$$= My$$
[Equation 11]

Here, W denotes a 3×3 type color mixing ratio matrix, and may be expressed as a 3×3 type M matrix by obtaining a least-squares solution.

According to the image acquisition apparatus 100 according to the embodiment, in order to solve a blur phenomenon occurring in the image sensor 200 including the color separation lens array 300, the deconvolution algorithm described above may be performed in a sub-image domain, and then a demosaicing algorithm combined with a level balance, and a color correction algorithm may be performed. Thus, in terms of spatial resolution, a blur phenomenon may be overcome and grid artifacts may be removed, and in terms of spectral resolution, by performing color correction, deterioration occurring in the image sensor 200 including the color separation lens array 300 may be solved.

Accordingly, according to the image acquisition apparatus 100 including the image sensor 200 to which the color separation lens array 300 according to an embodiment is applied, an improved image resolution may be secured while an effect of improving light efficiency is maintained.

Figure 38:
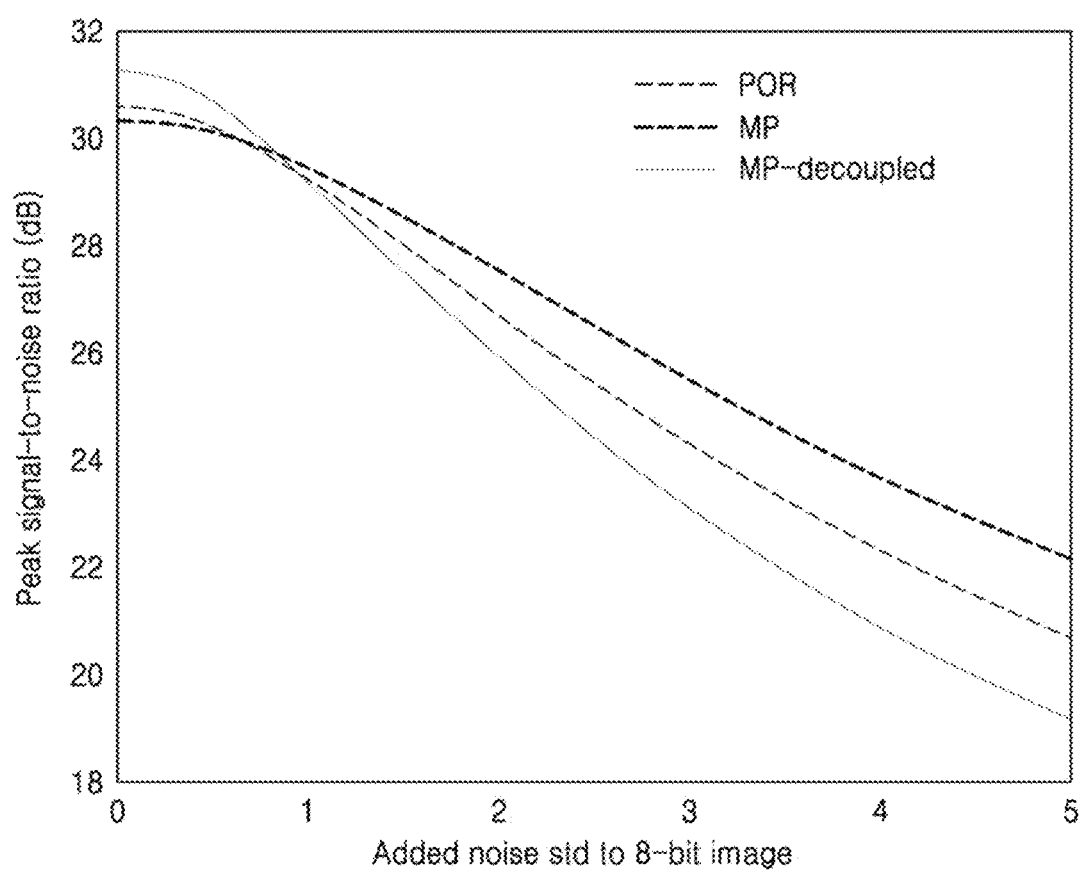
FIGS. 38 and 39 illustrate a PSNR according to an external noise condition, and the spatial resolution of an image acquisition device, respectively, when a signal processing method in a signal processor of the image acquisition apparatus according to an example embodiment is used.
Figure 39:
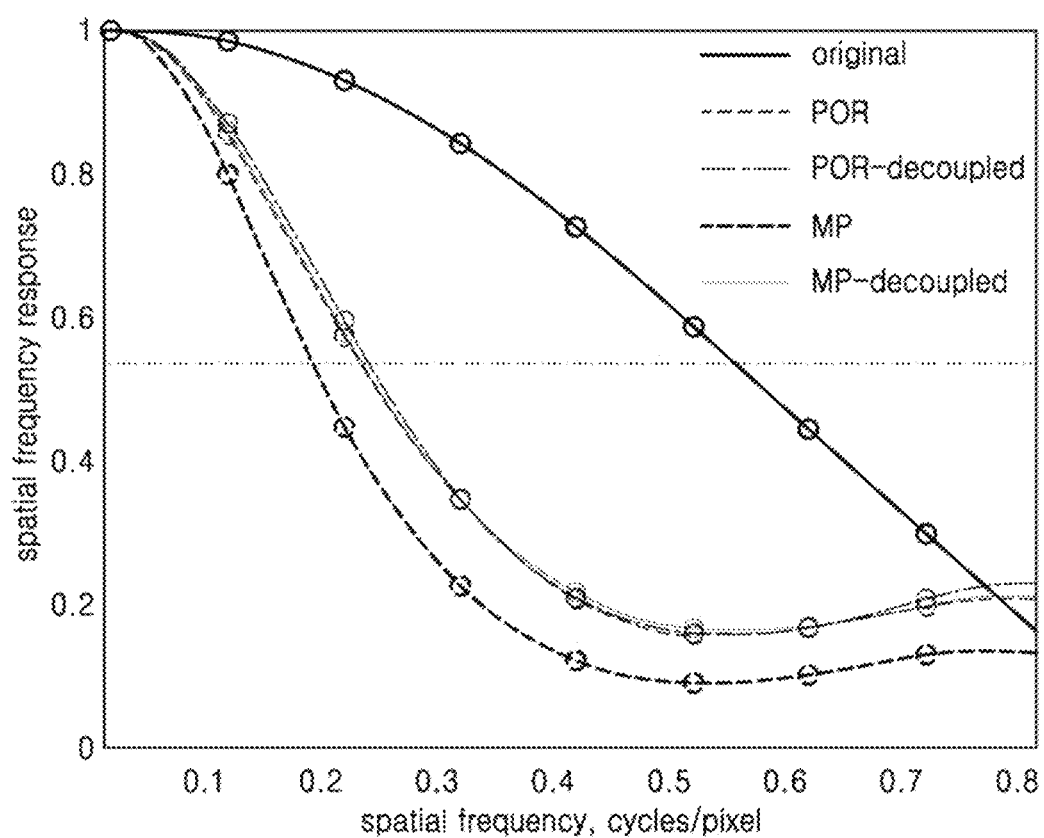

FIGS. 38 and 39 illustrate a PSNR according to an external noise condition, and the spatial resolution of the image acquisition device 100, respectively, when the signal processing method in the signal processor 250 of the image acquisition apparatus 100 according to an example embodiment is applied. In FIG. 38, the PSNR represents a signal-to-noise ratio when a mean squared error with respect to an original image is calculated as noise. FIG. 39 illustrates a modulation transfer function (MTF) at σN=0, where "original" is a graph for a case where there is no external noise and an ideal module lens is assumed, and a graph for a color separation lens array MP and a graph for a reference product POR are obtained by calculating an MTF curve by applying the PSF of the color separation lens array MP (see FIG. 34) and the PSF of the reference product POR to an inclined edge image 600 as in FIG. 29. In FIGS. 38 and 39, "POR-decoupled" is a graph when an image signal processing method according to an embodiment is applied to a reference product, and "MP-decoupled" is a graph when an image signal processing method according to an embodiment is applied to a color separation lens array.

As can be seen in FIGS. 38 and 39, an image captured by the image sensor 200 including the color separation lens array 300 in a low-illuminance environment has a superior PSNR value compared to the reference product POR. In addition, by using an image signal processing method according to an embodiment, the MTF50 of the color separation lens array MP is about 100% compared to the reference product POR, and an MTF graphs of the color separation lens array MP and the reference product POR are almost consistent across all areas.

Figure 40A:
FIG. 40A illustrates an original image.
Figure 40B:
FIG. 40B illustrates an image in which existing bilinear demosaicing and color correction are applied to a POR.
Figure 40C:
FIG. 40C illustrates an image in which existing bilinear demosaicing and color correction are applied to a color separation lens array.
Figure 40D:
FIG. 40D illustrates an image when deconvolution using an estimated blur kernel, bilinear demosaicing combined with a level balance, and color correction using a color correction matrix are applied to a color separation lens array, according to an image signal processing method according to an embodiment.

FIG. 40A illustrates an original image. FIG. 40B illustrates an image in which existing bilinear demosaicing and color correction are applied to a reference product POR. FIG. 40C illustrates an image in which existing bilinear demosaicing and color correction are applied to the color separation lens array 300. FIG. 40D illustrates an image when deconvolution applying an estimated blur kernel, bilinear demosaicing combined with a level balance, and color correction using a color correction matrix are applied to the color separation lens array 300, according to an image signal processing method according to an embodiment.

As can be seen from the comparison between FIGS. 40A to 40C and FIG. 40D, when an image is restored using an estimated blur kernel and a color correction matrix, according to an image signal processing method according to an embodiment, an image may be acquired in which a spatial resolution deterioration due to a blur phenomenon, and grid artifacts may be reduced and thus sharpness in an edge region of an image may be increased, grid artifacts in a flat region may be removed, and spectral resolution is secured by color correction.

Therefore, according to the image acquisition apparatus 100 according to the embodiment, by applying the color separation lens array 300 and the image signal processing method according to the embodiment, an image having an excellent PSNR value compared to the reference product POR in a low-illumination environment and having high-resolution and high color reproducibility in a high-illumination environment may be acquired.

The image acquisition apparatus 100, to which the image sensor 200 according to the embodiments described above is applied, may be implemented as various optical devices such as a camera or electronic apparatuses. For example, these electronic apparatuses are, for example, smart phones, mobile phones, personal digital assistants (PDAs), laptop computers, tablets, personal computers (PCs), various portable devices, home appliances, security cameras, medical cameras, and automobiles, Internet of Things (IoT), mobile computing device, or non-mobile computing device, but are not limited thereto.

Figure 41:
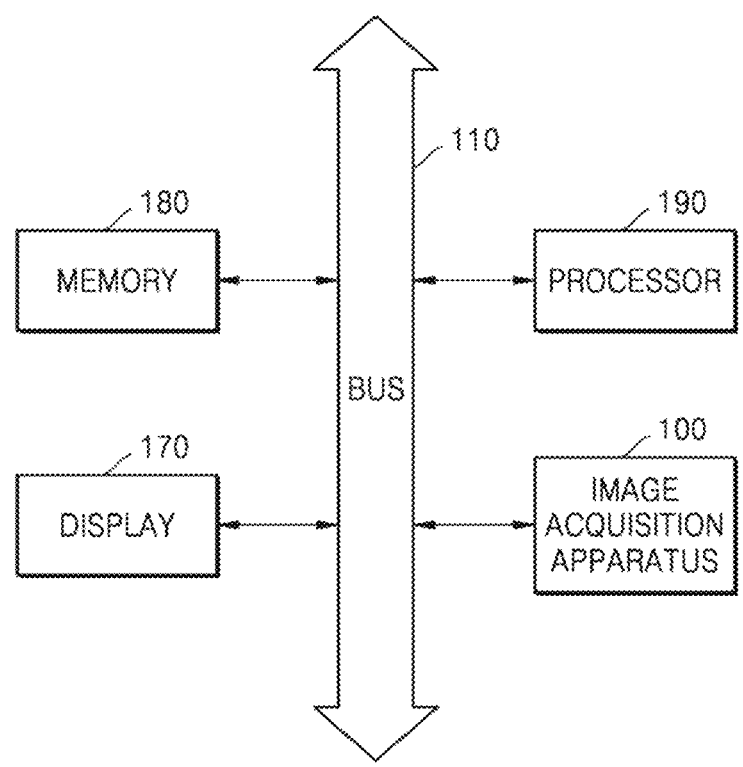
FIG. 41 is a schematic block diagram of an electronic apparatus including an image acquisition apparatus according to an embodiment.

FIG. 41 is a schematic block diagram of an electronic apparatus including the image acquisition apparatus 100 according to an embodiment. The electronic apparatus includes the image acquisition apparatus 100, a processor 190, a memory 180, a display 170, and a bus 110. The image acquisition apparatus 100 acquires image information about an external object under the control of the processor 190 and provides the image information to the processor 190. The processor 190 may store the image information provided from the image acquisition apparatus 100 in the memory 180 through the bus 110, and output the image information stored in the memory 180 to the display 170 to be displayed to the user. Also, the processor 190 may perform various image processing on image information provided from the image acquisition apparatus 100.

FIGS. 42 to 52 illustrate various examples of an electronic apparatus to which an image acquisition apparatus according to an embodiment is applied.

Figure 42:
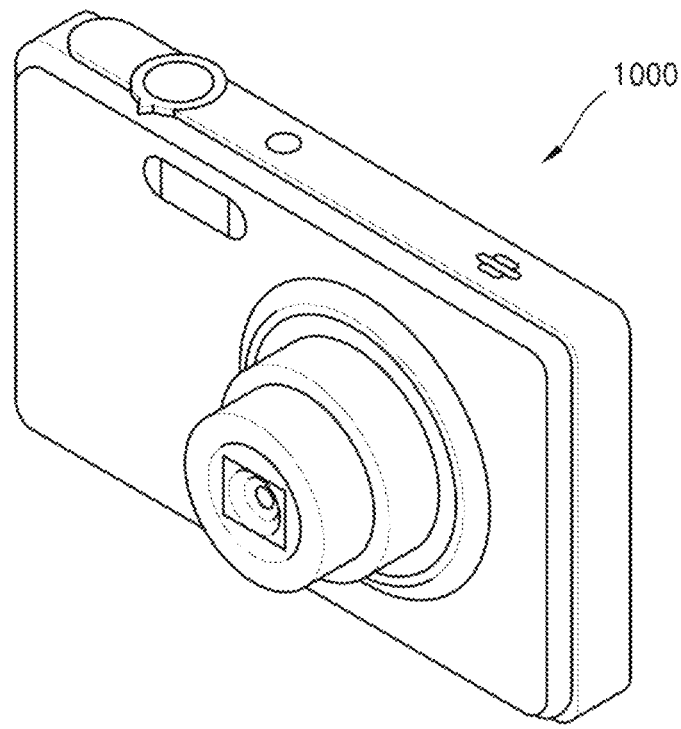
FIGS. 42 to 52 illustrate various examples of an electronic apparatus to which an image acquisition apparatus according to an example embodiment is applied.

The image acquisition apparatus according to an example embodiment may be applied to various multimedia apparatuses having an image capturing function. For example, the image acquisition apparatus according to an embodiment may be applied to a camera 1000 as shown in FIG. 42. The camera 1000 may be a digital camera or a digital camcorder.

Figure 43:
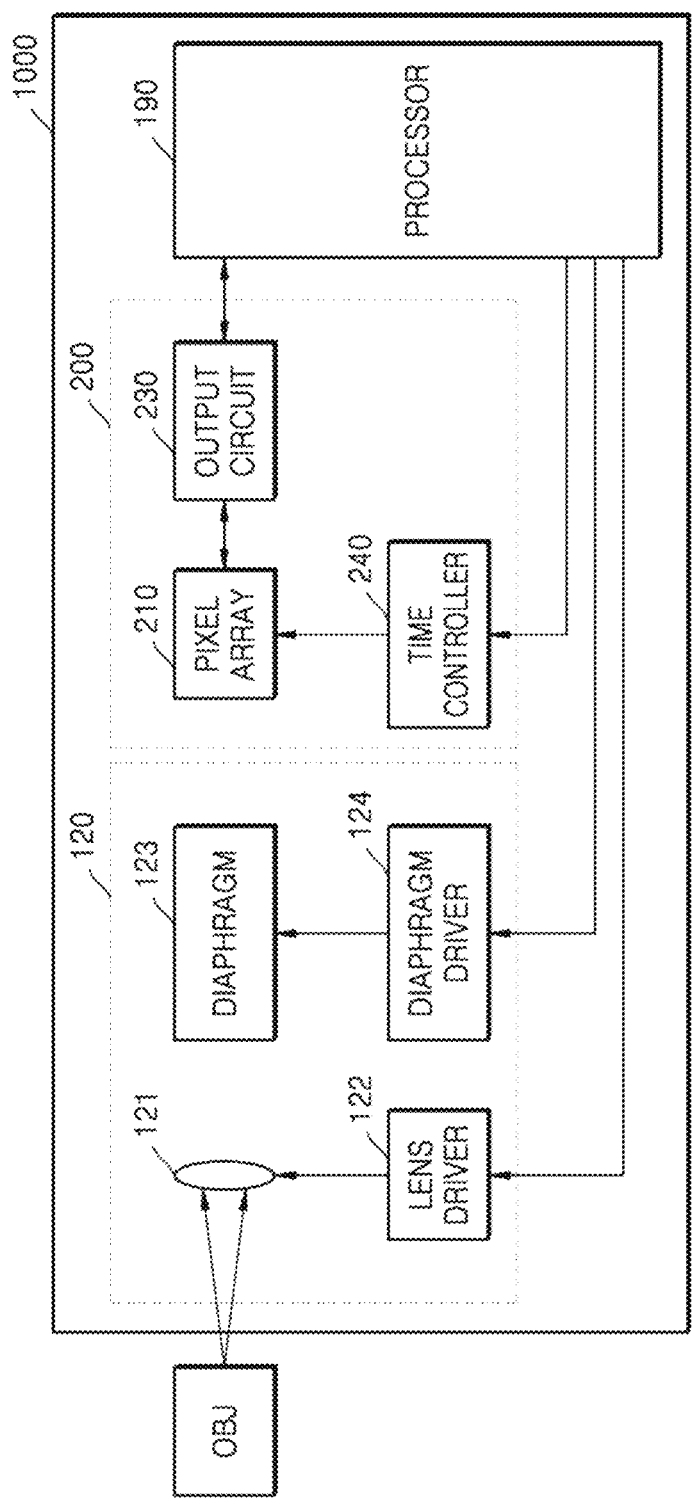

Referring to FIG. 43, the camera 1000 may include an imaging lens unit 120, an image sensor 200, a processor 190, and the like. FIG. 43 illustrates configurations of the imaging lens unit 120 and the image sensor 200, which are controlled according to control signals provided from the processor 190, from among the components of the image acquisition apparatus 100 applied to the camera 1000. The main configuration of the image acquisition apparatus 100 is illustrated in FIG. 1, and the main configuration of the image sensor 200 is illustrated in FIG. 2.

The imaging lens unit 120 forms an optical image by focusing light reflected from an object OBJ. The imaging lens unit 120 may include an objective lens 121, a lens driver 122, a diaphragm 123, and a diaphragm driver 124. In FIG. 43, only one lens is representatively shown for convenience, but in fact, the objective lens 121 may include a plurality of lenses having different sizes and shapes. The lens driver 122 may communicate information about focus detection with the processor 190, and may adjust the position of the objective lens 121 according to a control signal provided from the processor 190. The lens driver 122 may move the objective lens 121 to adjust the distance between the objective lens 121 and the object OBJ, or may adjust the positions of individual lenses in the objective lens 121. As the objective lens 121 is driven by the lens driver 122, the focus to the object OBJ may be adjusted. The camera 1000 may have an auto focus function.

The diaphragm driver 124 may communicate information about the amount of light with the processor 190, and may adjust the diaphragm 123 according to a control signal provided from the processor 190. For example, the diaphragm driver 124 may increase or decrease an aperture of the diaphragm 123 according to the amount of light entering the camera 1000 through the objective lens 121, and may adjust the opening time of the diaphragm 123.

The image sensor 200 may generate an electrical image signal based on the intensity of incident light. The image sensor 200 may include a pixel array 210, a timing controller 240, and an output circuit 230. Although not shown in FIG. 43, the image sensor 200 may further include the row decoder 220 shown in FIG. 2. The light passed through the objective lens 121 and diaphragm 123 may form an image of the object OBJ on a light receiving surface of the pixel array 210. The pixel array 210 may be a charge coupled device (CCD) or a complementary metal oxide semiconductor (CMOS) that converts an optical signal into an electrical signal.

The pixel array 210 of the image sensor 200 may include additional pixels for performing an auto focus (AF) function or a distance measurement function. In addition, the pixel array 210 may include the above-described color separation lens array. The pixel array 210 of the image sensor 200 may acquire an image signal for each color by converting an optical image formed by the imaging lens unit 120 into an electrical signal, In this case, the color separation lens array forms a phase distribution for condensing light having different wavelengths on adjacent photo-sensing cells of a sensor substrate to separate incident light according to color, and thus, in addition to a light component incident on a unit pixel, incident light corresponding to the light component from surrounding pixels may be condensed and thus light efficiency may be improved The acquired image signal for each color is processed by the signal processor 250, and the signal processor 250 forms a color image from the processed image signal for each color. In this case, the signal processor 250 performs, by using a PSF corresponding to each color pixel by the color separation lens array, deconvolution on sensing signals of a plurality of photo-sensing cell to thereby process the acquired image signal for each color, and thus, high light efficiency and clear images may be acquired. The images formed by the signal processor 250 may be stored in the memory 180 and may also be displayed on the display 170.

The processor 190 may control the overall operation of the camera 1000 and may have an image processing function. For example, the processor 190 may provide a control signal for operation of each component, such as the lens driver 122, the diaphragm driver 124, and the timing controller 240.

Figure 44:
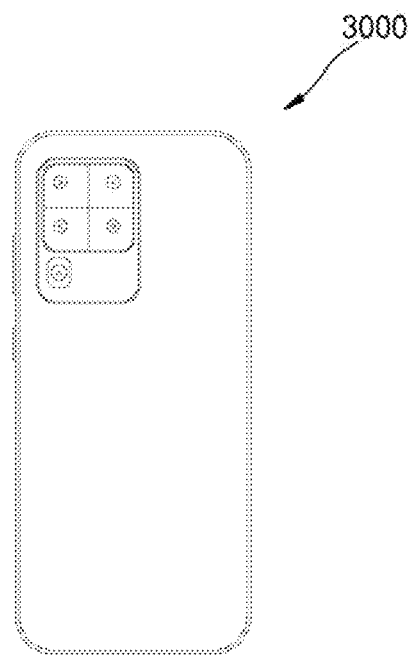
Figure 45:
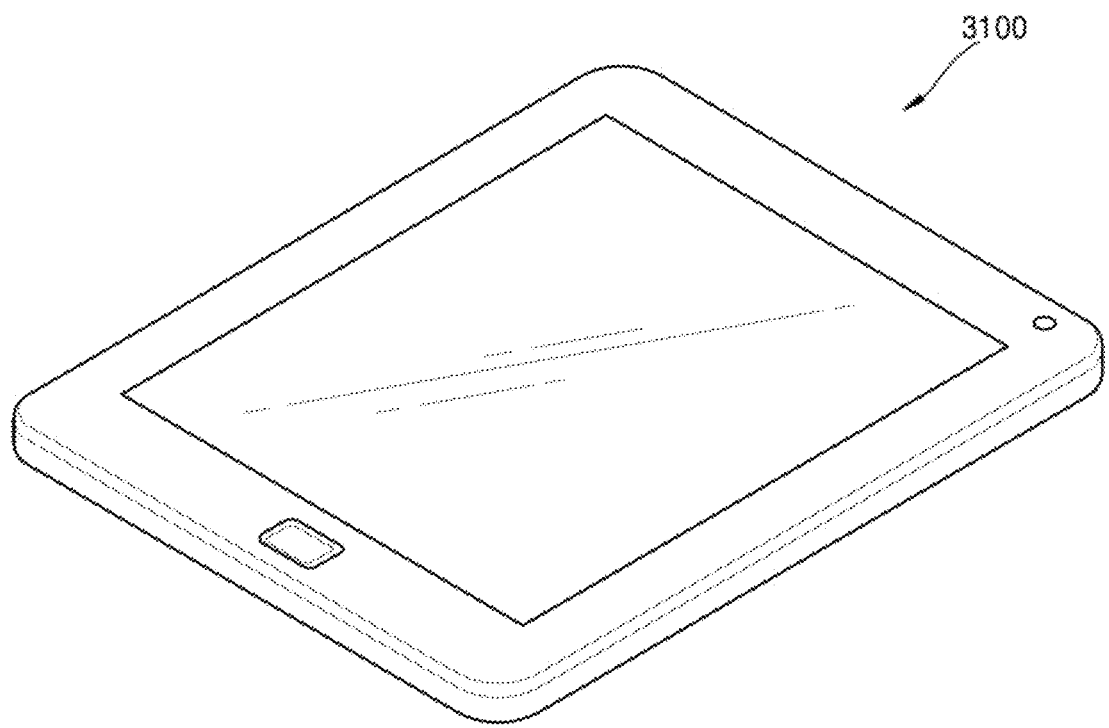
Figure 46:
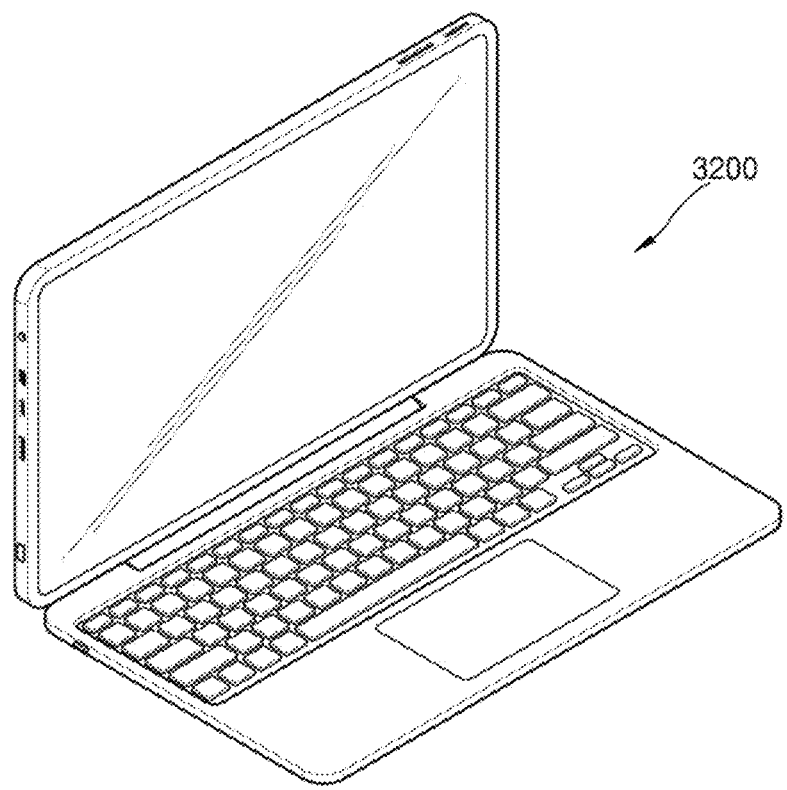
Figure 47:
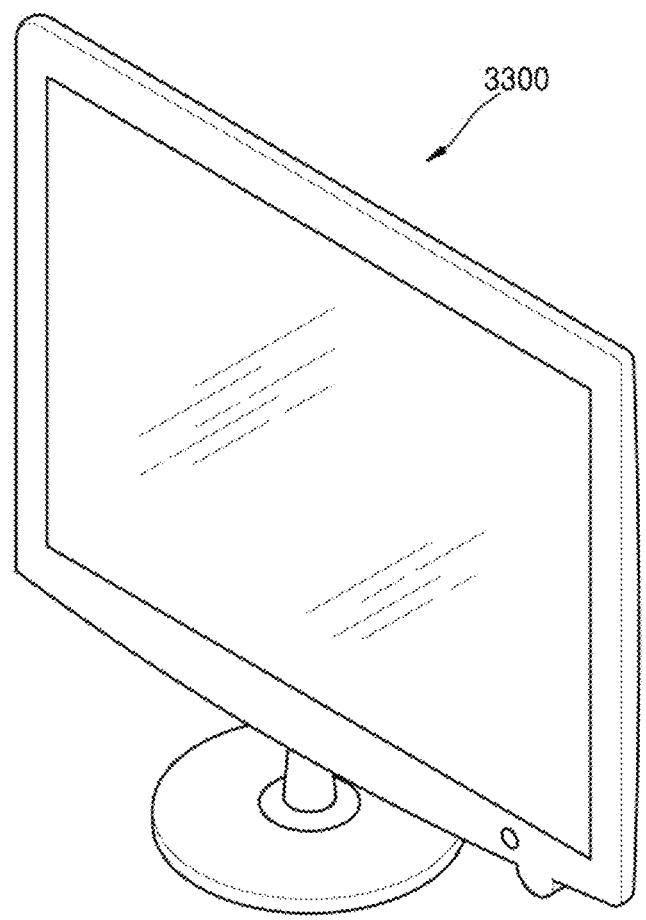

The image acquisition apparatus 100 according to an example embodiment may be applied to a mobile phone or a smart phone 3000 shown in FIG. 44, a tablet or a smart tablet 3100 shown in FIG. 45, a laptop or a notebook computer 3200 shown in FIG. 46, a television or a smart television 3300 shown in FIG. 47, in addition to the camera 1000. For example, the smart phone 3000 or the smart tablet 3100 may include a plurality of high resolution cameras each equipped with a high resolution image sensor. High resolution cameras may be used to extract depth information of objects in an image, adjust the out-of-focusing of an image, or automatically identify objects in an image.

Figure 48:
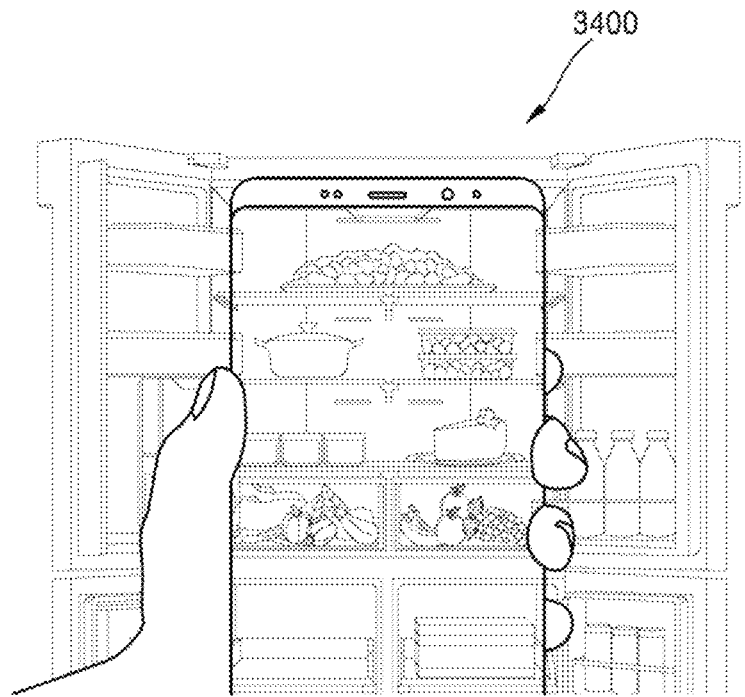
Figure 49:
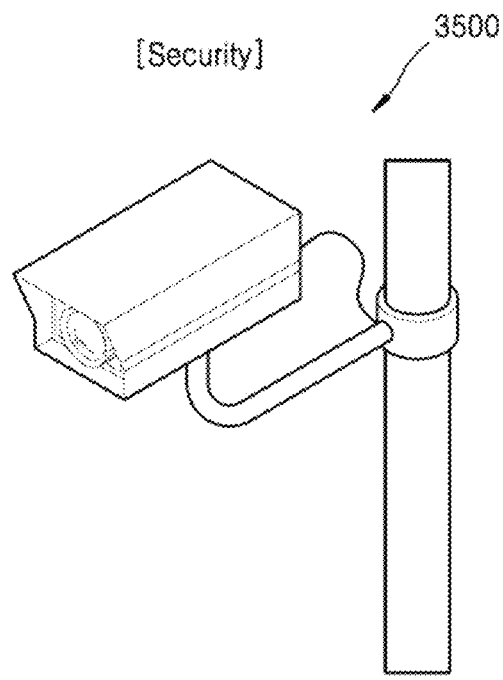
Figure 50:
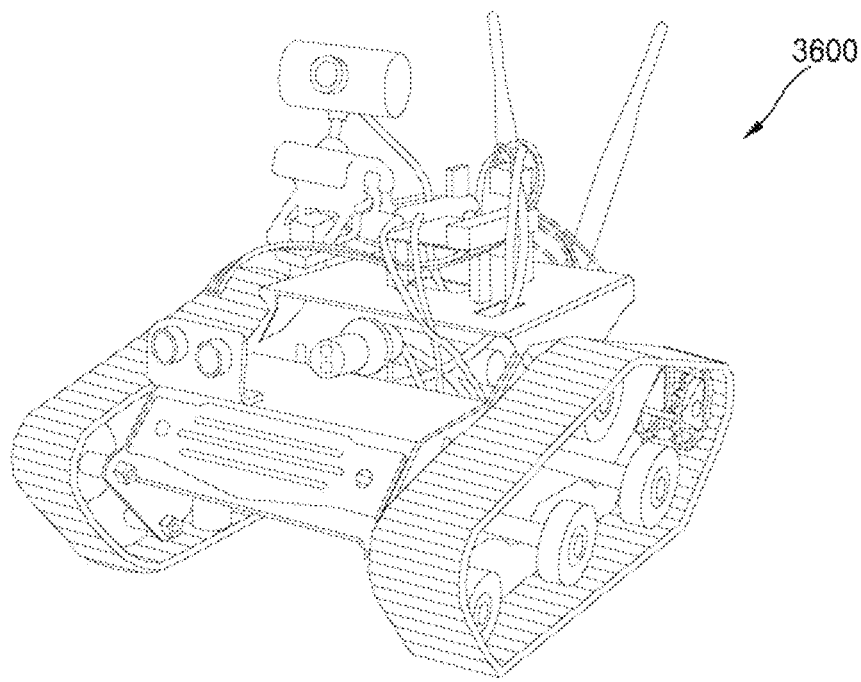
Figure 51:
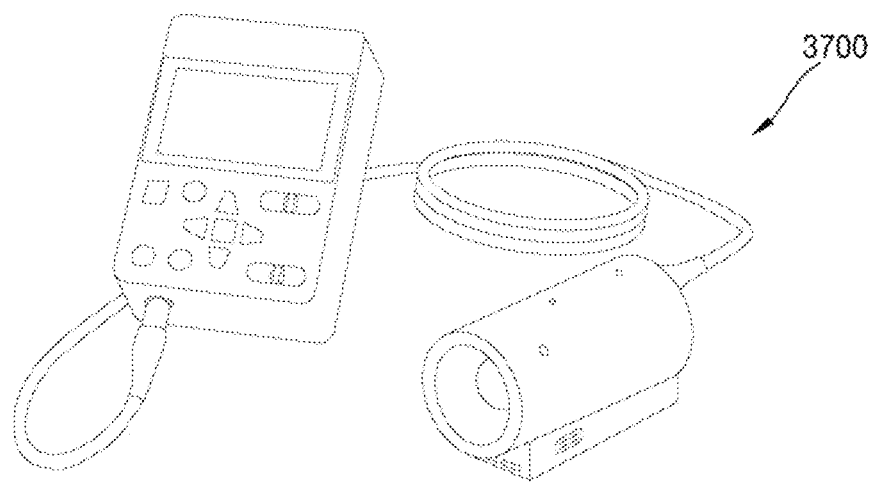

In addition, the image acquisition apparatus 100 may be applied to a smart refrigerator 3400 shown in FIG. 48, a security camera 3500 shown in FIG. 49, a robot 3600 shown in FIG. 50, a medical camera 3700 shown in FIG. 51, and the like. For example, the smart refrigerator 3400 may automatically recognize food in a refrigerator using an image sensor and inform the user of the existence of a specific food, the type of food that has been put in or released, and the like through the smart phone. The security camera 3500 may provide an ultra-high resolution image and may have a high sensitivity to allow objects or people in the image to be recognized even in a dark environment. The robot 3600 may enter a disaster or industrial site where humans cannot directly access to provide high resolution images. The medical camera 3700 may provide high resolution images for diagnosis or surgery and may dynamically adjust the field of view.

Figure 52:
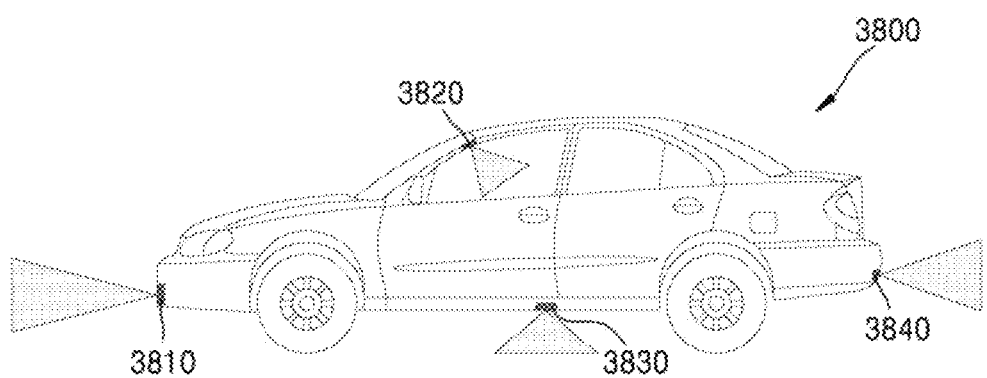

Furthermore, the image acquisition apparatus 100 may be applied to a vehicle 3800 as shown in FIG. 52. The vehicle 3800 may include a plurality of vehicle cameras 3810, 3820, 3830, and 3840 arranged in various positions in the vehicle 3800. Each of the vehicle cameras 3810, 3820, 3830, and 3840 may include the image acquisition apparatus 100 according to the embodiment. The vehicle 3800 may provide a variety of information about the interior or surroundings of the vehicle 3800 to a driver using a plurality of vehicle cameras 3810, 3820, 3830, and 3840, and may automatically recognize objects or people in the image to provide information necessary for autonomous driving.

According to an apparatus and method of acquiring images, according to an embodiment, an image sensor uses a color separation lens array that includes a fine structure, which forms a phase distribution for condensing light having different wavelengths on adjacent photo-sensing cells, in each of a plurality of regions respectively facing a plurality of photo-sensing cells in a sensor substrate, and separates incident light according to color. Therefore, in addition to a light component incident on a unit pixel, incident light corresponding to the light component from surrounding pixels may be condensed, and thus, light efficiency may be improved. Accordingly, a signal-to-noise ratio may increase, and thus, more high-frequency components of the signal may be preserved.

In addition, a signal processor may perform deconvolution in a sub-image domain to overcome a blur phenomenon caused by mixing of light condensing characteristics by the color separation lens array and surrounding pixel information and perform color correction, and thus, improved image resolution may be secured while a light efficiency improvement effect is maintained.

An image sensor including the above-described color separation lens array and an electronic device to which an image acquisition device including the image sensor is applied have been described with reference to the embodiments shown in the drawings, but they are only examples, and it will be understood by those of ordinary skill in the art that various modifications and equivalent other embodiments may be made therefrom.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and their equivalents.

What is claimed is:

1. A method of acquiring image data, the method comprising:
   inputting sensing signals for each of a plurality of colors by an image sensor including a sensor substrate and a color separation lens array a signal processor, wherein the sensor substrate includes a plurality of photo-sensing cells, and the color separation lens array separates an incident light into a plurality of lights having different wavelengths and forms a phase distribution for condensing the plurality of lights having the different wavelengths on adjacent photo-sensing cells of the plurality of photo-sensing cells;
   estimating a blur kernel in a spatial domain based on a difference between a first image in which only a spectral resolution is deteriorated by a crosstalk point spread function (PSF) of the color separation lens array and a second image in which both the spectral resolution and a spatial resolution are deteriorated by the crosstalk PSF;
   performing deconvolution on the sensing signals input to the signal processor based on the estimated blur kernel to obtain a sub-sampled image in which a blur phenomenon is removed;
   performing demosaicing to restore a full resolution image having a full resolution from the sub-sampled image; and
   correcting a color of the full resolution image using the crosstalk PSF of the color separation lens array to form a color image.

2. The method of claim 1, further comprising:
   applying a level balance during the demosaicing.

3. The method of claim 1, further comprising:
   correcting the full resolution image by using a color correction matrix constructed using the crosstalk PSF of the color separation lens array.

4. The method of claim 1, further comprising:
   performing a white balance process after the demosaicing and before correcting the color.

5. The method of claim 1, wherein the deconvolution is performed to erase convoluted information from at least one surrounding pixel.

6. The method of claim 1, wherein the image sensor includes a Bayer pattern array to obtain an individual image for each of the plurality of colors and form the color image by using the individual image for each of the plurality of colors.

7. The method of claim 1, further comprising:
   forming the color image by interpolating a color value of an empty pixel of each of the plurality of colors by using a color value of at least one surrounding pixel.

8. The method of claim 1, wherein the color separation lens array condenses a first light component corresponding to a certain pixel of the sensor substrate and a second light component corresponding to at least one surrounding pixel of the sensor substrate, onto the certain pixel of the sensor substrate.

9. The method of claim 1, wherein the sensor substrate includes a plurality of first photo-sensing cells and a plurality of second photo-sensing cells,
   wherein the color separation lens array includes:
   a plurality of first regions respectively corresponding to the plurality of first photo-sensing cells and having a first structure; and
   a plurality of second regions respectively corresponding to the plurality of second photo-sensing cells and having a second structure,
   wherein the first structure and the second structure form, in a position after the incident light has passed through one of the plurality of first regions and one of the plurality of second regions, the phase distribution in which light of a first wavelength and light of a second wavelength among the plurality of lights having the different wavelengths are diverged in different directions and are respectively condensed in the plurality of first photo-sensing cells and the plurality of second photo-sensing cells.

10. The method of claim 9, wherein the light of the first wavelength at a position immediately after passing through the color separation lens array forms a first phase distribution of $2N\pi$ at central portions of the plurality of first photo-sensing cells and forms a second phase distribution of $(2N-1)\pi$ at central portions of the plurality of second photo-sensing cells, wherein N is an integer greater than 0, and
   the light of the second wavelength at the position immediately after passing through the color separation lens array forms a third phase distribution of $(2M-1)\pi$ at the central portions of the plurality of first photo-sensing cells and forms a fourth phase distribution of $2M\pi$ at the central portions of the plurality of second photo-sensing cells, wherein M is an integer greater than 0.

11. The method of claim 9, wherein the sensor substrate further includes a plurality of third photo-sensing cells and a plurality of fourth photo-sensing cells,
   wherein the color separation lens array includes a plurality of third regions respectively corresponding to the plurality of third photo-sensing cells and having a third structure, and a plurality of fourth regions respectively corresponding to the plurality of fourth photo-sensing cells and having a fourth structure, and
   the sensor substrate includes an array of unit pixels including the plurality of first to the plurality of fourth photo-sensing cells.

12. The method of claim 11, wherein the first structure to the fourth structure form, in a position after the incident light has passed through respectively ones of the plurality of first regions to the plurality of fourth regions, the phase distribution in which the light of the first wavelength, the light of the second wavelength, and light of a third wavelength that are different from one another from the plurality of lights having the different wavelengths, are diverged in different directions and then the light of the first wavelength is condensed in the plurality of first photo-sensing cells and the plurality of fourth photo-sensing cells, the light of the second wavelength is condensed in the plurality of second photo-sensing cells, and the light of the third wavelength is condensed in the plurality of third photo-sensing cells.

13. The method of claim 12, wherein at a position immediately after passing through the color separation lens array,
the light of the first wavelength forms a first phase distribution of $2N\pi$ at central portions of the plurality of first photo-sensing cells and central portions of the plurality of fourth photo-sensing cells and forms a second phase distribution of $(2N-1)\pi$ at central portions of the plurality of second photo-sensing cells and central portions of the plurality of third photo-sensing cells,
the light of the second wavelength forms a third phase distribution of $(2M-1)\pi$ at the central portions of the plurality of first photo-sensing cells and the central portions of the plurality of fourth photo-sensing cells, forms a fourth phase distribution of $2M\pi$ at the central portions of the plurality of second photo-sensing cells, and forms a fifth phase distribution that is greater than $(2M-2)\pi$ and less than $(2M-1)\pi$ at the central portions of the plurality of third photo-sensing cells, and
the light of the third wavelength forms a sixth phase distribution of $(2L-1)\pi$ at the central portions of the plurality of first photo-sensing cells and the central portions of the plurality of fourth photo-sensing cells, forms a seventh phase distribution of $2L\pi$ at the central portions of the plurality of third photo-sensing cells, and forms an eighth phase distribution that is greater than $(2L-2)\pi$ and less than $(2L-1)\pi$ at the central portions of the plurality of second photo-sensing cells,
wherein N, M, and L are integers greater than 0.

14. The method of claim 12, wherein the first to the fourth structures include a plurality of nanoposts, and at least one of a shape, size, and arrangement of the plurality of nanoposts is different between the plurality of first to the plurality of fourth regions.

15. The method of claim 14, wherein the image sensor has a pixel array structure in which unit pixels including at least one red pixel, at least one green pixel, and at least one blue pixel are repeatedly arranged, wherein
a plurality of first nanoposts provided in a region of the color separation lens array corresponding to the at least one green pixel from among the plurality of first to the plurality of fourth regions are arranged according to different distribution rules in a first direction and a second direction perpendicular to the first direction, and
a plurality of second nanoposts provided in regions of the color separation lens array corresponding to the at least one blue pixel and the at least one red pixel from among the plurality of first to the plurality of fourth regions may be arranged according to symmetrical distribution rules in the first direction and the second direction.

16. The method of claim 11, wherein the color separation lens array further comprises:
a plurality of first nanoposts provided in a first region of the color separation lens array corresponding to a green pixel are arranged according to different distribution rules in a first direction and a second direction perpendicular to the first direction, and
a plurality of second nanoposts provided in second regions of the color separation lens array corresponding to a blue pixel and a red pixel are arranged according to symmetrical distribution rules in the first direction and the second direction.

17. The method of claim 1, wherein the image sensor has a Bayer pattern structure in which unit pixels, each having four quadrant regions including a blue pixel, a first green pixel, a red pixel, and a second green pixel, respectively, are repeatedly arranged two-dimensionally in a first direction and a second direction.

18. The method of claim 17, wherein the color separation lens array further comprises a plurality of nanoposts,
wherein, among the plurality of nanoposts, a plurality of first nanoposts provided in a region of the color separation lens array corresponding to a green pixel includes a first nanopost arranged in a central portion, which has a larger cross-sectional area than a second nanopost provided in a region of the color separation lens array corresponding to a pixel of a color other than green, and a third nanopost arranged in a peripheral portion, which has a smaller cross-sectional area than the first nanopost arranged in the central portion.

* * * * *